(12) United States Patent
Donnelly et al.

(10) Patent No.: US 7,944,081 B2
(45) Date of Patent: *May 17, 2011

(54) MULTI-POWER SOURCE LOCOMOTIVE CONTROL METHOD AND SYSTEM

(75) Inventors: Frank Wegner Donnelly, North Vancouver (CA); John David Watson, Evergreen, CO (US); Bruce Wolff, Livonia, MI (US)

(73) Assignee: Railpower, LLC, Nicholasville, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/651,613

(22) Filed: Jan. 4, 2010

(65) Prior Publication Data

US 2010/0106343 A1 Apr. 29, 2010

Related U.S. Application Data

(63) Continuation of application No. 12/019,464, filed on Jan. 24, 2008, now Pat. No. 7,667,347.

(60) Provisional application No. 60/886,465, filed on Jan. 24, 2007.

(51) Int. Cl.
*B60L 1/00* (2006.01)
*B60L 3/00* (2006.01)
*H02G 3/00* (2006.01)

(52) U.S. Cl. .................................................. 307/9.1
(58) Field of Classification Search ............... 307/9.1, 307/10.1, 43, 71, 80, 85
See application file for complete search history.

(56) References Cited

U.S. PATENT DOCUMENTS

| | | | |
|---|---|---|---|
| 5,710,699 A * | 1/1998 | King et al. | 363/132 |
| 6,308,639 B1 * | 10/2001 | Donnelly et al. | 105/50 |
| 7,012,822 B2 * | 3/2006 | Zhu et al. | 363/70 |
| 7,304,445 B2 * | 12/2007 | Donnelly | 318/108 |
| 7,667,347 B2 * | 2/2010 | Donnelly et al. | 307/10.1 |
| 2005/0263329 A1 * | 12/2005 | Kuras et al. | 180/65.1 |
| 2005/0263331 A1 * | 12/2005 | Sopko et al. | 180/65.1 |
| 2006/0028638 A1 * | 2/2006 | Douglas et al. | 356/139.09 |
| 2006/0091832 A1 * | 5/2006 | Donnelly et al. | 318/108 |
| 2006/0266256 A1 * | 11/2006 | Donnelly et al. | 105/61 |

* cited by examiner

*Primary Examiner* — Jared J Fureman
*Assistant Examiner* — Carlos Amaya
(74) *Attorney, Agent, or Firm* — King & Schickli, PLLC

(57) ABSTRACT

Control modes for operating multiple power sources include energy storage systems and applicable to large systems such as locomotives. Selectable operating modes are provided for different locomotive speed ranges and work loads. A common DC bus electrical architecture is used so that prime power sources need not be synchronized. Multiple-engine locomotives have the engine systems that may be electrically connected in parallel or in series or in combinations of parallel and series to a DC bus.

20 Claims, 40 Drawing Sheets

MULTI-POWER SOURCE LOCOMOTIVE CONTROL METHOD AND SYSTEM

This application is a continuation of U.S. patent application Ser. No. 12/019,464, filed Jan. 24, 2008, now U.S. Pat. No. 7,677,347 which claims the benefit of U.S. Provisional Patent Application Ser. No. 60/886,465 filed Jan. 24, 2007, the entirety of the foregoing applications are hereby incorporated by reference.

FIELD OF THE INVENTION

The present invention relates generally to means of applying various control options for various control modes for a vehicle comprising a plurality of power sources and particularly to (1) a locomotive having a plurality of engines and (2) a locomotive having a plurality of engines and an energy storage system. The general method can be applied to a locomotive having a plurality of power sources, fuel types and drive train combinations. These methods pertain to multiple engine configurations where the engines may be connected in parallel to a common DC bus or in series to a common DC bus or in combinations of parallel and series to a common DC bus.

BACKGROUND OF THE INVENTION

Railroads are under increasing pressure to reduce emissions and to increase fuel efficiency. One of several responses to these forces has been the development of hybrid locomotives. Donnelly has disclosed the use of a battery-dominant hybrid locomotive in U.S. Pat. No. 6,308,639 which is incorporated herein by reference. Hybrid locomotives can reduce emissions and fuel consumption in rail operations such as yard switching but they are less effective for medium haul freight or commuter trains.

In U.S. patent issued Dec. 4, 2007 entitled "Locomotive Power Train Architecture", Donnelly et al. have further disclosed a general electrical architecture for locomotives based on plurality of power sources, fuel and drive train combinations. The power sources may be any combination of engines, fuel cells, energy storage and regenerative braking. This application is also incorporated herein by reference.

The development of multi-engine locomotives is another response to the search for more energy efficient and emissions compliant locomotives. In U.S. patent application Ser. No. 11/201,267 filed Aug. 9, 2005 entitled "Multiple Engine Locomotive Configuration", Donnelly et al. have disclosed a means of packaging engine modules on a multi-engine locomotive that optimizes the power density of the locomotive power plants while reducing emissions and fuel consumption. In a U.S. patent application Ser. No. 11/412,071 filed Apr. 25, 2006 entitled "Multiple Prime Power Source Locomotive Control", Donnelly et al. further disclose a general means for controlling and balancing a number of prime power sources powering a locomotive, including control for various operating modes such as for example, (1) a maximum fuel efficiency mode; (2) a minimum emissions mode (whether of a substance or energy, such as noise); (3) a combination mode of good fuel efficiency and low emissions; (4) a maximum power mode; and (5) an optimum engine lifetime mode.

In a U.S. Provisional Patent Application 60/814,595 entitled "Multi-Power Source Locomotive Control Modes" by Donnelly filed Jun. 15, 2006, methods of overriding preset multi-engine selection algorithms were disclosed. These methods overcome deficiencies of preset engine selection algorithms that occur in certain common railroad situations.

In U.S. Provisional Patent Application entitled "Marine Power Train Architecture" by Donnelly and Watson filed Oct. 24, 2006, a multi-engine architecture was disclosed in which the engine system outputs were connected electrically in series across a DC bus. In this provisional, so-called soft hybrid architectures were also disclosed.

There are a number of practical considerations that need to be considered in implementing control schemes for multi-power source locomotives. For example, if diesel engines are used, strategies must be developed to ensure the engines are not turned on and off too frequently. As another example, maximum tractive effort may be required in low speed yard switching work; maximum fuel economy may be required in short haul medium speed operations; maximum acceleration and maximum fuel economy may be required at different times in commuter operation; and various combinations of maximum fuel economy and minimum emissions may be required in different locations on long haul routes. These various operating modes cannot all be accommodated by a single notch power table prescription for selecting the number of engines, engine speeds and engine power levels. Thus there is a need for a practical method of selecting engine operating modes by the locomotive engineer that allows the performance benefits of a multi-engine locomotive to be realized.

Further, means for controlling and balancing a number of prime power sources powering a locomotive, including control for various operating modes; and methods of overriding preset multi-engine selection algorithms need to be extended to cover multi-engine configurations where the engines are connected electrically in series or in parallel or a combination thereof.

SUMMARY OF THE INVENTION

These and other needs are addressed by the various embodiments and configurations of the present invention which are directed generally to controlling the individual prime power systems of a multi-prime power source vehicular propulsion system. The inventions disclosed herein are applicable to locomotives utilizing prime power sources such as diesel engines, gas turbine engines, fuel cells, other types of internal combustion engines or combinations of these. The inventions disclosed herein are also applicable to locomotives utilizing multiple prime power sources and energy storage units (hybrid locomotives). The inventions may also apply to other types of vehicles or systems that require substantial power and low emissions utilizing multiple power plant combinations. Examples of other vehicles and systems include large trucks such as mining trucks, tugboats and large mobile cranes.

More particularly, the present invention provides a method of controlling a desired total system output power from a vehicle comprising a plurality of power sources, the plurality of power sources outputting DC electrical power to a common DC bus, and the vehicle also comprising a variable power control having a plurality of power settings, the method comprising the steps of:

a) selecting a number of power sources to be used according to a schedule to provide power to the DC common bus;

b) activating the power sources according to the schedule;

c) setting a desired range of a parameter indicative of power available on the DC common bus from at least one of voltage or current on the DC common bus;

d) measuring a signal corresponding to the parameter indicative of power available on the DC common bus from at least one of voltage or current on the DC common bus;
e) for each of the plurality of power sources, measuring a signal indicative of a power source operational parameter from said each of the plurality of power sources;
f) determining an output power for each of the plurality of power sources, based on the measurement of the signal indicative of the power source operational parameter from said each of the plurality of power sources and the signal corresponding to the parameter indicative of at least one of voltage or current on the DC common bus; and
g) if the output power of one of the plurality of power sources is different from a target output power, adjusting a power source control parameter of said one of the plurality of power sources to correct the difference.

The present invention also provides a system for controlling a desired total system output power from a vehicle comprising a plurality of power sources, the plurality of power sources outputting DC electrical power to a common DC bus, and the vehicle also comprising a variable power control having a plurality of power settings, the control system comprising:
selecting means for selecting a number of power sources to be used according to a schedule to provide power to the DC common bus;
activating means for activating the power sources according to the schedule;
setting means for setting a desired range of a parameter indicative of power available on the DC common bus from at least one of voltage or current on the DC common bus;
first measuring means for measuring a signal corresponding to the parameter indicative of power available on the DC common bus from at least one of voltage or current on the DC common bus;
second measuring means, for each of the plurality of power sources, for measuring a signal indicative of a power source operational parameter from said each of the plurality of power sources;
determining means for determining an output power for each of the plurality of power sources, based on the measurement of the signal indicative of the power source operational parameter from said each of the plurality of power sources and the signal corresponding to the parameter indicative of at least one of voltage or current on the DC common bus; and
adjusting means for adjusting a power source control parameter of said one of the plurality of power sources to correct a difference between the output power of one of the plurality of power sources and a target output power.

Multi-Engine Locomotive Control

The present inventions include multi-engine locomotive configurations where the engine systems are connected (1) in parallel to a common DC bus; (2) in series with a common DC bus; or in combinations of parallel and series. The first two configurations require different strategies to measure individual engine system output power and to ensure that each engine system is contributing the desired amount of power to the DC bus.

Parallel Connected Engine Systems

In parallel configuration, the output voltage of an engine system providing power to the DC bus is very close to the voltage measured on the DC bus. If, for example, the output voltage of an engine system is just below bus voltage then that engine system will not provide any power to the DC bus. However, a measurement of the output current of an engine system is a sensitive direct measurement of the engine system's power output and is the preferred method of determining engine system output power. An engine system's output power is its output current times the DC bus voltage. In parallel configuration, the general method of ensuring the desired engine system output power is then:
set the desired DC bus voltage or bus voltage range and measure the DC bus voltage;
for each engine system, measure its output current and use this to determine its output power (engine system current times DC bus voltage);
if the engine system is not outputting the desired power, adjust an engine system electrical or mechanical parameter to produce desired engine system output current and hence power Series Connected Engine Systems In series configuration, the output voltage of each engine system providing power to the DC bus is added to produce the voltage measured on the DC bus. Thus a measurement of the output voltage of an engine system is an accurate measurement of the engine system's power to the DC bus and is the preferred method of determining the engine system's output power. An engine system's output power is its output voltage times the DC bus current. If only DC bus voltage is measured, an engine system's relative output power compared to the other engines providing power can still be obtained by each engine system's measured output voltage. In series configuration, the general method of ensuring the desired engine system output power is then:
set the desired DC bus voltage or bus voltage range and measure the DC bus voltage; or set the desired DC bus current or bus current range and measure the DC bus current
for each engine system, measure its output voltage and use this to determine its output power (its voltage times DC bus current) or output power relative to the other engines (relative output voltages are relative output powers since current is the same)
if the engine system is not outputting the desired power or desired power relative to the other engines, adjust an engine system electrical or mechanical parameter to produce desired engine system output voltage and hence power.

Soft-Hybrid Configurations

Another invention disclosed herein is a propulsion system for a multi-engine locomotive with multiple engines in parallel and a hybrid auxiliary power system. The auxiliary power system can provide the locomotives auxiliary power when one or more engines are operating or when no engines are operating. The auxiliary power system can also be used to start any of the multiple engines of the main propulsion system. An alternate propulsion system for a multi-engine locomotive with multiple engines in parallel and a hybrid auxiliary power system is disclosed. In this configuration, the main propulsion system is driven by a mechanical transmission rather than by an electrical transmission.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

The following definitions are used herein:
A locomotive is generally a self-propelled railroad prime mover which is powered either by a steam engine, diesel engine or externally such as from an overhead electrical catenary or an electrical third rail.

An engine refers to any device that uses energy to develop mechanical power, 10 such as motion in some other machine. Examples are diesel engines, gas turbine engines, microturbines, Stirling engines and spark ignition engines.

A prime power source or a prime mover refer to any device that uses energy to develop mechanical or electrical power, such as motion in some other machine. Examples include but are not limited to diesel engines, gas turbine engines, microturbines, Stirling engines, spark ignition engines or fuel cells.

A motor refers to a device that produces or imparts motion.

A traction motor is a motor used primarily for propulsion such as commonly used in a locomotive. Examples are an AC or DC induction motor, a permanent magnet motor and a switched reluctance motor.

An energy storage system refers to any apparatus that acquires, stores and 20 distributes mechanical or electrical energy which is produced from another energy source such as a prime energy source, a regenerative braking system, a third rail and a catenary and any external source of electrical energy. Examples are a battery pack, a bank of capacitors, a compressed air storage system and a bank of flywheels.

An electrical energy converter refers to an apparatus that transmits or blocks the flow of electrical energy and may also increase or reduce voltage and change the frequency of the transmitted energy including changing the frequency to zero. Examples are but are not limited to an inverter, a rectifier circuit, a chopper circuit, a controlled rectifier such as a cycle converter, a boost circuit, a buck circuit and a buck/boost circuit.

A mechanical-to-electrical energy conversion device refers an apparatus that converts mechanical energy to electrical energy. Examples include but are not limited to a synchronous alternator such as a wound rotor alternator or a permanent magnet machine, an asynchronous alternator such as an induction alternator, a DC generator, and a switched reluctance generator.

An engine system as used herein refers to the engine and its mechanical-to electrical energy conversion device so the output power of an engine system is electrical.

Dynamic braking is implemented when the electric propulsion motors are switched to generator mode during braking to augment the braking force. The electrical energy generated is typically dissipated in a resistance grid system.

Regenerative braking is the same as dynamic braking except the electrical energy generated is recaptured and stored in an energy storage system for future use Engine speed is the rotary speed of the engine output drive shaft and is typically expressed in rpms.

Alternator speed is the rotary speed of the alternator rotor and is typically expressed in rpms. The alternator speed is commonly the same as engine speed since they are usually directly connected with no intermediate gearing.

An IGBT is Insulated Gate Bipolar Transistor which is a power switching device capable of sequentially chopping a voltage waveform at a very fast rate.

The duty cycle of an IGBT is the ratio of time that the IGBT is switched on (conducting) to the total time that the IGBT is switched on (conducting) and off (nonconducting).

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

BRIEF DESCRIPTION OF THE DRAWINGS

These and other objects and advantages of the invention will become apparent upon reading the detailed description and upon referring to the drawings in which.

LIST OF TABLES

Figure 1:
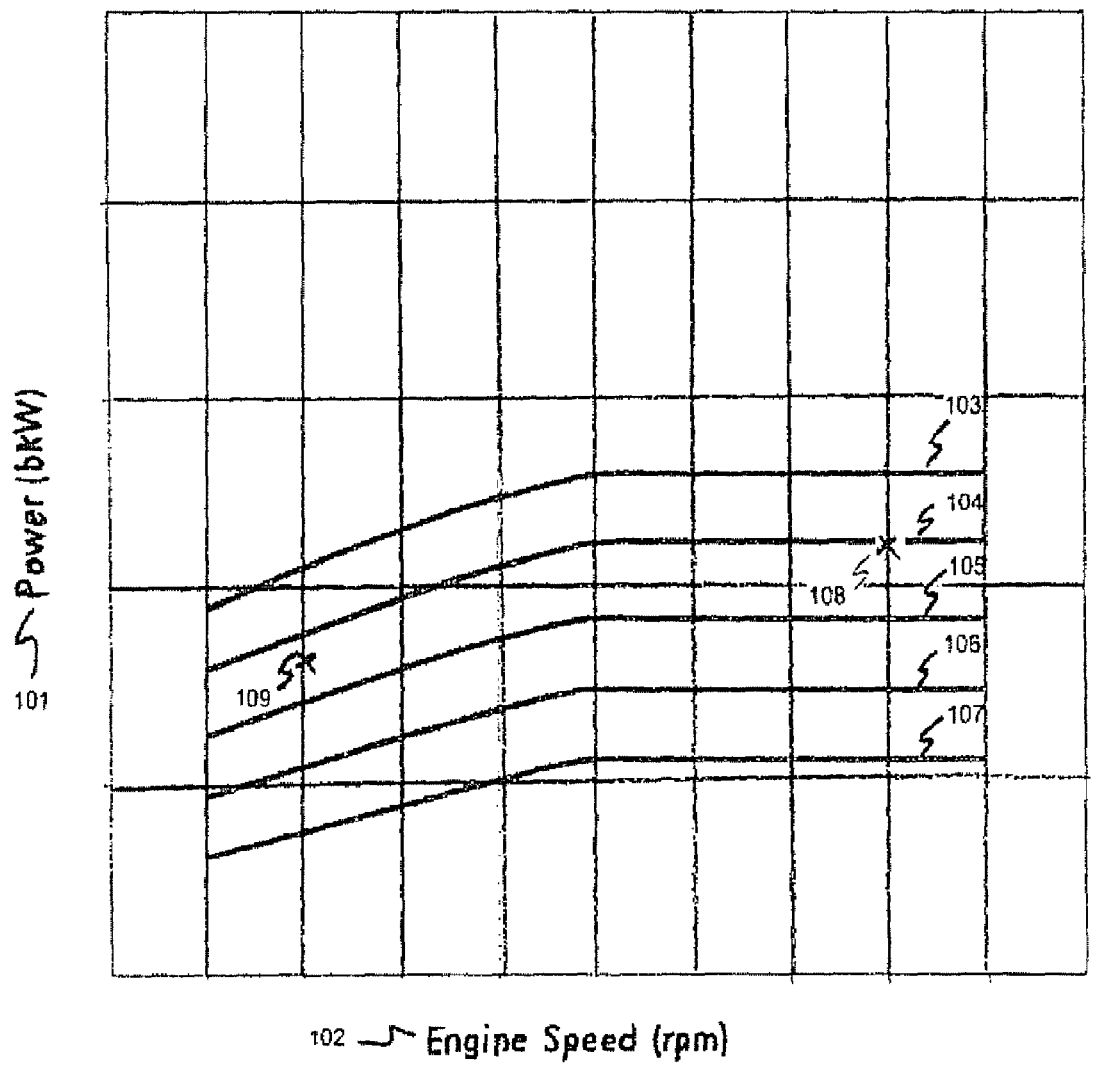
FIG. 1 is an plot of engine power versus engine speed.

Table 1 is a table of the output brake horsepower ("BHP") versus engine speed ("rpm") for a single engine.

Table 2 is a table of the output brake horsepower ("BHP") versus engine speed ("rpm") for a multi-engine locomotive with fixed engine selection.

Table 3 is a table of the output brake horsepower ("BHP") versus engine speed ("rpm") for a multi-engine locomotive with a single variable engine.

Table 4 is a table of the output brake horsepower ("BHP") versus engine speed ("rpm") for a multi-engine locomotive with engine selection determined by load.

Table 5 is a table of the output brake horsepower ("BHP") versus engine speed ("rpm") for a multi-engine locomotive with a fixed number of engines selected.

Table 6 is a table of the output brake horsepower ("BHP") versus engine speed ("rpm") for a multi-engine locomotive with engines selected for maximum fuel economy.

Table 7 is a table of the output brake horsepower ("BHP") versus engine speed ("rpm") for a multi-engine locomotive with engines selected for minimum emissions.

Table 8 is a table of the output brake horsepower ("BHP") versus engine speed ("rpm") for a multi-engine hybrid locomotive.

DETAILED DESCRIPTION OF PREFERRED EMBODIMENTS

As shown in the attached figures, according to the present invention, there is provided a method of controlling a desired total system output power from a vehicle comprising a plurality of power sources, the plurality of power sources outputting DC electrical power to a common DC bus, and the vehicle also comprising a variable power control having a plurality of power settings. A shown in FIG. 10, the method comprises the steps of:

a) selecting a number of power sources to be used according to a schedule to provide power to the DC common bus; 1002 b) activating the power sources according to the schedule; 1003 c) setting a desired range of a parameter indicative of power available on the DC common bus from at least one of voltage or current on the DC common bus; 1004 d) measuring a signal corresponding to the parameter indicative of power available on the DC common bus from at least one of voltage or current on the DC common bus;

e) for each of the plurality of power sources, measuring a signal indicative of a power source operational parameter from each of the plurality of power sources;

f) determining an output power for each of the plurality of power sources, based on the measurement of the signal indicative of the power source operational parameter from each of the plurality of power sources and the signal corresponding to the parameter indicative of at least one of voltage or current on the DC common bus; 1005 and g) if the output power of one of the plurality of power sources is different from a target output power, adjusting a power source control parameter of one of the plurality of power sources to correct the difference 1006, 1007.

Preferably, the power source operational parameter comprises at least one of current, voltage, torque, speed and fuel injection rate.

According to one preferred embodiment of the present invention, the plurality of power sources are connected in parallel to the common DC bus, the parameter indicative of the power available on the DC common bus is the DC common bus voltage, and the signal indicative of the power source operational parameter is at least one of current, voltage, torque, speed and fuel injection rate from said each of the plurality of power sources.

According to another preferred embodiment of the present invention, the plurality of power sources are connected in series to the common DC bus, the parameter indicative of the power available on the DC common bus is the DC common bus voltage, and the signal indicative of the power source operational parameter is at least one of current, voltage, torque, speed and fuel injection rate from said each of the plurality of power sources.

According to another preferred embodiment of the present invention, the plurality of power sources are connected in series to the common DC bus, the parameter indicative of the power available on the DC common bus is the DC common bus current, and the signal indicative of the power source operational parameter is at least one of current, voltage, torque, speed and fuel injection rate from said each of the plurality of power sources.

Preferably, the vehicle may operate in a mode wherein all selected power sources in step a) operate at a same power level.

Preferably, the vehicle may operate in another mode, wherein all selected power sources but one in step a) operate at a same power level, the one power source operating at a different power level and enabling the all selected power sources but one to optimize an operating parameter.

Preferably, the above-mentioned operating parameter is selected from the group consisting of (i) fuel efficiency; (ii) low emissions; (iii) noise level; (iv) power; (v) tractive effort; (vi) engine lifetime, (vii) location of the vehicle and (viii) any combination thereof.

Preferably, the vehicle may operate in another mode, wherein each power setting corresponds to a power level which is obtained by adding another power source as soon as the currently operating power sources reach a selected percentage of their rated power.

Preferably, the vehicle may operate in another mode, wherein an operator of the vehicle manually selects at least one of the number of power sources to be used according to the schedule and an operating parameter of one of the number of power sources to be used according to the schedule, said operating parameter being selected from the group consisting of (i) fuel efficiency; (ii) low emissions; (iii) noise level; (iv) power; (v) tractive effort; (vi) engine lifetime, (vii) location of the vehicle, (viii) maximum engine output power, (ix) engine speed and (x) any combination thereof.

Preferably, the vehicle may operate in another mode, wherein said number of power sources to be used and the power and engine speed setting for each power source are selected in order to obtain a desired fuel efficiency for that power setting and are determined using a controller programmed to use fuel consumption maps for each power source.

Preferably, the vehicle may function in another mode, wherein said number of power sources to be used and the power and engine speed setting for each power source in order to obtain the desired emissions for that power setting are determined using a controller programmed to use an emissions map for each power source.

Preferably, the plurality of power sources comprise a plurality of prime movers and one or more energy storage systems.

Preferably, the vehicle is of a type selected from the group consisting of locomotives, trucks, tugboats and cranes.

Preferably, the variable power control having a plurality of power settings includes one or more idle settings and a plurality of power notch settings.

Preferably, the vehicle may operate in another mode, wherein step a) comprises the steps of:
  i) determining a specified output power for a selected notch setting and vehicle speed;
  ii) selecting an optimum power source operating mode;
  iii) selecting a number of power sources required to provide the specified output power for the selected notch setting and vehicle speed;
  iv) selecting specific power sources to provide the specified output power for the selected notch setting and vehicle speed;
  v) verifying whether any of the selected specific power sources need to be derated;
  vi) if a power source from any of the selected specific power sources needs to be derated, derating said power source needing derating and returning to step iii); and
  vii) if a power source from the plurality of power sources is not required to provide the specified output power for the selected notch setting and vehicle speed, deactivating said non-required power source;

Preferably, the vehicle may operate in dynamic braking mode and the method further comprises, prior to step a), the steps of:
  aa) selecting a dynamic braking power level;
  bb) determining if dynamic braking available power is sufficient for providing the desired total system output power;
  cc) if the dynamic braking available power is sufficient for providing the desired total system output power, performing step g) wherein the desired total system output power comprises output power from dynamic braking; and
  dd) if the dynamic braking available power is not sufficient for providing the desired total system output power, performing step a) wherein the desired total system output power comprises output power from dynamic braking and output power from the plurality of power sources.

Preferably, the method further comprises a step of deactivating a selected one of the plurality of power sources, the deactivating step comprising the steps of:
  I) selecting between an idle mode and a shutdown mode;
  II) if the idle mode is selected, performing the steps of:
    A. selecting between a high idle power level and a low idle power level;
    B. setting an excitation current for the selected deactivating power source such that an output voltage of the selected deactivating power source is below a DC common bus voltage
    C. selecting an optimum operating mode for the selected deactivating power source; and
    D. adjusting the excitation current for the selected deactivating power source such that the output voltage of the selected deactivating power source is below a DC common bus voltage and the selected deactivating power source achieves said optimum operating mode; and
  III) if the shutdown mode is selected, performing the steps of:
    E. from look-ahead data, determining if the power source can be turned off;
    F. if a time required to shutdown the power source is below a threshold, performing steps II) A through II) D; and
    G. if the time required to shutdown the power source is above the threshold, turning off the engine.

Preferably, for activating the power sources, step b) comprises the steps of:
  I) if the power sources are off, preheating the power sources;
  II) turning on lubricating oil flow;
  III) starting the power sources;
  IV) selecting between a high idle power level and a low idle power level;
  V) setting an excitation current for the selected activating power source such that an output voltage of the selected activating power source is below a DC common bus voltage
  VI) selecting an optimum operating mode for the selected activating power source; and VII) adjusting the excitation current for the selected activating power source such that the output voltage of the selected deactivating power source is below a DC common bus voltage and the selected activating power source achieves said optimum operating mode.

According to the present invention, there is also provided a system for controlling a desired total system output power from a vehicle comprising a plurality of power sources, the plurality of power sources outputting DC electrical power to a common DC bus, and the vehicle also comprising a variable power control having a plurality of power settings, the control system comprising:

selecting means for selecting a number of power sources to be used according to a schedule to provide power to the DC common bus;

activating means for activating the power sources according to the schedule;

setting means for setting a desired range of a parameter indicative of power available on the DC common bus from at least one of voltage or current on the DC common bus;

first measuring means for measuring a signal corresponding to the parameter indicative of power available on the DC common bus from at least one of voltage or current on the DC common bus;

second measuring means, for each of the plurality of power sources, for measuring a signal indicative of a power source operational parameter from each of the plurality of power sources;

determining means for determining an output power for each of the plurality of power sources, based on the measurement of the signal indicative of the power source operational parameter from each of the plurality of power sources and the signal corresponding to the parameter indicative of at least one of voltage or current on the DC common bus; and adjusting means for adjusting a power source control parameter of one of the plurality of power sources to correct a difference between the output power of one of the plurality of power sources and a target output power.

Preferably, the power source operational parameter comprises at least one of current, voltage, torque, speed and fuel injection rate.

According to a preferred embodiment of the invention, the plurality of power sources are connected in parallel to the common DC bus, the parameter indicative of the power available on the DC common bus is the DC common bus voltage, and the signal indicative of the power source operational parameter is at least one of current, voltage, torque, speed and fuel injection rate from each of the plurality of power sources.

According to another preferred embodiment of the invention, the plurality of power sources are connected in series to the common DC bus, the parameter indicative of the power available on the DC common bus is the DC common bus voltage, and the signal indicative of the power source operational parameter is at least one of current, voltage, torque, speed and fuel injection rate from said each of the plurality of power sources.

According to another preferred embodiment of the invention, the plurality of power sources are connected in series to the common DC bus, the parameter indicative of the power available on the DC common bus is the DC common bus current, and the signal indicative of the power source operational parameter is at least one of current, voltage, torque, speed and fuel injection rate from said each of the plurality of power sources.

According to another preferred embodiment of the invention, the system further comprises an energy storage system and an auxiliary power system connected to the DC common bus and wherein each of the plurality of power sources comprises an output shaft connected to a mechanical transmission driving a plurality of traction motor propulsion systems.

According to another preferred embodiment of the invention, the vehicle further comprises an auxiliary power system bus connected to the plurality of power sources, an energy storage system connected to the auxiliary power system bus; and an auxiliary power system connected to the auxiliary power system bus.

Figure 2:
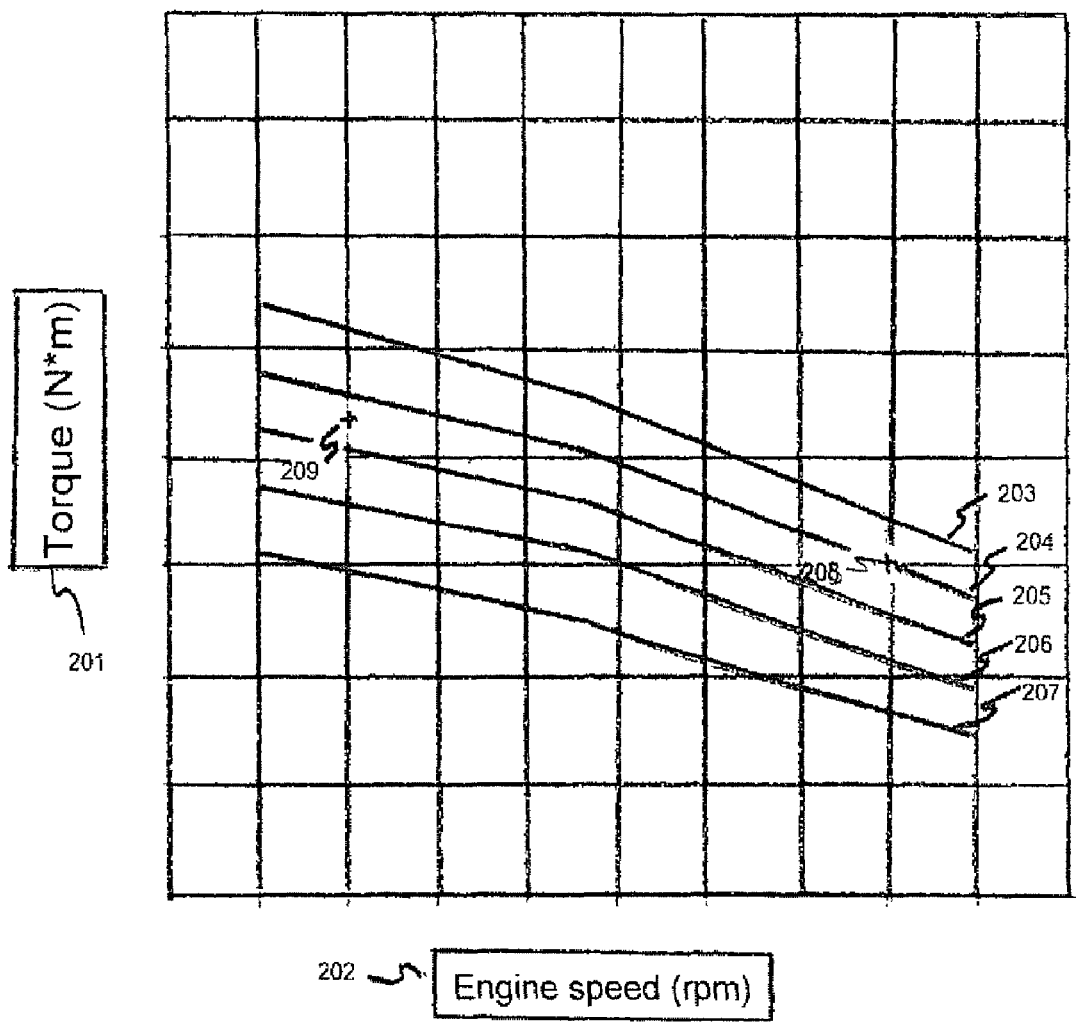
FIG. 2 is an plot of engine torque versus engine speed.

The selecting means, activating means, setting means, determining means, adjusting means, first and second measurement means mentioned above include any electronic device, computer, programmable logic controller, circuit, control system or other similar systems that can perform such functions Engine Operating Modes The following examples of control modes are based on a hypothetical locomotive having six identical engines, each engine having a power versus rpm and a torque versus rpm curves qualitatively such as a shown in FIGS. 1 and 2.

A typical engine output power 101 versus engine speed 102 plot is shown in FIG. 1. Curves 103, 104, 105, 106 and 107 represent typical maximum engine power output versus engine speed for recommended uses as often specified by the engine manufacturer. Examples of types of uses are:

service 103 where maximum power is required for periodic overloads;

high intermittent service 104 and low intermittent service 105 where maximum power and/or speed are cyclic;

continuous service 106 where power and speed are cyclic;

continuous heavy duty service 107 where the engine is operated at maximum power and speed without interruption or load cycling.

Locomotives typically operate in service where power and speed are continuous but cyclic and where the locomotive periodically requires operation at maximum overload power. A high speed operating point 108 where the output voltage of the alternator/rectifier requires no boost is shown along with a low speed operating point 109 where the output voltage of the alternator/rectifier requires a boost to continue to provide power to a DC bus.

A typical engine output torque 201 versus engine speed 202 plot is shown in FIG. 2. Curves 203, 204, 205, 206 and 207 represent the torque at the corresponding power and speeds shown by curves 103, 104, 105, 106 and 107 of FIG. 1. Torque is proportional to power divided by rotary speed and therefore decreases with increasing engine speed when output power is approximately constant. A high speed operating point 208 is shown along with a low speed operating point 209, corresponding to the operating points 108 and 109 respectively of FIG. 1.

For a locomotive utilizing multiple diesel engines, the following are examples of how diesel engines may be operated in various modes. As can be appreciated, similar operating modes may be used for other types of engines.

Examples of operating modes include:
maximum fuel efficiency mode
minimum emissions mode (whether of a substance or energy, such as noise)
a combination mode of good fuel efficiency and low emissions
maximum power mode
an optimum engine lifetime mode As can be appreciated, engines may be selected to operate in different modes at the same time. For example, some engines may be operated in a fuel efficient mode while others are operated in a low emissions mode such that, for example, the locomotive as a whole is operated at a desired overall fuel efficiency and emissions performance level.

Figure 3:
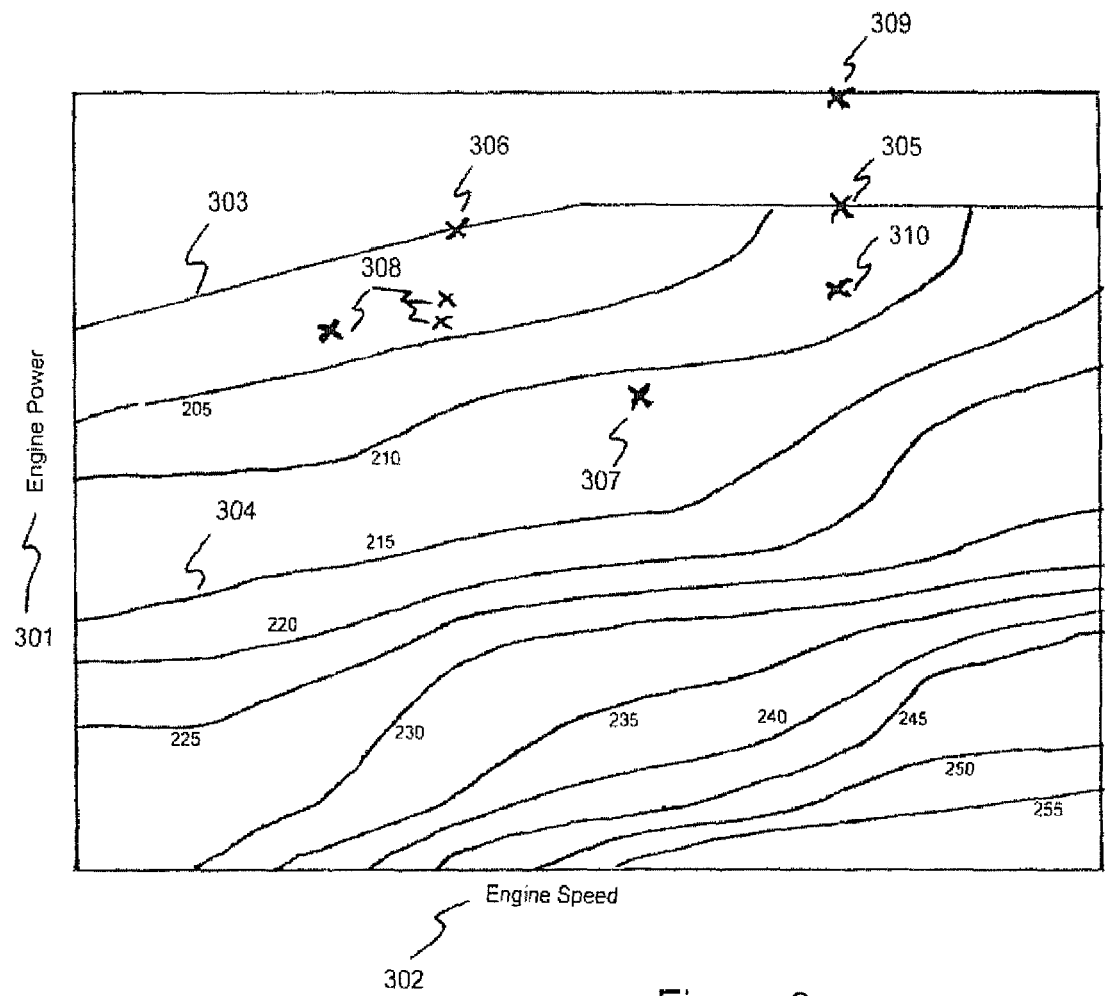
FIG. 3 is an example of a fuel map for a diesel engine.
Figure 4:
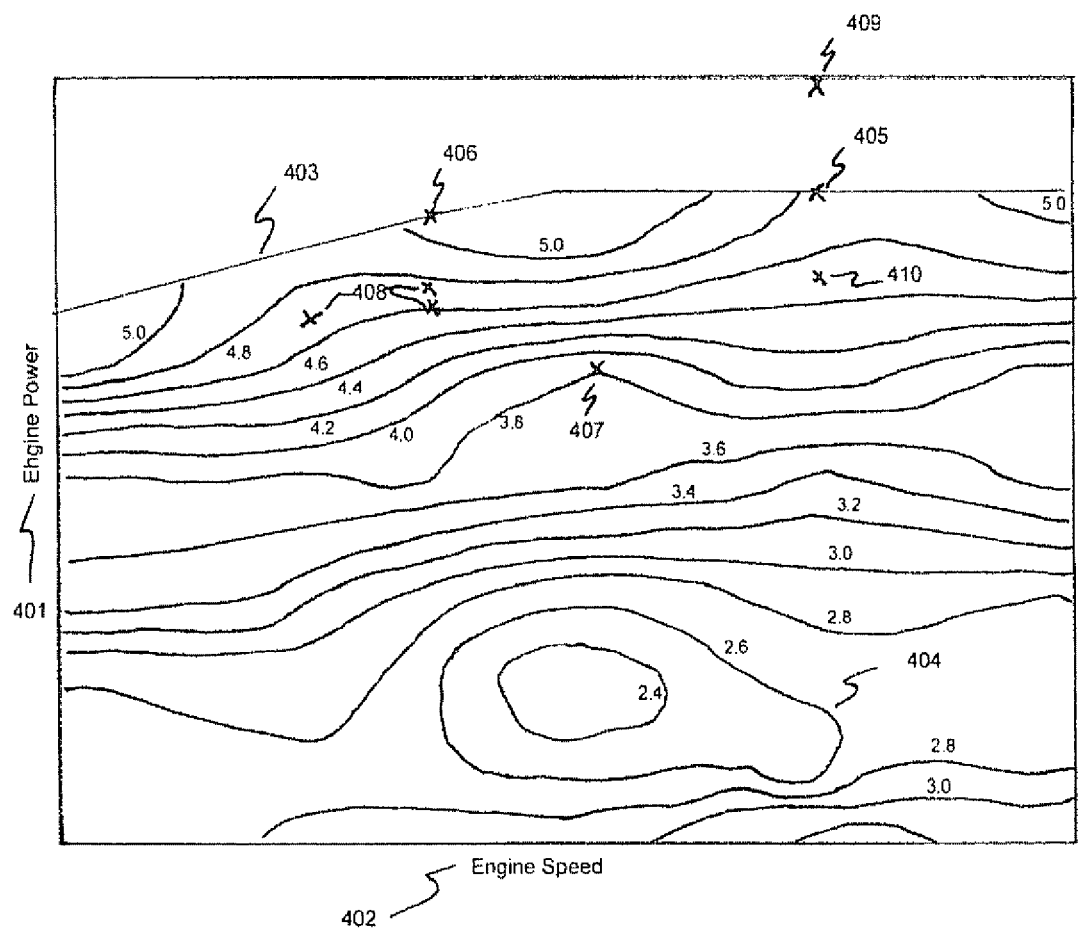
FIG. 4 is an example of an emissions map for a diesel engine.

These engines also have specific fuel consumption and emissions level maps such as shown in FIGS. 3 and 4.

A typical diesel engine fuel map is shown in FIG. 3. In this example, engine output power 301 is plotted versus engine speed 302. The power is typically in kW and the speed is typically in revolutions per minute ("rpms"). In some fuel maps, engine output torque may be plotted versus engine speed but in the present invention it is preferable to plot power versus speed. The maximum recommended power for a specific type of use (described previously in FIG. 1) available at any engine speed is shown by the power limit curve 303. Contours 304 of constant specific fuel consumption are also shown. The contours 304 are typically expressed as grams of fuel consumed per kW-hr of output energy or liters of fuel consumed per kW-hr of output energy. In the example contours shown in FIG. 3, the specific fuel consumption values of each contour are shown expressed grams of fuel consumed per kW-hr. In FIG. 3, a nominal predetermined operating point 305 is shown. A maximum fuel efficiency operating point 306 is shown where the output power and engine speed are lower than the nominal operating point. A minimum NOx emissions operating point 307 (described further in FIG. 4) is shown where the output power and engine speed are also lower than the nominal operating point and at a significantly lower power than the maximum fuel efficiency operating point 306. Operating points 308 all represent combinations of both lower specific fuel consumption and NOx emissions as compared to the nominal operating point 305. Operating point 309 is an example of increased output power at the same engine speed as the nominal operating point 305. This operating point may be selected for, for example, by the requirement for a short burst of maximum power for rapid acceleration. Typically, the control system on an engine can allow an engine to run at a higher power rating for a limited time, then will automatically derate the engine to a lower power curve after the specified time period has elapsed. Finally, operating point 310 is an example of reduced output power at the same engine speed as the nominal operating point 305 which may be selected for increasing engine lifetime. A combination of slightly increased engine speed and/or reduced operating power (as compared to the nominal operating point 305) may also be used to increase engine lifetime due to reduced internal pressures and stresses in the combustion cycle of the engine. The above illustrates an example of the use of a fuel map for determining a selected engine operating mode.

A typical NOx emissions map is shown in FIG. 4. In this example, which corresponds to the fuel map of FIG. 3, engine output power 401 is plotted versus engine speed 402. The power is typically in kW and the speed is typically in revolutions per minute ("rpms"). In some emissions maps, engine output torque may be plotted versus engine speed but in the present invention it is preferable to plot power versus speed. The maximum recommended power for a specific type of use (described previously in FIG. 1) at any engine speed is shown by the power limit curve 403 and corresponds to the limit curve 103 in FIG. 1. Contours 404 of constant specific NOx emissions are also shown. The contours 404 are typically expressed as grams of NOx emitted per kW-hr of output energy. In the example contours shown in FIG. 4, the specific NOx emission values of each contour are shown expressed grams of NOx emitted per kW-hr. In FIG. 4, a nominal predetermined operating point 405 is shown which corresponds to the nominal operating point 305 of FIG. 3. A maximum fuel efficiency operating point 406, a minimum NOx emissions operating point 407, a maximum power operating point 409 and a optimum engine lifetime operating point 410 are also shown and correspond to the maximum fuel efficiency, minimum NOx emissions, maximum power and optimum engine lifetime operating points of FIG. 3. Similarly, operating points 408 represent 20 combinations of both lower specific fuel consumption and NOx emissions compared to the nominal operating point 405.

As can be seen, both fuel and emissions maps are used to select a desired operating mode, since, in general, fuel consumption improves with decreasing engine speed with little change in NOx emissions levels, while NOx emissions can be reduced with a reduction in power but at the expense of increased fuel consumption. As can be appreciated, operating points may also be selected to minimize particulate and other emissions using similar maps relating to these emissions.

In each of the following examples, the locomotive power settings are based on a low idle setting; a high idle setting and power notch settings from 1 to 8. As can be appreciated, a locomotive may only have a single idle setting. The same operating mode strategy can be applied to a multiple engine locomotive having between two and about eight separate engines where the engines need not have the same power rating since all engines are assumed to output DC electrical power to a common DC bus (a so-called electric transmission).

Typically a diesel-electric locomotive is operated by selecting a desired power level for the locomotive. These power settings usually correspond to an idle setting or settings and eight power notch settings. Thus when an engineer selects a particular power setting, the locomotive's controller apparatus controls the engines and traction motors until the desired power to the traction motors is achieved.

Table 1 illustrates the output brake horsepower ("BHP") versus engine speed ("rpm") for a single industrial engine such as might be used for a large truck. This engine is typical for an engine having an output horsepower in the range of 600 to 700 BHP and illustrates a possible BHP versus rpm settings for use as one of a number of engines that could be used in a multi-engine locomotive.

Figure 5:
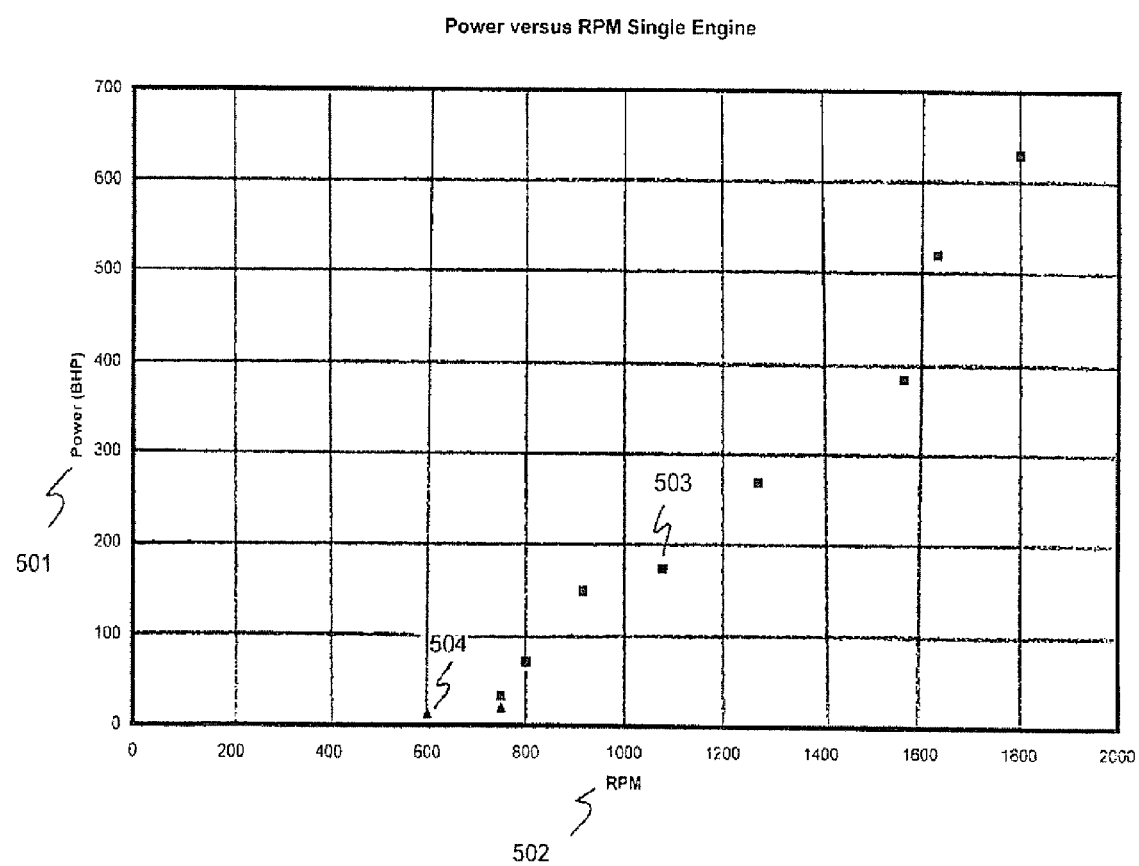
FIG. 5 is a plot of engine power versus engine speed for a single engine at a preferred condition.

FIG. 5 is a plot of engine power 501 versus engine speed 502 for a single engine at a preferred condition. The two idle settings (low idle and high idle) are represented by triangles 504. The eight notch settings are represented by squares 503. This might represent a manufacturer's recommended settings for use on a locomotive where the manufacturer has recommended performance that optimizes for example power, fuel economy and engine lifetime.

Multi-Engine Operating Options

The application of various possible operating modes for a multiple engine locomotive based on six engines is illustrated in the following discussion where these examples are based on the typical engine of Table 1. As can be appreciated, the engine of Table 1 can be operated with different combinations of power and speed, depending, for example, on the duty cycle anticipated for the engine, peak power requirements, fuel economy and emissions levels, as was discussed previously in FIGS. 1 through 4.

Figure 6:
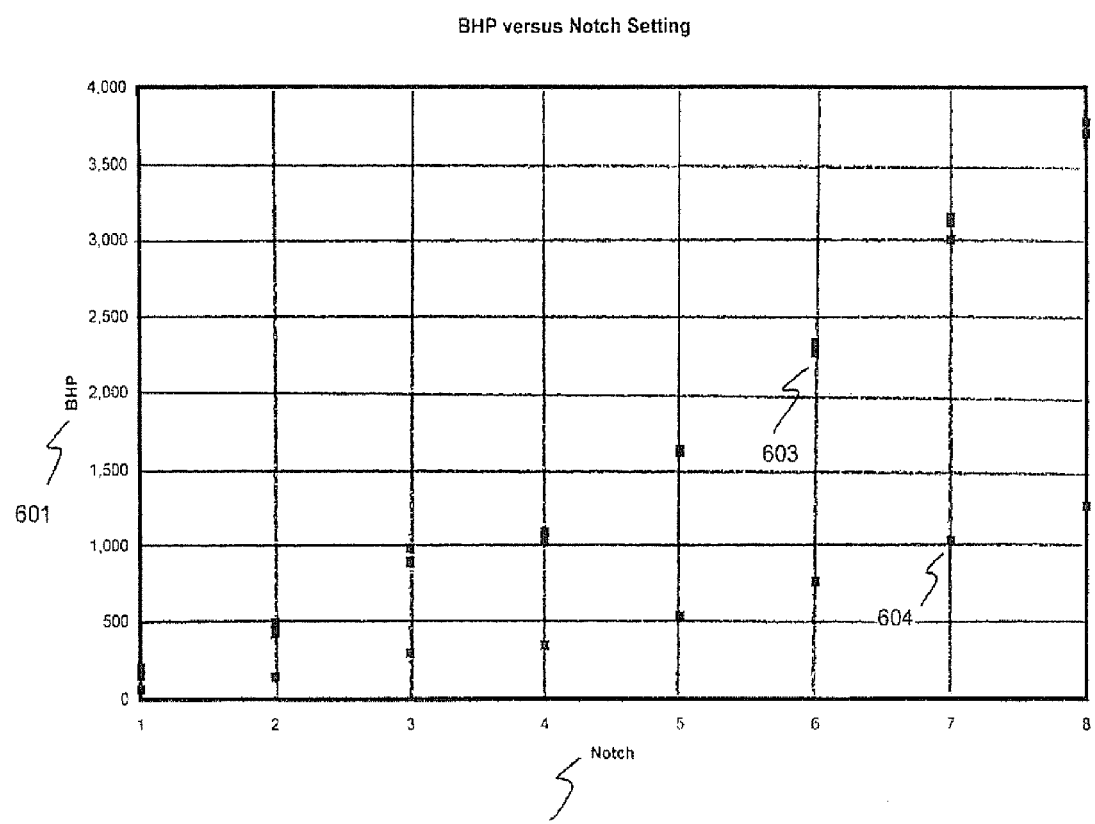
FIG. 6 is a plot of total locomotive engine power versus notch setting for a multi-engine locomotive configuration.

In a first operating mode for a multi-engine locomotive, each power setting corresponds to a preselected locomotive power level which is obtained by a set number of engines each set at the same power level and rpm for each notch setting. This is illustrated in Table 2. Table 2 shows that as notch power is increased, the number of engines required varies and the speed of all the selected engines is the same. This preset operating mode is known and has been disclosed for example in a presentation entitled "Multi-Engine GenSet Ultra Low Emissions Road-Switcher Locomotive National Railway Equipment Co.", by US EPA New England, March 2006. The plot of power versus notch setting for this preset engine schedule is shown in FIG. 6. FIG. 6 shows a plot of total locomotive output power 601 versus the eight power notch settings 602.

When a variable number of engines are activated, the engines may be operated at different power and speed settings to achieve different operating modes but the power developed at each notch setting is approximately the same and is typically specified by the locomotive owner and/or operator. Thus all the total locomotive power outputs 603 are approximately the same for the different engine operating modes. The exception is the operating mode whereby a fixed number of engines is specified and in this case the total locomotive power output is lower for the higher notch settings 604.

This simple first operating mode can present difficulties when the engineer goes back and forth in notch settings as might be done for example in yard switching operations. Engines and their associated starter motors will wear out quickly if engines are turned on and off frequently.

A procedure that would improve the wear and tear on engines that are turned on and off frequently is to include an algorithm in the controller (a PLC or computer for example) that keeps an engine in low or high idle for a selected period of time after it has been deselected (as for example when moving from notch 8 to notch 7 in the example of Table 2). A further strategy that can retain a high degree of responsiveness is to always have one unused engine idling at high idle so that when additional power is requested, the engine at high idle can be brought on-line quickly. Additionally, one of the engines at low idle can then automatically be increased to high idle to put another unused engine at the ready for additional power increases.

In a second operating mode, each power setting approximately corresponds to the preselected locomotive power level which is obtained by a set number of engines as in the first operating mode. However, in the second operating mode, the last engine selected is operated at a different power level and speed than the previously engaged engines. This is illustrated in Table 3. The plot of power versus notch setting for this preset engine schedule is approximately the same as that shown in FIG. 6. The advantage of this mode is that all but one of the engaged engines can be operated at a speed (rpm) such as for example at an optimum desired rpm as shown in Table 3.

In a third operating mode, each power setting can correspond to a preselected locomotive power level which is obtained by bringing another engine on-line as soon as the currently operating engines reach a certain percentage of their rated power. This is illustrated in Table 4. In this example, when the engines that are providing power to the DC bus exceed a certain percentage of their power rating (say about 60% to about 85%), then an additional engine is brought on line. As can be seen by comparing Table 2 and Table 4, the number of engines selected for each notch setting is different for the intermediate notch settings even though the locomotive power versus notch setting is approximately the same for both examples as shown in FIG. 6. This third operating mode is also known and has been disclosed for example in a press release entitled "French Railway Company Voies Férées Légères et Industrielles (VFLI) Puts Its Trust in Deutz Engines".

This simple third operating mode can also present difficulties when the engineer goes back and forth in notch settings as might be done for example in yard switching operations. Engines and their associated starter motors will wear out quickly if engines are turned on and off frequently. As discussed in relation to the first operating mode, a procedure that would improve the wear and tear on engines that are turned on and off frequently is to include an algorithm in the controller that keeps an engine in low or high idle for a selected period of time after it has been deselected. A further strategy that can retain a high degree of responsiveness is to always have one unused engine idling at high idle so that when additional power is requested, the engine at high idle can be brought online quickly. Additionally, one of the engines at low idle can automatically be increased to high idle to put another unused engine at the ready for additional power increases.

In a fourth operating mode, the engineer selects the number of engines to be used and that number remains unchanged until the engineer changes it. An example of this mode is illustrated in Table 5. This is a particularly practical option for moving the locomotive around a switching yard; moving the locomotive to a new location; or doing low speed switching operations (from about 0 to about 5 mph for example) where, for example, two engines can provide the required tractive effort. FIG. 6 shows a plot of total locomotive output power 601 versus the eight power notch settings 602 and illustrates this operating mode (a fixed number of engines specified) with the notch power settings 604.

In a fifth operating mode, each power setting is met by operating a selected number of engines in their most fuel efficient mode. This would be done automatically by a controller programmed to use specific fuel consumption maps such as shown in FIG. 3 for each engine and to optimize the engine's power and rpm settings to obtain the lowest fuel consumption at each power setting. An example of this is shown in Table 6.

In a sixth operating mode, each power setting is met by operating a selected number of engines in their lowest emissions mode. This would be done automatically by a controller programmed to use specific emissions output maps such as shown in FIG. 4 for each engine and to optimize the engine's power and rpm settings to obtain the minimum emissions output at each power setting. An example of this is shown in Table 7. This could be done for any number of emissions categories such as hydrocarbons (HC), carbon monoxide (CO), nitrous oxides (NOxs) and particulate material (PM) or a combination of these emissions variables.

In the present invention, the locomotive would include a control panel or computer screen that would allow the locomotive engineer to select from a number of available engine operating modes such as for example the six operating modes described above. The present invention would have available for engineer selection at least 2 operating modes and preferably 3 or more operating modes.

As can be appreciated, the engines can be operated at the same power levels and speeds (rpm)s or they can each be operated at different power levels and rpms to achieve a desired operating mode. It is noted that most of the above operating modes can be achieved for a single preselected locomotive power versus notch setting schedule.

Multi-Engine with Energy Storage Configuration

The same operating strategies can be applied to a hybrid locomotive which is comprised of several engines and an energy storage system. The following examples of control modes are based on a hypothetical locomotive having four identical engines (for example each engine may have a rated power of 600 HP), each engine having a power versus rpm and a torque versus rpm curves such as a shown in FIGS. 1 and 2 and an energy storage unit comprised of a battery pack with a rating of, for example, 1,800 amps maximum at a peak power of 450 kW (600 HP). In this example, the energy storage unit has a maximum power rating of roughly the same as the engines.

The battery pack is an instantaneous source of power and therefore can be used to provide power when the notch setting is advanced but before a new engine can be started, or an engine brought up to speed from low idle. The locomotive can be provided with a control panel that allows the engineer to use only the battery pack if for example, a momentary power surge is required and it would be inefficient to start another engine or bring another engine on-line from idle.

A possible mode of hybrid operation is shown in Table 8 which is obtained by a prescribed number of engines augmented by an energy storage battery pack for each notch setting. In the top portion of Table 8, the battery is used to power the locomotive when idling and traveling in notch 1. Engines are brought on line for higher notch settings but when the battery can supplement the power required, the battery is used in place of an additional engine. This scenario is an example of a 2,500 HP hybrid locomotive. In the event of sustained operation at any of the higher notches where the energy storage capacity of the battery pack drops below a desired state-of-charge, the locomotive may be operated at on engine power only. In this example, there is some reduction in power developed at the maximum power setting of notch 8. The power versus notch setting for this hybrid locomotive configuration would be approximately is shown in FIG. 7.

Figure 7:
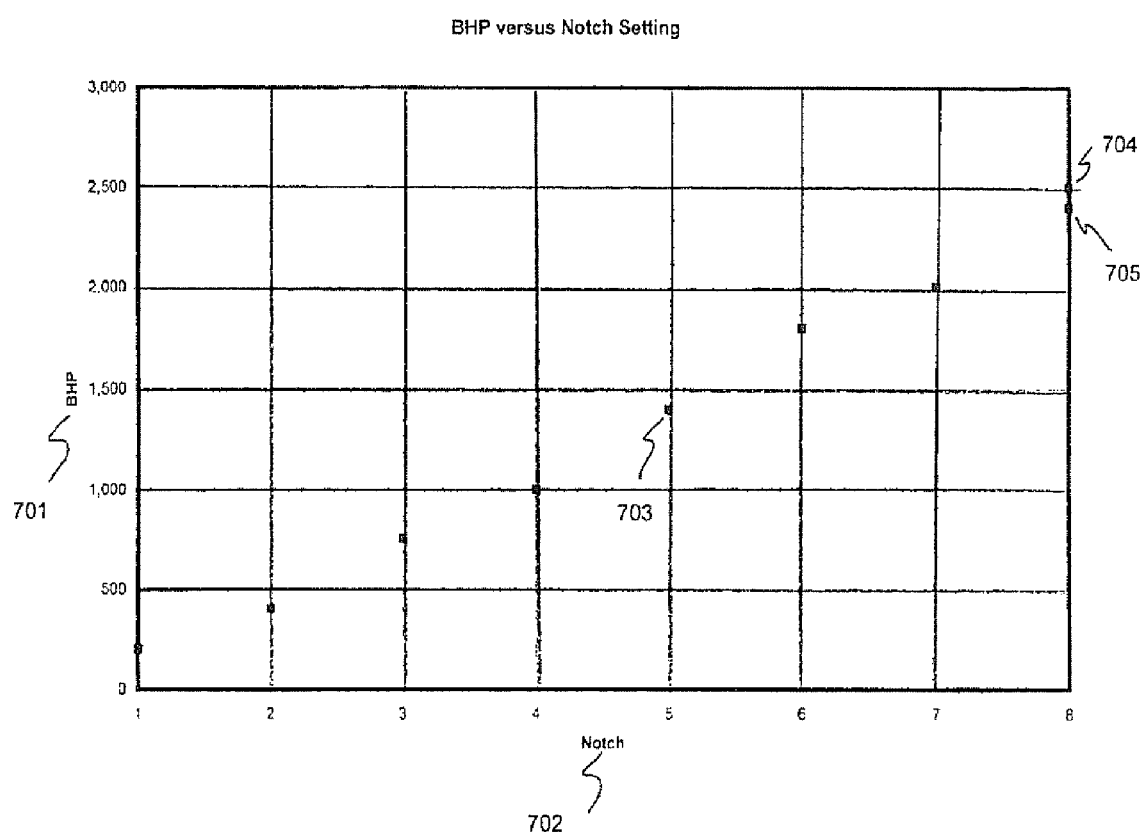
FIG. 7 is a plot of total locomotive engine power versus notch setting for a hybrid multi-engine locomotive configuration.

FIG. 7 shows a plot of total locomotive output power 701 versus the eight power notch settings 702. For either full hybrid operating mode or the low power hybrid operating mode, the total locomotive power outputs 603 703 are the same except for notch 8. In this example, the power for the full hybrid mode in notch 8 704 is slightly higher than the power developed for low power hybrid mode in notch 8 705.

Another operational strategy is to use the battery pack in a power compression role. For example, the 4 engine locomotive can be operated with 3 engines and a battery pack where the battery pack is continually charged by the remaining engine set on high idle. This mode would be effective if the locomotive were standing by for long periods of time but be required to provide a substantial power surge at low to moderate speeds.

Multi-Engine Configurations

The present inventions include multi-engine locomotive configurations where the engine systems are connected (1) in parallel to a common DC bus; (2) in series with a common DC bus; or in combinations of parallel and series. The first two configurations require different strategies to measure individual engine system output power and to ensure that each engine system is contributing the desired amount of power to the DC bus.

Parallel Configuration

Figure 8:
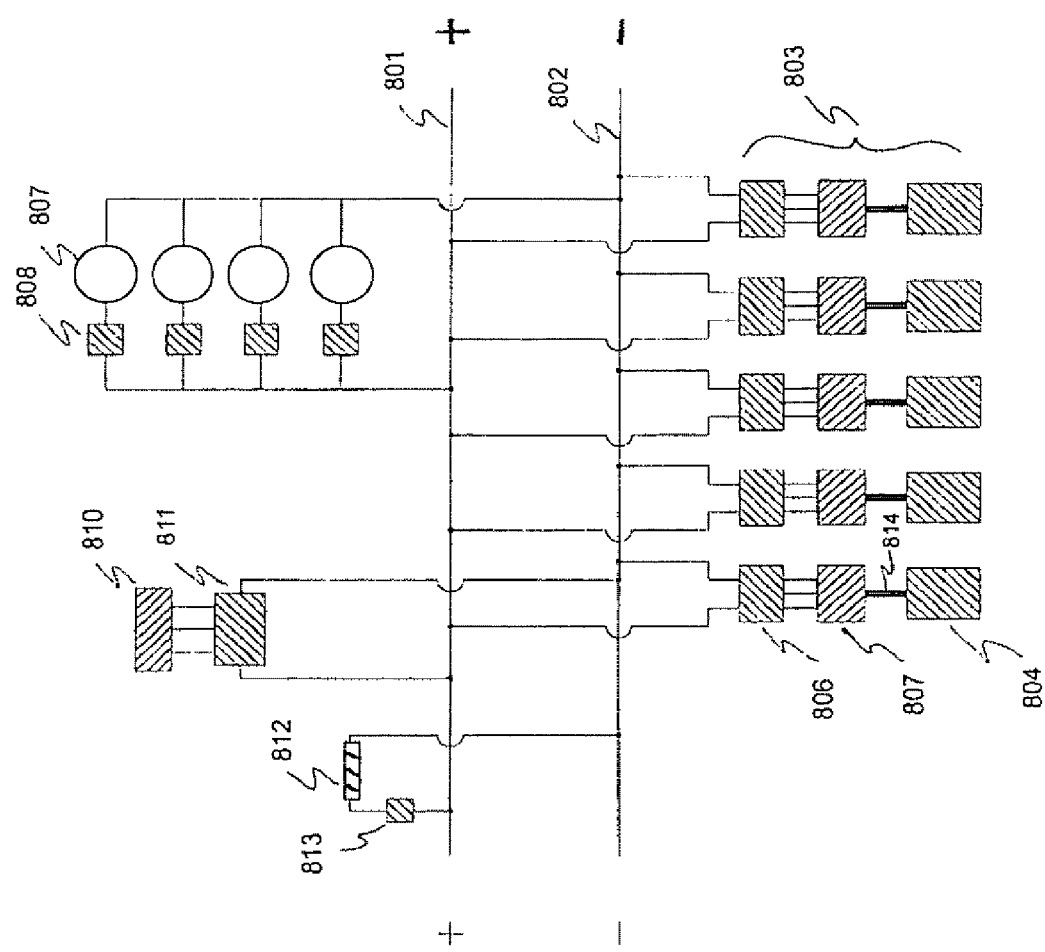
FIG. 8 is a schematic of the principal propulsion components of a locomotive with multiple prime power sources in parallel.

In parallel configuration, the output voltage of an engine system providing power to the DC bus is very close to the voltage measured on the DC bus, If, for example, the output voltage of an engine system is just below bus voltage then that engine system will not provide any power to the DC bus. However, a measurement of the output current of an engine system is a sensitive and direct measurement of the engine system's power output and is the preferred method of determining engine system output power. An engine system's output power is its output current times the DC bus voltage. In parallel configurations, the general method of ensuring the desired engine system output power is then:

- set the desired DC bus voltage or bus voltage range and measure the DC bus voltage
- for each engine system, measure its output current and use this to determine its output power (engine system current times DC bus voltage)
- if the engine system is not outputting the desired power, adjust an engine system electrical or mechanical parameter to produce desired engine system output current and hence power FIG. 8 is a schematic of the principal propulsion components of a locomotive showing an example of five engine systems 803 connected in parallel to a DC bus represented by bus bars 801 and 802 to provide power to four traction motors 807 each individually controlled through its own power control device 808. If the traction motors are AC motors, the power control devices are inverters. If the traction motors are DC motors, the power control devices are choppers. The same principles can be applied to any number of engines in the range of two engines to about eight engines. Eight engines could in principle correspond to the eight notches of power control typically used in many locomotives. This example illustrates how a number of smaller engines which may have highly developed efficiency and emission controls can be used in place of a single large 20 engine. In this example, four traction motors are used but, as can be appreciated, the number and type of drive motors is independent of the number and type of power supplies. The DC bus also provides power to an auxiliary power system 810 through a buck or boost circuit 811. Also shown is an optional dynamic braking system comprised of a power dissipating resistor grid 812 controlled by a switch 813. Each engine 804 is shown has its mechanical shaft power converted to DC electrical output by an alternator 805 whose AC output is converted to DC output by a rectifier 806 which, in turn, is connected to the DC bus. An engine system 803 is comprised of an engine 804 its mechanical output shaft 814 which drives its corresponding alternator 805 and rectifier 806. The voltage levels and power outputs of the engine systems are controlled independently by their individual electrical (alternator excitation for example) or mechanical (fuel supply control for example) means incorporated in their engine systems.

The rectifiers are commonly comprised of blocking diodes to prevent reverse power flow from the DC bus when the DC output voltage of a particular engine system is less than the voltage across the DC bus. As can be seen, the voltage across the DC bus is established by the engine system or systems with the highest DC output voltage to the bus. Engine systems with lower output DC voltages than the voltage across the bus will not provide power to the bus and will not receive power from the bus because of the blocking diodes contained in their rectifiers. Thus, by controlling the output voltage of any engine system by its particular electrical or mechanical control means, that engine system can be brought on-line to supply power to the DC bus. In this example, the DC bus supplies power to a load control apparatuses 808 which control the level of power to each of the four traction motors 807. The bus provides a power capacity at in a predetermined voltage range and the load control apparatuses 808 control the current flows in each traction motor 807, and hence the power level, to the motors 807. The traction motors 807 may be, for example, AC induction motors, DC motors, permanent magnet motors or switched reluctance motors. If the traction motors are AC motors, power is controlled by means of one or more inverters connected to the DC bus.

Alternately, if the traction motors are a DC motors, power is controlled by means of one or more chopper circuits connected to the DC bus. In the example shown in FIG. 8, each traction motor has its own load control apparatus Although not shown here, locomotives may be configured with a single load control apparatus to control all of the traction motors.

Figure 9:
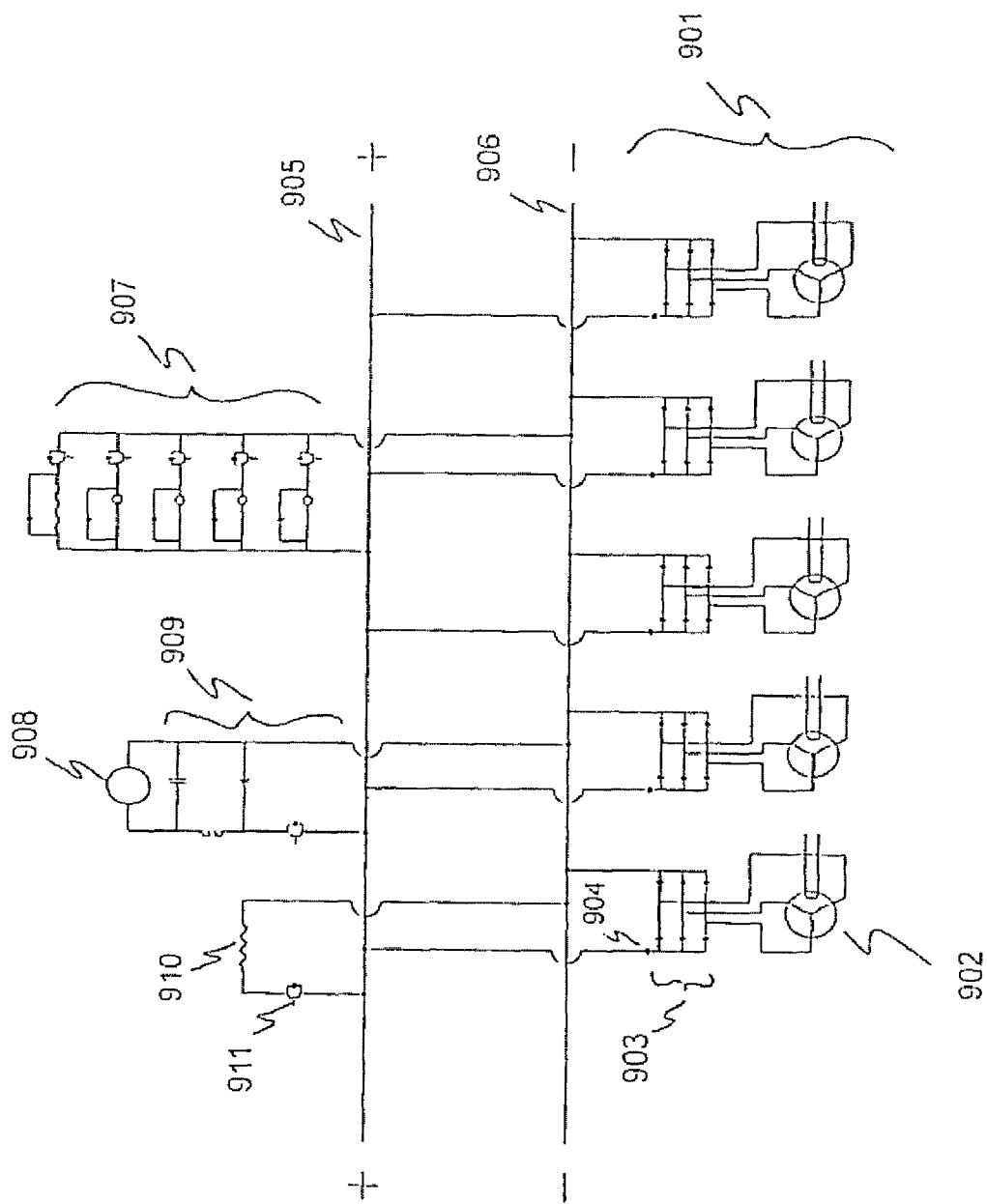
FIG. 9 is an example of the overall electrical schematic of a multi-engine locomotive power system with multiple engines in parallel.

FIG. 9 is an example of the overall electrical schematic of a multi-engine locomotive with five engine systems 901 connected in parallel to a DC bus. The engines are all shown with wound rotor alternators 902 and rectifiers 903 although the engine systems may be of different sizes and types and the alternators may be permanent magnet machines, asynchronous alternators such as induction alternators, DC generators, or switched reluctance generators. The output DC current from each prime power system is measured by its own individual current sensor 904. These five prime power systems are the principal power sources providing power to a DC bus shown by conductors 905 and 906.

The circuit of FIG. 9 also includes a propulsion system 907 shown here with four traction motors, an auxiliary power system 908 with its voltage control circuit 909. The circuit also includes a resistive grid 910 and switch 911 that provides a dynamic braking capability. This locomotive power circuit is an example of a multi-prime power source locomotive with regenerative braking capability that could be used, for example, as a road switcher. A similar electrical architecture for a multi-engine locomotive was disclosed previously in U.S. patent application Ser. No. 11/200,881 filed Aug. 9, 2005 entitled "Locomotive Power Train Architecture".

Control and Balancing of Multi-Engine in Parallel

Figure 10:
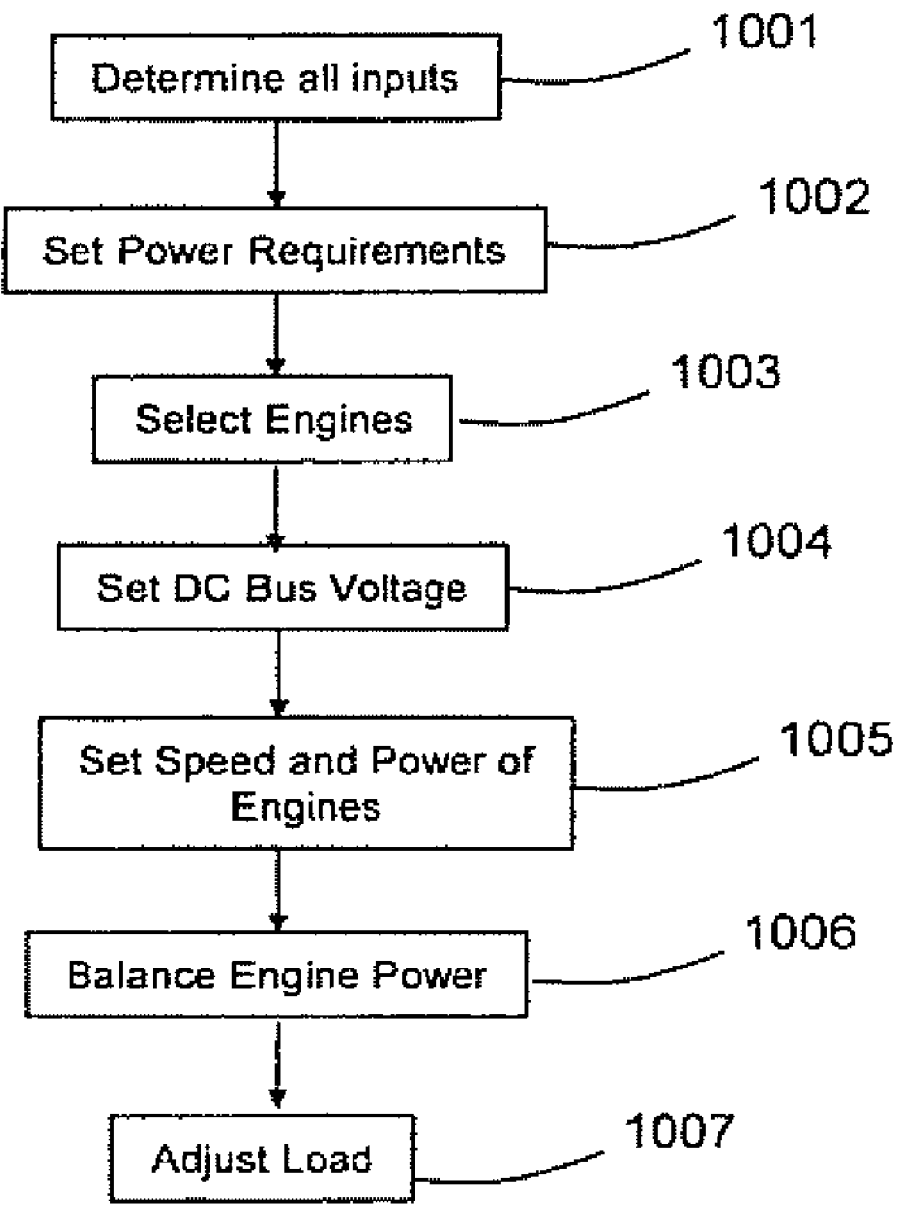
FIG. 10 is an overview flowchart showing the primary steps in a multi-engine control loop with multiple engines in parallel.

FIG. 10 is an overview flowchart showing the primary steps in a multi-engine control loop with multiple engines in parallel. In FIG. 10, step 1001 determines all the inputs required to set locomotive power requirements, select engines, set the DC bus voltage, sets the power and speed of the engines, balance the flow of power from the engines and adjust the load if load control is available. Step 1002 is where the power requirements for the locomotive are established depending on a number of variables determined in step 1001. In step 1003, engines are selected. This includes the number of engines, the specific engines, which engines need to be activated for future use and which engines can be deactivated. In step 1004, the DC bus voltage is selected. A specific operating voltage is selected for the load control embodiment. The DC bus voltage is not determined in the embodiment which has no load control. In step 1005, the power and speed (rpms) of each engine is set based on the power requirements and engine operating mode determined in step 1002. In step 1006, the power outputs of all engines are measured by measuring current output from each alternator/rectifier systems. In this step, the power outputs are balanced so that each engine is contributing its pro rata share of the output power. This step is more preferably accomplished by adjusting excitation current to achieve the required alternator/rectifier output current. This step may also be accomplished by adjusting engine speed (rpms) to achieve the required alternator/rectifier output current. This step is may alternately be accomplished by adjusting engine fuel rate control. Finally, in step 1007, the load is adjusted if load control is used. In this step the power to the load is adjusted to equal the power available from the DC bus. This is accomplished for example by choppers which regulate DC traction motors or inverters which regulate AC motors.

Figure 11:
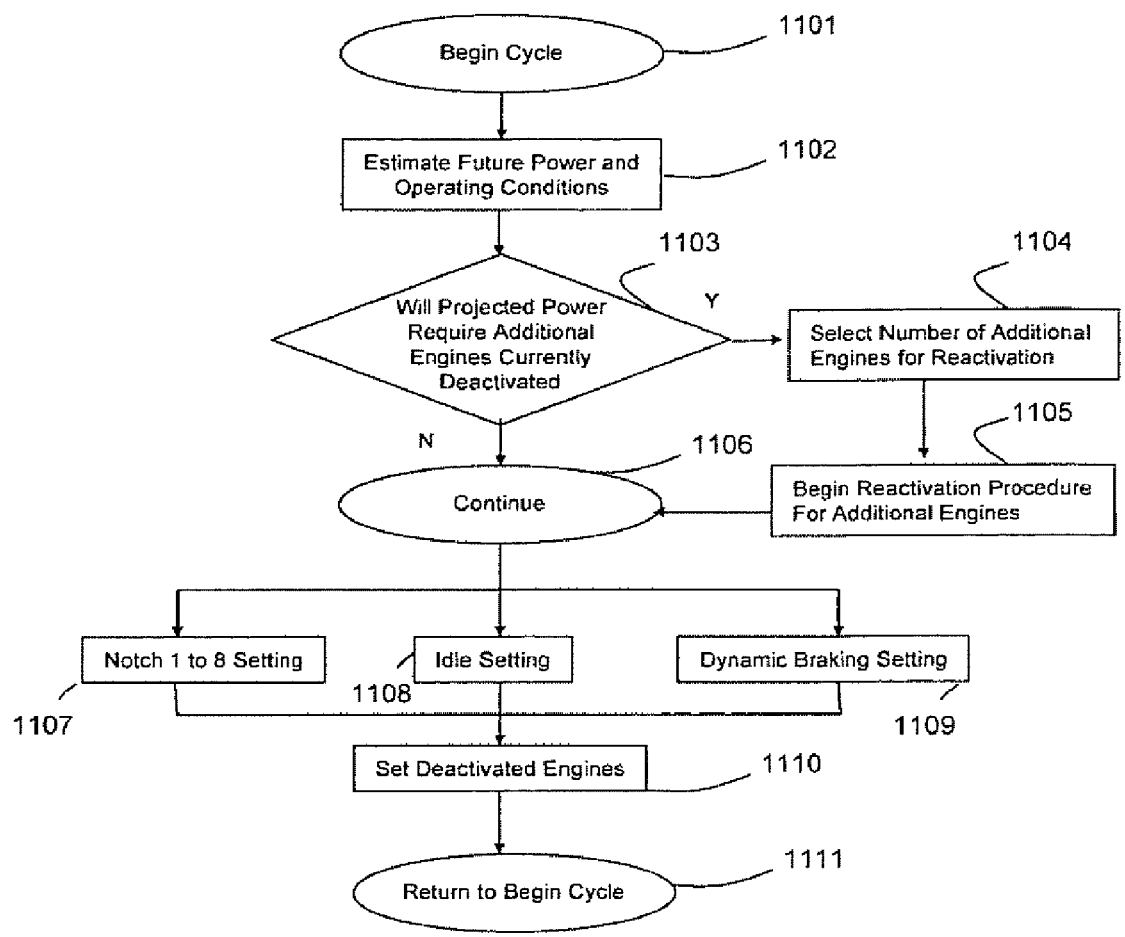
FIG. 11 is an example of a main flow chart of automated decision making for controlling the overall multi-engine selection process with multiple engines in parallel.

FIG. 11 is an example of a main flow chart of automated decision making for controlling the overall multi-engine selection operating and balancing process with multiple engines in parallel. This cycle of decisions can be executed continuously (for example every millisecond) or intermittently (for example every 1 second) or at intervals in between by a predetermined computer program or by a computer program that adapts, such as for example, a program based on neural network principles. As can be appreciated, many of the steps can be carried out in different sequences and some of the steps may be optional.

As is common practice, the choices of applying traction power, applying dynamic braking or operating the locomotive at idle to supply auxiliary power are made by the locomotive engineer or operator utilizing controls in the cab, or via a remote-control or equivalent system when, for example, in a switch yard.

As shown in the example of FIG. 11, an automated cycle begins 1101. The first step 1102 is to estimate the power requirements and operating mode of the locomotive. In step 1103, the requirement for additional engines currently deactivated is established from step 1102. If additional engines are required, then the number of currently deactivated engines that must be activated is determined in step 1104. This engine activation step is described more fully in FIG. 17. The engine activation procedure is implemented in step 1105 and the cycle then continues 1106. As noted above, the locomotive operating mode is commonly set by the locomotive's engineer. These are (1) a notch 1 to 8 power setting 1107, (2) an idle setting 1108, or (3) a dynamic braking setting 1109. For each of three power modes, it is possible that one or more engines may be deactivated. Deactivation means idling an engine so that it does not provide power to the DC bus, or shutting off the engine. The deactivation of engines is controlled in step 1110. Step 1111 returns to the beginning of the main control cycle.

Figure 12:
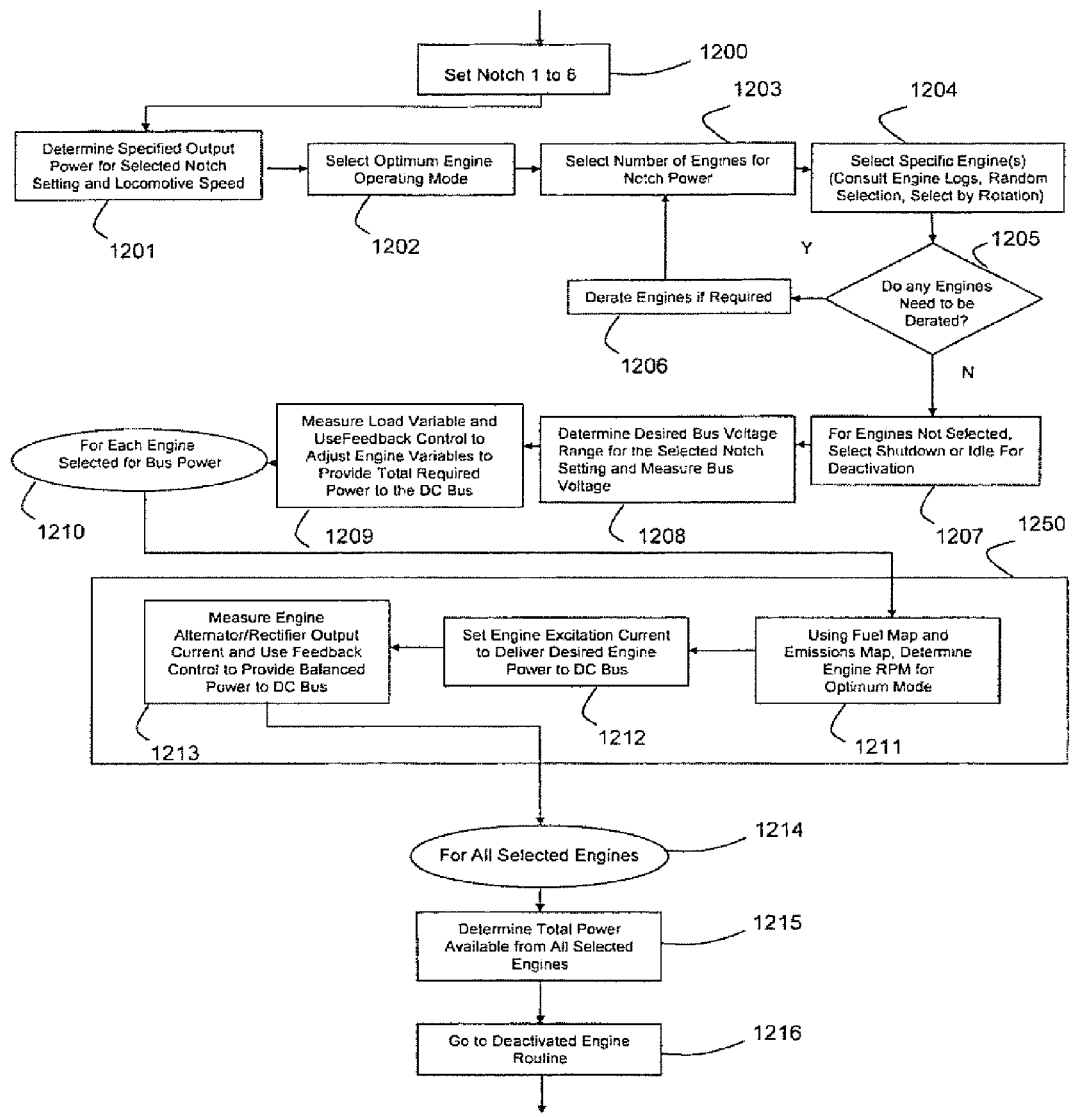
FIG. 12 is an example of a flow chart for selecting and configuring engines for any of the notch 1 to 8 power settings with no load control with multiple engines in parallel.

FIG. 12 is an example of a flow chart for selecting and configuring engines for any of the notch 1 to 8 power settings 1200 with no load control with multiple engines in parallel, FIG. 12 shows an example of a flow chart for automated selection and configuration of engines for any of the notch 1 to 8 power settings 1200. This figure illustrates the process for a locomotive that does not have an independent means of load control. That is, the traction motors may be able to consume more power than the engines can provide, depending on engine alternator excitation settings and traction motor volts which are a function of locomotive speed. The first step 1201 is to determine the power associated with the notch number selected by the engineer and to determine the locomotive speed. The latter can be determined from a number of well-known means such as for example by a speedometer, by measuring axle rpms, by using a radar system and the like. Each notch number is typically associated with a predetermined power level at each locomotive speed, notch 1 being the lowest power setting and notch 8 being the highest power setting. As can be appreciated, the power level associated with each notch setting can be varied from time to time by reprogramming an on-board computer.

The next step 1202 is to determine the desired engine operating mode. Examples of operating modes, which were previously illustrated in FIGS. 3 and 4, include a maximum fuel efficiency mode, a minimum emissions mode, a combination mode of good fuel efficiency and low emissions, an optimum engine lifetime mode, and a maximum power mode. The choice may be determined by the engineer or by a predetermined algorithm based on data from the locomotive's route location and requirements for the zone in which the locomotive or consist member is operating.

The next step 1203 is to determine the number of engines operative to provide power to the DC bus. Step 1203 may be carried out by an algorithm controlled by an onboard computer. It may also be based on a predetermined lookup table which associates each notch, each appropriate locomotive speed range and its various operating modes with an operating point such as described in FIGS. 3 and 4. It is also possible that, at some notch settings, all but one of the engines can be set at or near the selected operating points and the all but one engine can be used to balance out the total selected notch power by being set at a non-optimum operating point. Alternately, the all but one engine can be used to balance out the total selected notch power by using its alternator voltage boost to independently control its output voltage and thus can also be set at a its optimum operating point. This provides a degree of control over power output and operating points that is not available with a single large engine. A single large engine can be set at only one power and speed setting and often has to trade off better fuel economy for low emissions. In a multiple engine locomotive, all but one of the power-producing engines (or all when alternator boost is available) can be tuned to optimize power, fuel consumption and emissions and often the one engine can be operated near its optimum operating point. In the step 1203 where all the engines are the same, selection of the number of engines operative to provide power to the DC bus is typically done by dividing the power requirement determined in step 1201 by the power rating of the engines and rounding the resulting number upwards. In the case where there are engines of differing power ratings, the selection algorithm may be more involved so as to balance the power contribution from each engine. In either case, the algorithm that selects the number of engines may consider the operating history of the engines, as indicated by step 1204, so as to avoid using some engines more than others and thereby approximately balancing the usage and maintenance period of the engines. An engine log typically contains information on engine usage (hours, fuel consumption, lubricant consumption, total rpms, megawatt-hours, hours in idle modes, hours in the various notch settings and hours in dynamic braking and the like) and maintenance history. Although less preferable than consulting an engine log, the selection algorithm may be engine selection by a random number between one and the number of available engines, which, over time, should tend to even out engine usage. The selection algorithm may be engine selection by rotation to the next engine in an engine sequence which, over time, should also tend to even out engine usage. In the next step 1205, a selected engine may need to be derated. For example, the selected engine may have one or more cylinders operating at less than optimum rating, the engine's control system may automatically derate the engine to a lower power after a specified time period of operating at a higher-than-normal power rating or any number of other well-known reasons for derating engine performance. If an engine is required to be derated 1206, then the procedure returns to step 1203 to re-select the number of engines since the derated engine may require an additional engine to provide the requested power. In the next step 1207, the engines not selected for providing power to the DC bus are identified for deactivation and may be selected to be idled or shut down to be deactivated. This deactivation procedure is controlled in step 1113 of the main flow chart (FIG. 11) and fully described in FIG. 16.

In the next step 1208, the DC bus voltage is measured and compared with the selected range for the DC bus voltage for that notch setting. As the power consumed by the load (traction motors) increases beyond the optimum engine power capacity, the engine speeds will begin to decrease. In step 1209, typically a load variable such as total load current or torque is measured and used in a first control feedback loop to increase engine speeds by decreasing their alternator excitation currents which tends to decrease alternator output voltages. As this occurs for all the engines, the DC bus voltage drops, reducing the power to the load by reducing motor voltage until the total engine power output matches the power required by the load. This is a stable feedback process commonly carried out automatically for each engine by one of a number of well-known proportional integral differential ("PID") control algorithms. Thus, the DC bus voltage may be highly variable, typically ranging from near zero volts to well over 1,000 volts. The next step 1210 begins an internal control loop 1250 for each engine to obtain a balanced power flow from each engine. Each engine has a fuel map which is typically a plot of engine power or torque versus engine rpms for various contours of constant specific fuel consumption, and an emissions map which is typically a plot of engine power or torque versus engine rpms for various contours of constant specific NOx emissions. As can be appreciated, there may be additional emissions maps for hydrocarbons and particulate matter and the like. In step 1211, the rpms of the selected engine is determined so as to produce the required power at the specific fuel consumption and emissions rate corresponding to the operating mode selected in step 1202. In step 1212, the excitation current for the alternator of each engine is selected to provide an alternator output voltage to fall within the range of the DC bus voltage measured in step 1208. When available, the amount of alternator boost may also be used to generate output voltage to fall within the range of the DC bus voltage measured in step 1208. This latter capability may be useful for example when an engine is derated or when an engine is operated at a lower power and rpm so that the engine may continue to supply power to the DC bus by having independent control over its alternator output voltage.

Step 1213 is a step where the current is measured at the output of each alternator's rectifier. This current, which is at the DC bus voltage, is a direct measure of the power flowing from the selected engine. An output current measurement is a sensitive and direct measure of power output of the alternator/rectifier apparatus to the DC bus. The measured current is used in a second control feedback loop to modify the engine's alternator excitation current to bring the engine's power contribution into balance with its pro rata portion of the total power to the DC bus. In the case where all engines are set to the same output power, each engine is balanced to deliver the same amount of power as the other engines to within a predetermined tolerance, preferably in the range of about ±5%. This second control feedback loop is designed to be a stable feedback process commonly carried out automatically for each engine by one of a number of well-known proportional integral differential ("PID") control algorithms.

The next step 1214 is executed for all engines after all engines have been balanced via internal control loop 1250. In step 1215, the total power from all engines to the DC bus is determined, preferably by measuring the currents at the output of each alternator's rectifier and multiplying the sum by the measured DC bus voltage. Once the allocation of power to the traction motors is determined 1215, the algorithm proceeds to the engine deactivation control loop 1216.

Figure 13:
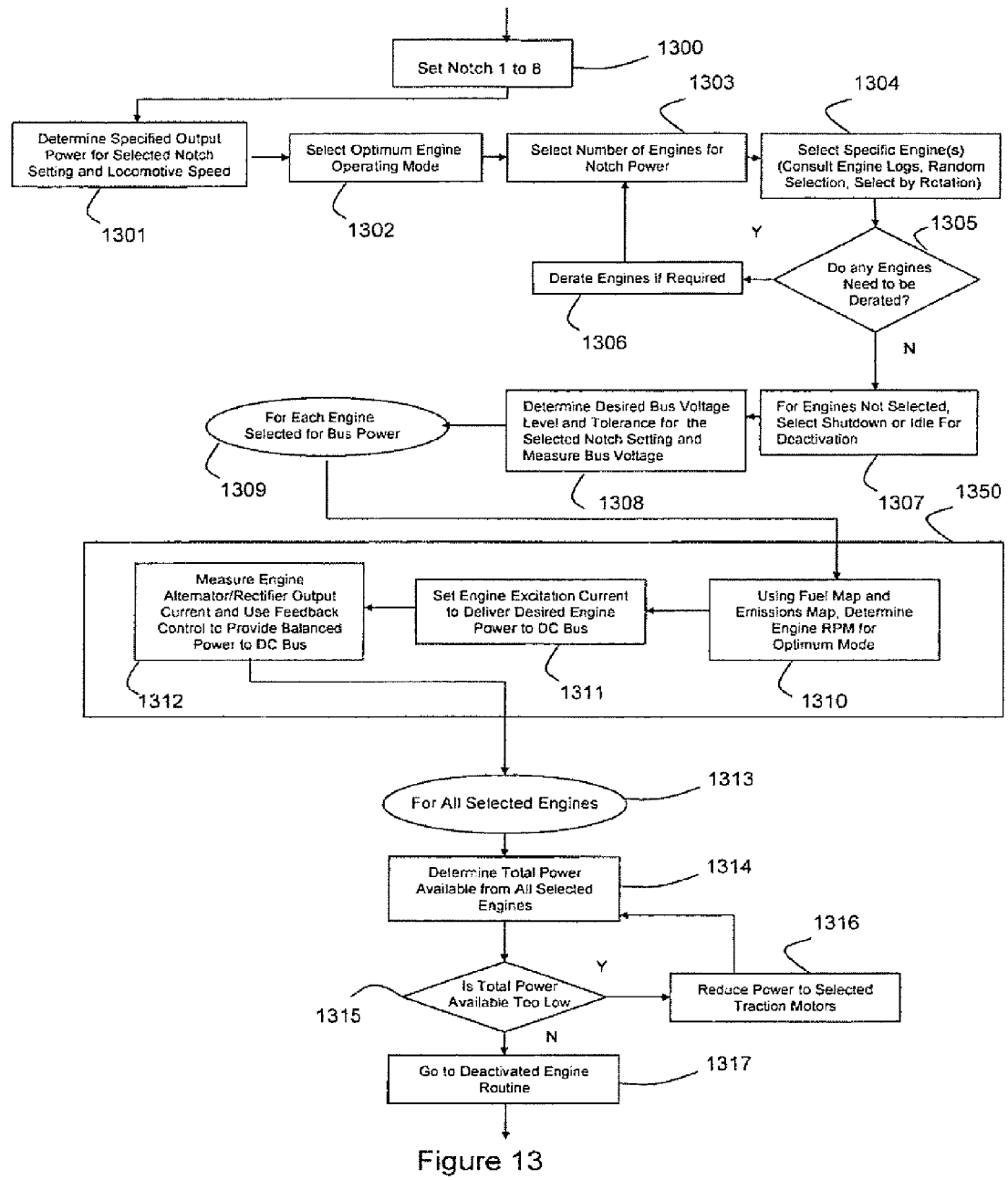
FIG. 13 is an example of a flow chart for selecting and configuring engines for any of the notch 1 to 8 power settings with load control with multiple engines in parallel.

FIG. 13 is an example of a flow chart for selecting and configuring engines for any of the notch 1 to 8 power settings 1300 with load control with multiple engines in parallel. This figure illustrates the process for a locomotive that has an independent means of load control which is a preferred embodiment. That is, the power distributed to the traction motors is controlled independently such that the total power distributed to the load is controlled independently to match the power available from the engines. This may be done for example by using one or more choppers at the output of the DC bus to DC traction motors, or by using one or more inverters at the output of the DC bus to AC traction motors.

The first step 1301 is to determine the power associated with the notch number selected by the engineer and to determine the locomotive speed. As can be appreciated, the power level associated with each notch setting can be varied from time to time by reprogramming an on-board computer. The next step 1302 is to determine the desired engine operating mode. Examples of operating modes are described in the discussion of FIG. 12. The choice may be determined by the engineer or by a predetermined algorithm based on data from the locomotive's route location and requirements for the zone in which the locomotive or consist member is operating.

The next step 1303 is to determine the number of engines operative to provide power to the DC bus. Step 1303 may be carried out by an algorithm controlled by an onboard computer. It may also be based on a predetermined lookup table which associates each notch, each appropriate locomotive speed range and its various operating modes with an operating point such as described in FIGS. 3 and 4. It is also possible as described previously that, at some notch settings, all but one of the engines can be set at or near the selected operating points and one engine can be used to balance out the total selected notch power by being set at a non-optimum operating point. In the step 1303 where all the engines are the same, selection of the number of engines operative to provide power to the DC bus is typically done by dividing the power requirement determined in step 1301 by the power rating of the engines and rounding the resulting number upwards, In the case where there are engines of differing power ratings, the selection algorithm may be more involved so as to balance the power contribution from each engine. In either case, the algorithm that selects the number of engines may consider the operating history of the engines, as indicated by step 1304, so as to avoid using some engines more than others and thereby approximately balancing the usage and maintenance period of the engines. Although less preferable than consulting an engine log, the selection algorithm may be engine selection by random number between one and the number of available engines, which, over time, should tend to even out engine usage.

The selection algorithm may be engine selection by rotation to the next engine in an engine sequence which, over time, should also tend to even out engine usage. In the next step 1305, a selected engine may need to be derated. If an engine is required to be derated 1306, then the procedure returns to step 1303 to re-select the number of engines since the derated engine may require an additional engine to provide the required notch power. In the next step 1307, the engines not selected for providing power to the DC bus are identified for deactivation and may be selected to be idled or shut down to be deactivated.

Figure 16:
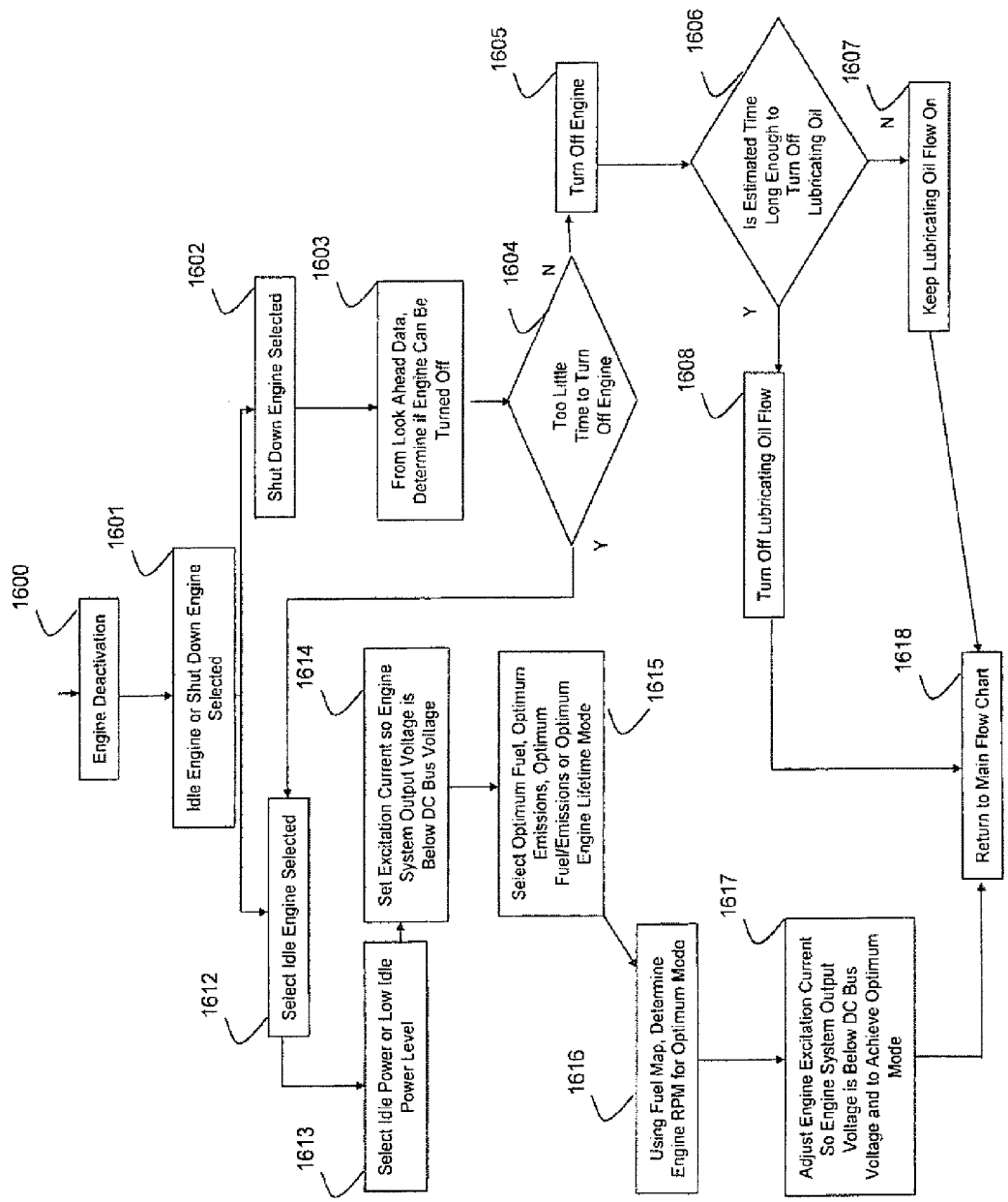
FIG. 16 is an example of a flow chart for controlling engine deactivation with multiple engines in parallel.

This deactivation procedure is controlled in step 1113 of the main flow chart (FIG. 11) and fully described in FIG. 16.

In the preferred load control embodiment, the next step 1308 is to measure the DC bus voltage and set the desired nominal value and range for the DC bus voltage. The range is preferably ±75 volts from the nominal DC bus voltage, more preferably ±50 volts from the nominal DC bus voltage, and most preferably ±25 volts from the nominal DC bus voltage. This voltage may be set at a different predetermined nominal value for each notch setting, or at a predetermined nominal value for a range of notch settings, or at the same predetermined nominal value for all notch settings.

The next step 1309 begins an internal control loop 1350 for each engine to obtain a balanced power flow from each engine. Each engine has a fuel map and an emissions map or maps. In step 1310, the rpms of the selected engine is determined so as to produce the required power at the specific fuel consumption and emissions rate corresponding to the operating mode selected in step 1302. In step 1311, the excitation current for the alternator of each engine is selected to provide an alternator output voltage to match the selected DC bus voltage. Step 1312 is a step where the current is measured at the output of each alternator's rectifier. This current which is at the DC bus voltage is a direct measure of the power flowing from the selected engine. An output current measurement is a sensitive and direct measure of power output of the alternator/rectifier apparatus to the DC bus. The measured current is used in a control feedback loop to modify the engine's alternator excitation current to bring the engine's power contribution into balance with its pro rata portion of the total power to the DC bus. In the case where all engines are set to the same output power, each engine is balanced to deliver the same amount of power as the other engines within a predetermined tolerance, preferably about ±5%. This control feedback loop is designed to be a stable feedback process commonly carried out automatically for each engine by one of a number of well-known proportional integral differential ("PID") control algorithms.

The next step 1313 is executed for all engines after all engines have been set via internal control loop 1350. In step 1314, the total power from all engines to the DC bus is determined, preferably by measuring the currents at the output of each alternator's rectifier and multiplying the sum by the measured DC bus voltage. If the total power is too low 1315 to provide the required power to the traction motors, then the power to selected traction motors is reduced 1316 to the amount of power available from the DC bus. This power reduction can be made equal to all traction motors or can be allocated based on an algorithm that considers each powered wheel-set separately. The latter is an available strategy if each traction motor has its own power control apparatus (such as a chopper circuit for each DC traction motor or an inverter for each AC traction motor).

Power may be selectively reduced for example on the leading wheel set in wet conditions. Once the allocation of power to the traction motors is determined 1314, the algorithm proceeds to the engine deactivation control loop 1317.

In a locomotive without an independent means of load control, if the engine power is too low to provide the required power to the traction motors, then (1) the engine power may be adjusted upwards or (2) the power to traction motors may be reduced by lowering the alternator excitation current until the alternator output voltage matches the traction motor voltage. In the preferred multi-engine locomotive control means of the present invention, if the total power from the engines is too low to provide the required power to the traction motors, then preferably the power to traction motors is reduced by a small amount to equal the power available. Alternately, another engine may be added to provide the necessary power in all but the highest notch setting. At the highest notch setting, it is still possible to increase the power output of one or more engines for periodic overloads. Thus, the control and balancing of output power from the engines can always be separately adjusted from the load power requirements of the traction motors by controlling a predetermined maximum load on the engines.

Figure 14:
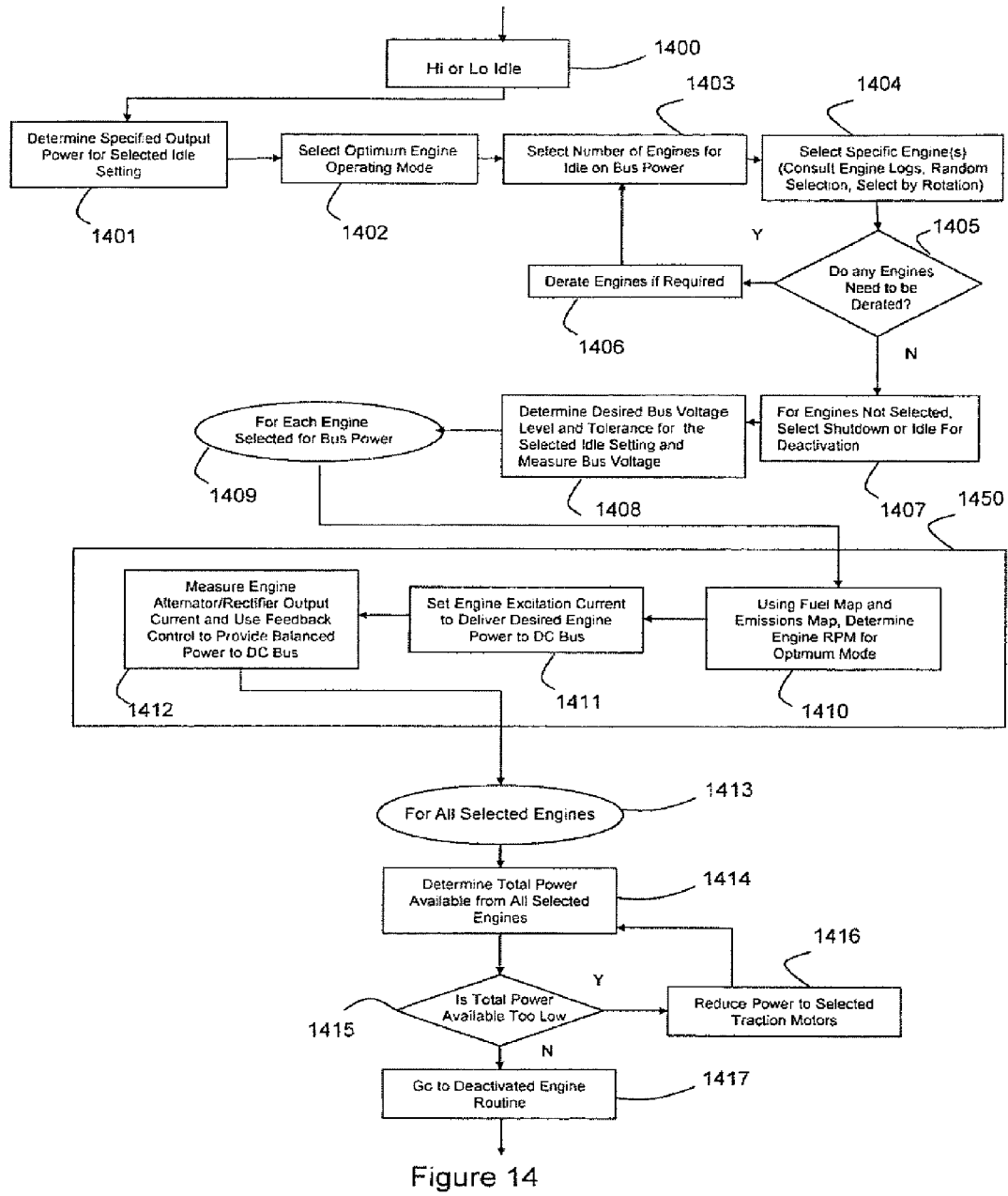
FIG. 14 is an example of a flow chart for selecting and configuring engines for any of number of idle settings with multiple engines in parallel.

FIG. 14 shows an example of a flow chart for automated selection and configuration of multiple engines in parallel for any of number of idle settings 1400.

Typically, a locomotive has a high idle and a low idle setting. The latter may be used, for example, to minimize fuel consumption for long periods of idle. This figure illustrates the process for a locomotive that has an independent means of load control similar to that described in FIG. 13, which is a preferred embodiment. As can be appreciated, the process can be modified for a locomotive that does not have an independent means of load control such as described in FIG. 12. The next step 1402 is to determine the desired engine operating mode. Examples of operating modes are described in the discussion of FIG. 12. The choice may be determined by the engineer or by a predetermined algorithm based on data from the locomotive's route location and requirements for the zone in which the locomotive or consist member is operating. The next step 1403 is to determine the number of engines operative to idle and provide power to the DC bus. Step 1403 may be carried out by an algorithm controlled by an on-board computer. It may also be based on a predetermined lookup table which associates each idle setting and its various operating modes with an operating point such as described in FIGS. 3 and 4. It is also possible that, at some idle settings, all but one of the engines can be set at or near the selected operating points and the all but one engine can be used to balance out the total selected idle power by being set at a non-optimum operating point. Alternately, the all but one engine can be used to balance out the total selected notch power by using its alternator voltage boost, if available, to independently control its output voltage and thus can also be set at a its optimum operating point. This provides a degree of control over power output and operating points that is not available with a single large engine. In the step 1403 where all the engines are the same, selection of the number of engines operative to provide power to the DC bus is typically done by dividing the power requirement determined in step 1401 by the power rating of the engines and rounding the resulting number upwards. In the case where there are engines of differing power ratings, the selection algorithm may be more involved so as to balance the power contribution from each engine. In either case, the algorithm that selects the number of engines may consider the operating history of the engines, as indicated by step 1404, so as to avoid using some engines more than others and thereby approximately balancing the usage and maintenance period of the engines. Although less preferable than consulting an engine log, the selection algorithm may be engine selection by random number between one and the number of available engines, which, over time, should tend to even out engine usage. The selection algorithm may be engine selection by rotation to the next engine in an engine sequence which, over time, should also tend to even out engine usage. In the next step 1405, a selected engine may need to be derated. If an engine is required to be derated 1406, then the procedure returns to step 1403 to re-select the number of engines since the derated engine may require an additional engine to provide the required idle power. In the next step 1407, the engines not selected for providing power to the DC bus are identified for deactivation and may be selected to be idled but not providing power to the DC bus, or shut down to be deactivated. This deactivation procedure is controlled in step 1113 of the main flow chart (FIG. 11) and fully described in FIG. 16.

In the preferred load control embodiment, the next step 1408 is to measure the DC bus voltage and set the desired nominal value and range for the DC bus voltage. The range is preferably ±75 volts from the nominal DC bus voltage, more preferably ±50 volts from the nominal DC bus voltage, and most preferably ±25 volts from the nominal DC bus voltage. This voltage may be set at a different predetermined value for each idle setting but most preferably at the same predetermined value for all idle settings.

The next step 1409 begins an internal control loop 1450 for each engine to obtain a balanced power flow from each engine. Each engine has a fuel map and an emissions map or maps. In step 1410, the rpms of the selected engine is determined so as to produce the required power at the specific fuel consumption and emissions rate corresponding to the operating mode selected in step 1402. In step 1411, the excitation current for the alternator of each engine is selected to provide an alternator output voltage to match the selected DC bus voltage. When available, the amount of alternator boost may also be used to generate output voltage to fall within the range of the DC bus voltage measured in step 1408. Step 1412 is a step where the current is measured at the output of each alternator's rectifier. This current which is at the DC bus voltage is a direct measure of the power flowing from the selected engine. An output current measurement is a sensitive and direct measure of power output of the alternator/rectifier apparatus to the DC bus. The measured current is used in a control feedback loop to modify the engine's alternator excitation current to bring the engine's power contribution into balance with its pro rata portion of the total power to the DC bus. In the case where all engines are set to the same output power, each engine is balanced to deliver the same amount of power as the other engines within a predetermined tolerance, preferably about ±5%. This control feedback loop is designed to be a stable feedback process commonly carried out automatically for each engine by one of a number of well-known proportional integral differential ("PID") control algorithms.

The next step 1413 is executed for all engines after all engines have been set via internal control loop 1450. In step 1414, the total power from all engines to the DC bus is determined, preferably by measuring the currents at the output of each alternator's rectifier and multiplying the sum by the measured DC bus voltage. If the total power is too low 1415 to provide the required power to provide for the idling locomotive, then the idle setting may be changed 1416 to a higher setting, the power provided at the selected idle setting may be increased or the power required by the locomotive may be reduced. A reduction in the hotel power required for a passenger train idling in a station is an example of the latter. Once the allocation of power to the auxiliary power needs is set to match the available power from all the idled but power-contributing engines, the algorithm proceeds to the engine deactivation control loop 1417.

Figure 15:
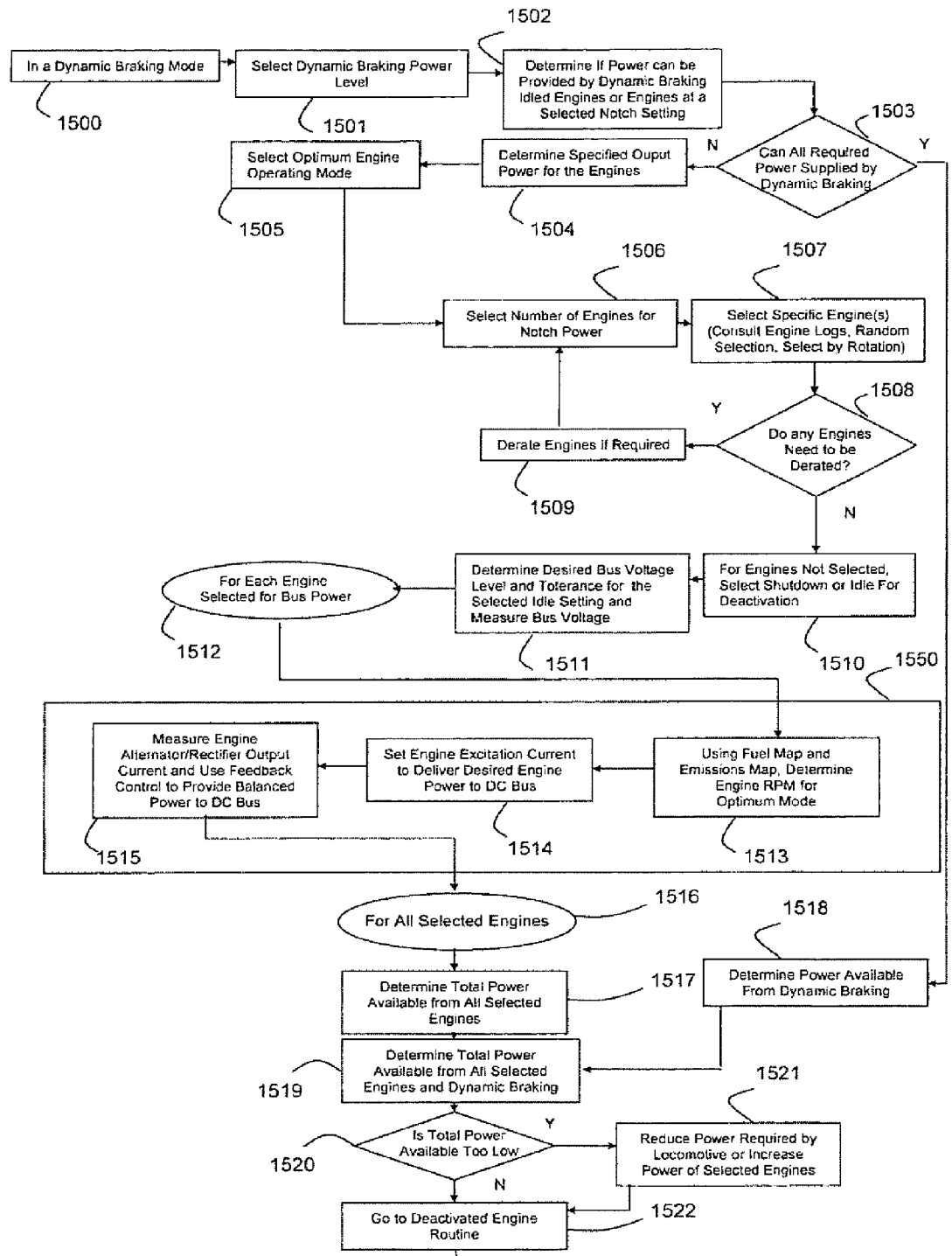
FIG. 15 is an example of a flow chart for selecting and configuring engines for dynamic braking with multiple engines in parallel.

FIG. 15 shows an example of a flow chart for automated selection and configuration of multiple engines in parallel for dynamic braking 1500. This figure illustrates the process for a locomotive that has an independent means of load control similar to that described in FIG. 13, which is a preferred embodiment. It is understood that the traction motors act as generators during dynamic braking and can provide power back to flow to the DC bus. As can be appreciated, the power level provided by dynamic braking can be controlled by power control circuits associated with the traction motors.

The first step 1501 is to estimate the power required by the locomotive during the projected period that the locomotive is expected to be in dynamic braking mode. This can be accomplished using the information available on the locomotive's location along its route and its projected route. The next step 1502 is to determine whether the projected power requirements can be met by dynamic braking or whether some engine power will also be required. If all the required power can be supplied by dynamic braking 1503, then no engines need be engaged to provide power to the DC bus. This situation can arise, for example, if the train is traveling down a lengthy grade. In this case, the power from dynamic braking may exceed the auxiliary requirements of the locomotive and some of the dynamic braking energy may be switched to a resistive grid for dissipation. As can be appreciated, substantial auxiliary power may be required to operate the traction motor blowers that provide cooling during high current operation typical of dynamic braking and this may require some engine power to the DC bus. In the case where dynamic braking is intermittent or only operative for a short period, engines may be required to provide additional power to the DC bus. If engines are required, they may be operated in an idle setting or a notch power setting, depending on the locomotive's requirements. For example, a road switcher may not require substantial auxiliary power during braking but a commuter train with a large hotel load, may require more power than is available through dynamic braking alone. If engines are required, the next step 1504 is to set the output power required by the engines.

The next step 1505 is to determine the desired operating mode of the engines. Examples of operating modes include a maximum fuel efficiency mode, a minimum emissions mode, a combination mode of good fuel efficiency and low emissions and an optimum engine lifetime mode. The choice may be determined by the engineer or by a predetermined algorithm based on data from the locomotive's route location and requirements for the zone in which the locomotive or consist member is operating. Comparable algorithms have been disclosed in US 2005/0251299 entitled Emission Management for a Hybrid Locomotive and U.S. Pat. No. 7,131,614 entitled Locomotive Control System and Method, which describe systems and methods for managing an operation of a locomotive as a function of a location of the locomotive. However, such algorithms have never been applied to multiple generator set locomotives. The next step 1506 is to determine the number of engines operative to provide power to the DC bus. This step, which is essentially the same as that described in step 1204 of FIGS. 12 and 1304 in FIG. 13 is typically done by dividing the power requirement determined in step 1504 by the power rating of the engines and rounding the resulting number upwards in the case where all the engines are the same. In the case where there are engines of differing power ratings, the selection algorithm may be more involved so as to balance the power contribution from each engine. In either case, the algorithm that selects the number of engines may consider the operating history of the engines, as indicated by step 1507, so as to avoid using some engines more than others and thereby approximately balancing the usage and maintenance period of the engines. Although less preferable than consulting an engine log, the selection algorithm may be engine selection by random number between one and the number of available engines, which, over time, should tend to even out engine usage. The selection algorithm may be engine selection by rotation to the next engine in an engine sequence which, over time, should also tend to even out engine usage. In the next step 1508, a selected engine may need to be derated. If an engine is required to be derated 1509, then the procedure returns to step 1506 to reselect the number of engines since the derated engine may require an additional engine to provide the required idle power. In the next step 1510, the engines not selected for providing power to the DC bus are identified for deactivation and may be selected to be idled but not providing power to the DC bus, or shut down to be deactivated. This deactivation procedure is controlled in step 1113 of the main flow chart (FIG. 11) and fully described in FIG. 16.

In the preferred load control embodiment, the next step 1511 is to measure the DC bus voltage and set the desired nominal value and range for the DC bus voltage. The range is preferably ±75 volts from the nominal DC bus voltage, more preferably ±50 volts from the nominal DC bus voltage, and most preferably ±25 volts from the nominal DC bus voltage. This voltage may be set at a different predetermined value depending on the amount of power estimated from dynamic braking and from the power that can be supplied by the engines. It also depends whether the engines will provide power from an idle setting (such as for example high idle) or from a notch power setting.

The next step 1512 begins an internal control loop 1550 for each engine to obtain a balanced power flow from each engine. Each engine has a fuel map and an emissions map or maps. In step 1513, the rpms of the selected engine is determined so as to produce the required power at the specific fuel consumption and emissions rate corresponding to the operating mode selected in step 1505. In step 1514, the excitation current far the alternator of each engine is selected to provide an alternator output voltage to match the selected DC bus voltage. Step 1515 is a step where the current is measured at the output of each alternator's rectifier. This current which is at the DC bus voltage is a direct measure of the power flowing from the selected engine. An output current measurement is a sensitive and direct measure of power output of the alternator/rectifier apparatus to the DC bus. The measured current is used in a control feedback loop to modify the engine's alternator excitation current to bring the engine's power contribution into balance with its pro rata portion of the total power to the DC bus. In the case where all engines are set to the same output power, each engine is balanced to deliver the same amount of power as the other engines within a predetermined tolerance, preferably about ±5%. This control feedback loop is designed to be a stable feedback process commonly carried out automatically for each engine by one of a number of well-known proportional integral differential ("PID") control algorithms.

The next step 1516 is executed for all engines after all engines have been set via internal control loop 1550. In step 1517, the total power from all selected engines is determined, preferably by measuring the currents at the output of each alternator's rectifier and multiplying the sum by the measured DC bus voltage. The power available from dynamic braking is determined in step 1518. The total power available to the locomotive or consist member is determined in step 1519 which is the sum of the power to the DC bus from the engines and dynamic braking. If the total power is too low 1520 to provide the required power for the braking locomotive, then the power provided by the selected engines may be increased 1521 or the power required by the locomotive may be reduced 1521. Once the allocation of power to the auxiliary power needs is set to match the available power from the selected engines and dynamic braking, the algorithm proceeds to the engine deactivation control loop 1522.

FIG. 16 is an example of a flow chart for controlling engine deactivation 1600 for a locomotive with multiple engines in parallel. Deactivation means idling an engine so that it does not provide power to the DC bus; or shutting off the engine. In step 1601, 10 an engine is selected to be idled or shut down for deactivation. If shut down is selected 1602, then the look-ahead route information is queried 1603 to determine if the engine may be needed within a first predetermined time 1604 in which case the shut down selection would not be efficient. If there is too little time before the engine is required again, then the idle mode for deactivation is automatically selected 1612. If there is sufficient time to shut down the engine, then the engine is selected to be turned off 1605. Look-ahead data may also include and not be limited to the zone type where the lead locomotive is located, the location of the consist member, as well as any projections of energy, emissions, noise and power requirements of the lead locomotive and all consist members for each section or zone of the train's up and coming route Again, the look-ahead route information is queried 1606 to determine if the engine may be needed within a second predetermined time 1606. Typically, the second predetermined time is longer than the first predetermined time. For example, the second predetermined time may be associated with long periods of low speed operation or idling.

If there is too little time before the engine is required again, then the engine lubricating oil circulation is maintained operative 1607. If there is sufficient time to turn off the lubricating oil circulation system, it is turned off 1608.

If idling is selected 1612 for engine deactivation, the next step 1613 is to determine the power associated with the idle setting selected by the engineer. The next step 1614 is to set engine alternator excitation current so that the alternator output voltage is sufficiently below the currently selected DC bus voltage. The next step 1615 is to determine the desired operating mode. Examples of operating modes include a maximum fuel efficiency mode, a minimum emissions mode, a combination mode of good fuel efficiency and low emissions and an optimum engine lifetime mode. The next step 1616 is to use the engine's fuel map to determine the engine idle rpms to achieve the operating mode selected in step 1615. Step 1617 is optional and is used to adjust excitation current to move the operating point closer to the optimum value selected in step 1615 while ensuring the output voltage remains well below the operating DC bus voltage. Once the selected engine is deactivated by idling or turning it off (with or without the lubricating oil circulating), then the algorithm returns to the main flow control chart 1618.

Figure 17:
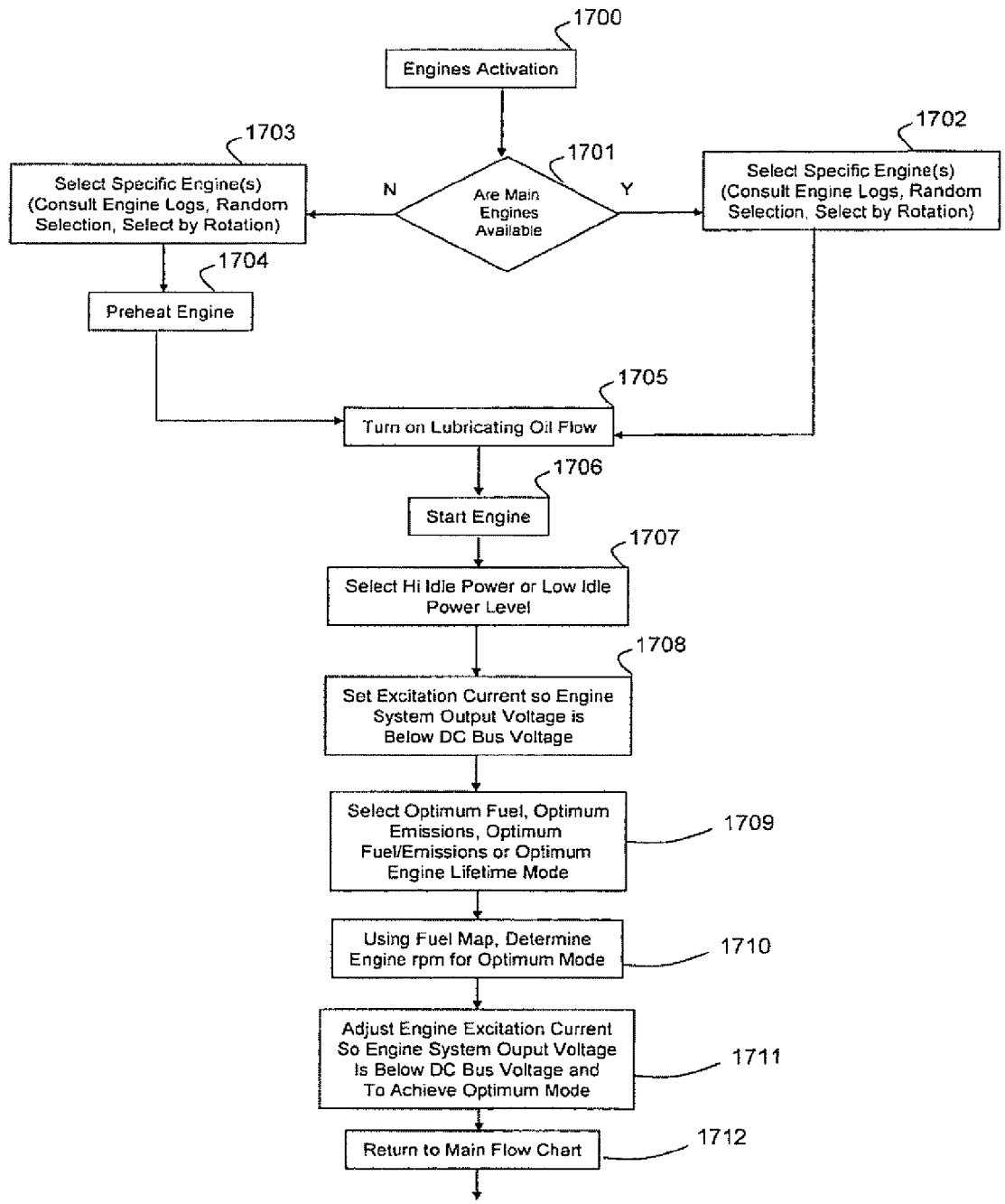
FIG. 17 is an example of a flow chart for activating an engine with multiple engines in parallel.

FIG. 17 is an example of a flow chart for controlling activating an engine 1700 for a locomotive with multiple engines in parallel. The first step 1701 is to determine if warm engines are available. In either case, the algorithm that selects the engines may consider the operating history of the engines, as indicated by step 1702 or 1703, so as to avoid using some engines more than others and thereby approximately balancing the usage and maintenance period of the engines. Although less preferable than consulting an engine log, the selection algorithm may be engine selection by random number between one and the number of available engines, which, over time, should tend to even out engine usage. The selection algorithm may be engine selection by rotation to the next engine in an engine sequence which, over time, should also tend to even out engine usage. If there are no warm engines available, then the selected engine is preheated 1704.

Thereafter, the lubricating oil flow for the selected engine is turned on 1705. The selected engine is then started 1706 and set to one of the available idle settings 1707 as selected by the engineer. The next step 1708 is to set engine alternator excitation current so that the alternator output voltage is sufficiently below the currently selected DC bus voltage. The next step 1709 is to determine the desired operating mode. Examples of operating modes include a maximum fuel efficiency mode, a minimum emissions mode, a combination mode of good fuel efficiency and low emissions and an optimum engine lifetime mode. The next step 1710 is to use the engine's fuel map to determine the engine idle rpms to achieve the operating mode selected in step 1709. Step 1711 is optional and is used to adjust excitation current to move the operating point closer to the optimum value selected in step 1709 while ensuring the output voltage remains well below the operating DC bus voltage. Once the selected engine is activated, then the algorithm returns to the main flow control chart 1712.

Figure 18:
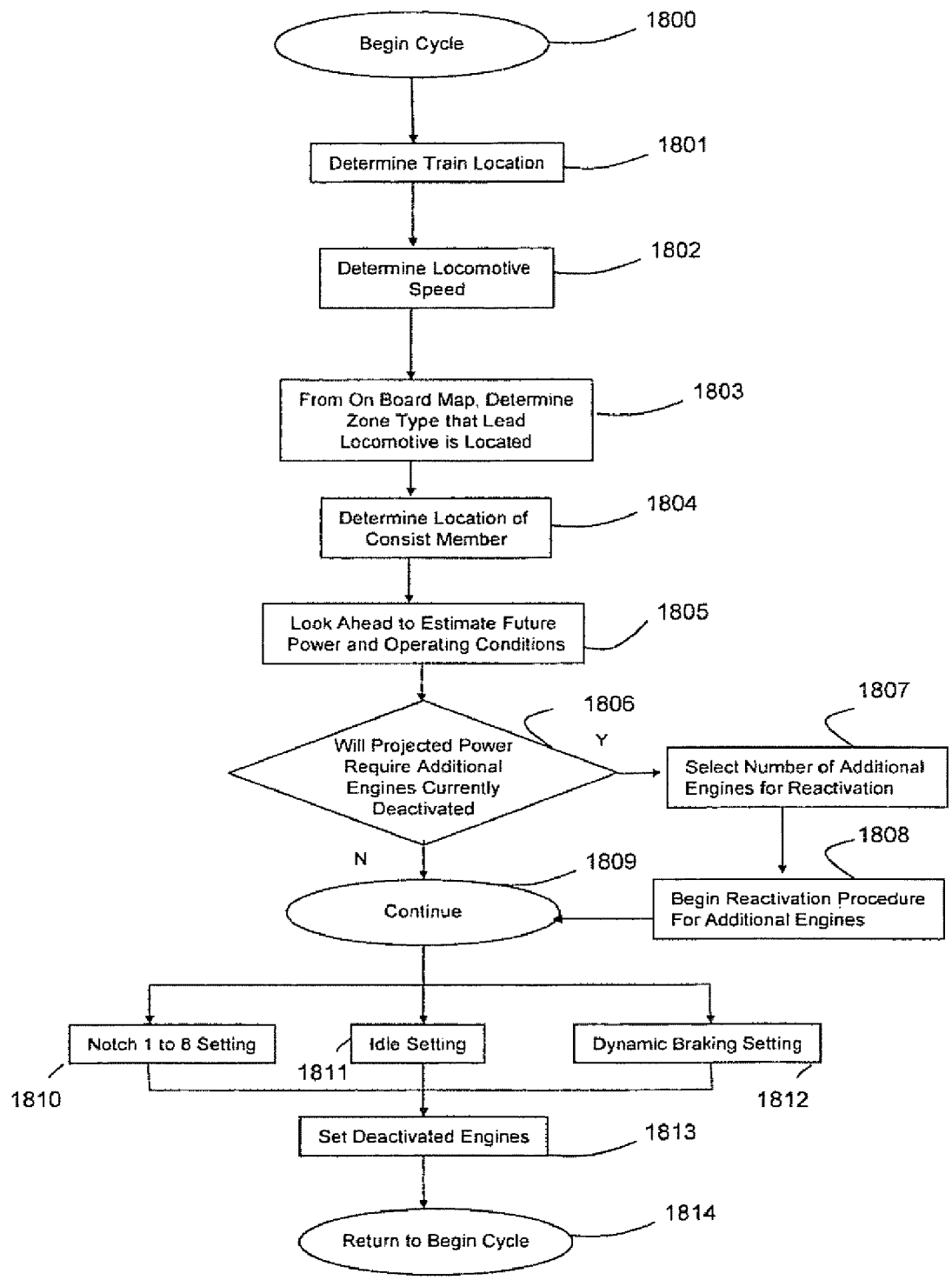
FIG. 18 is another example of a main flow chart of automated decision making for controlling the overall multi-engine selection process with multiple engines in parallel.

The following is an example of a more elaborate location-based, automated computer-controlled engine operating cycle for a multi-engine locomotive, otherwise it is similar to the basic operating cycle described in FIG. 11. As can be appreciated, many of the steps can be carried out in different sequences and some of the steps may be optional. FIG. 18 is another example of a main flow chart of automated decision making for controlling the overall multi-engine selection process and illustrates an automated cycle that begins 1800. The first step 1801 in the decision cycle is to determine the train's location along its route at the time in question. This capability can be provided by, for example, a Global Positioning System ("GPS") device, a radio, a cell phone or by a transponder or mechanical locator situated along the track. The next step 1802 in the decision cycle is to determine the speed of the locomotive. For a given notch power setting, this determination allows the tractive effort, traction motor power, traction motor rpms, traction motor back emf, traction motor volts and traction motor current to be computed. If the locomotive is idling and at rest, this step is trivial. The next step 1803 in the decision cycle is to determine the zone that the train is located in along its route. This can be done, for example, by using the train's determined location and an on-board computer containing a detailed physical (2D or 3D as required) map of the train route and route requirements, to determine when the locomotive is in a zone where any of a number of emissions, noise restrictions and speed restrictions must be observed or where certain locomotive performance is required. An example of the latter may be high acceleration such as, for example, exiting a station. The next step 1804 is to determine the location of the locomotive consist member in the train, typically from the train location device in the lead locomotive and from the knowledge of the number of cars that the consist member is removed from the lead locomotive. If there is only one locomotive, this step is trivial. In a long train where consist members may be at various locations, this step is included since consist members can be located in different operating zones. The next step 1805 is to look ahead to project energy, emissions, noise and power requirements of the lead locomotive and all consist members for each section or zone of the train's up and coming route. In step 1806, the requirement for additional engines currently deactivated is established from the data acquired from step 1805. If additional engines are required, then the number of currently deactivated engines that must be activated is determined in step 1807. This engine activation step is described more fully in FIG. 17. The engine activation procedure is implemented in step 1105 and the cycle then continues 1808. The cycle then continues 1809. As noted above, the locomotive operating mode is commonly set by the locomotive's engineer. These are (1) a notch 1 to 8 power setting 1810, (2) an idle setting 1811, or (3) a dynamic braking setting 1812. For each of three power modes, it is possible that one or more engines may be deactivated.

Deactivation means idling an engine so that it does not provide power to the DC bus, or shutting off the engine. The deactivation of engines is controlled in step 1813. Step 1814 returns to the beginning of the main control cycle.

Figure 19:
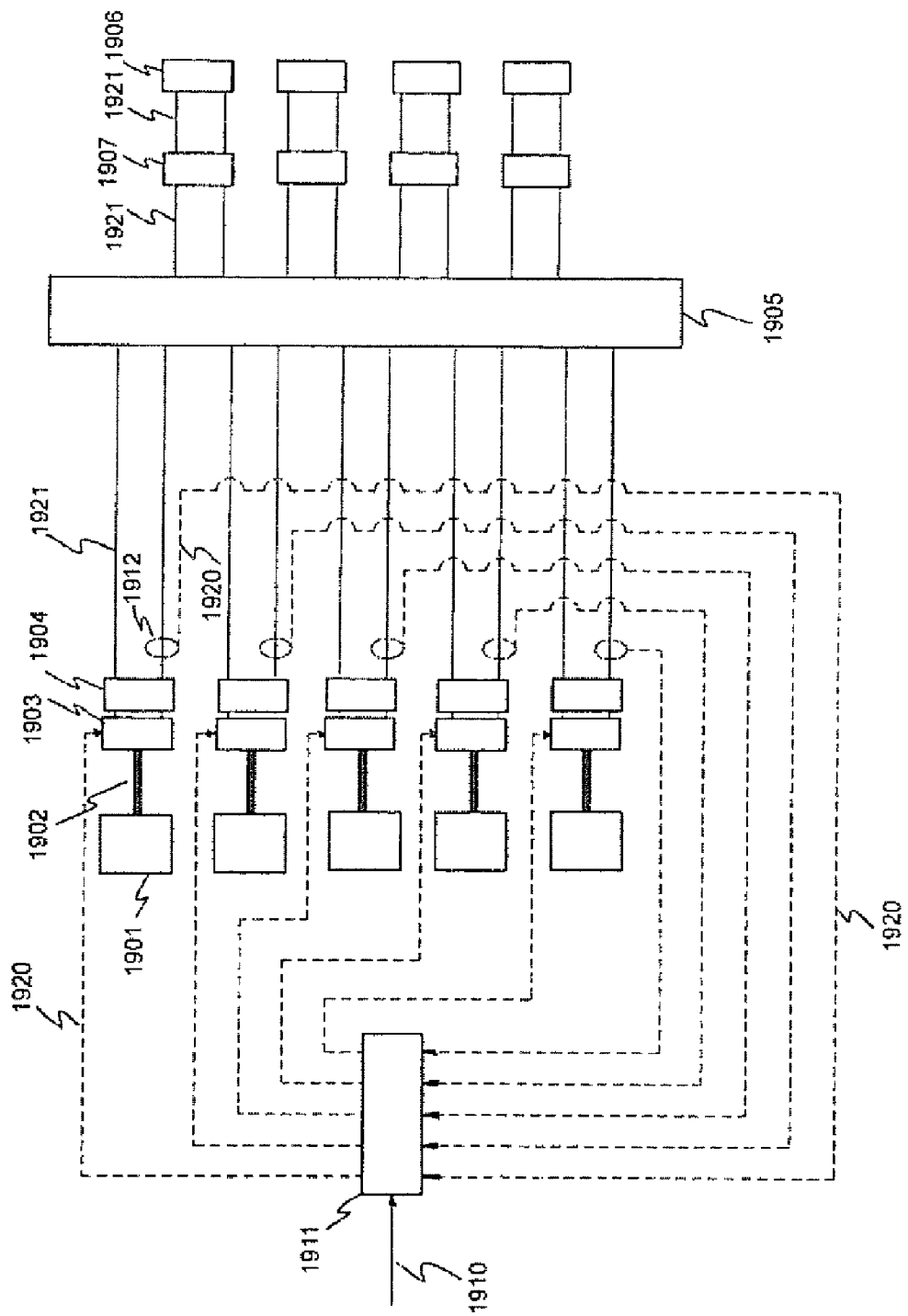
FIG. 19 is a schematic of a multi-engine current-based control feedback system with multiple engines in parallel.

FIG. 19 is a schematic of a preferred embodiment of multi-engine current-based control feedback system with multiple engines in parallel. This schematic shows five engines 1901, each connected by mechanical shafts 1902 to corresponding alternators 1903. Rectifiers 1904 are electrically connected to the outputs of alternators 1903 to provide DC power to a common DC bus 1905. In this embodiment, the output of the DC bus 1905 provides power to four traction motors 1906, each shown with load control apparatuses 1907. The electrical outputs of the alternator/rectifiers are connected in parallel with the DC bus 1905. The load controlled traction motors are also shown connected in parallel with the DC bus 1905.

This figure illustrates a preferred engine balancing control feedback loop. An input command 1910 (for example a selected power level) is issued to a controller 1911. The output currents from each engines' alternator/rectifier are measured by current sensors 1912 which are monitored by the controller 1911. The controller 1911 then uses the measured currents in a control feedback loop to modify each engine's alternator 1903 excitation current or alternator voltage boost to bring each engine's power contribution into balance with its pro rata portion of the total power to the DC bus. The control feedback loop is typically one of a number of well-known proportional integral differential ("PID") control algorithms. The dotted lines 1920 represent current feedback control circuit connections while the solid lines 1921 represent power distribution circuit connections.

Figure 20:
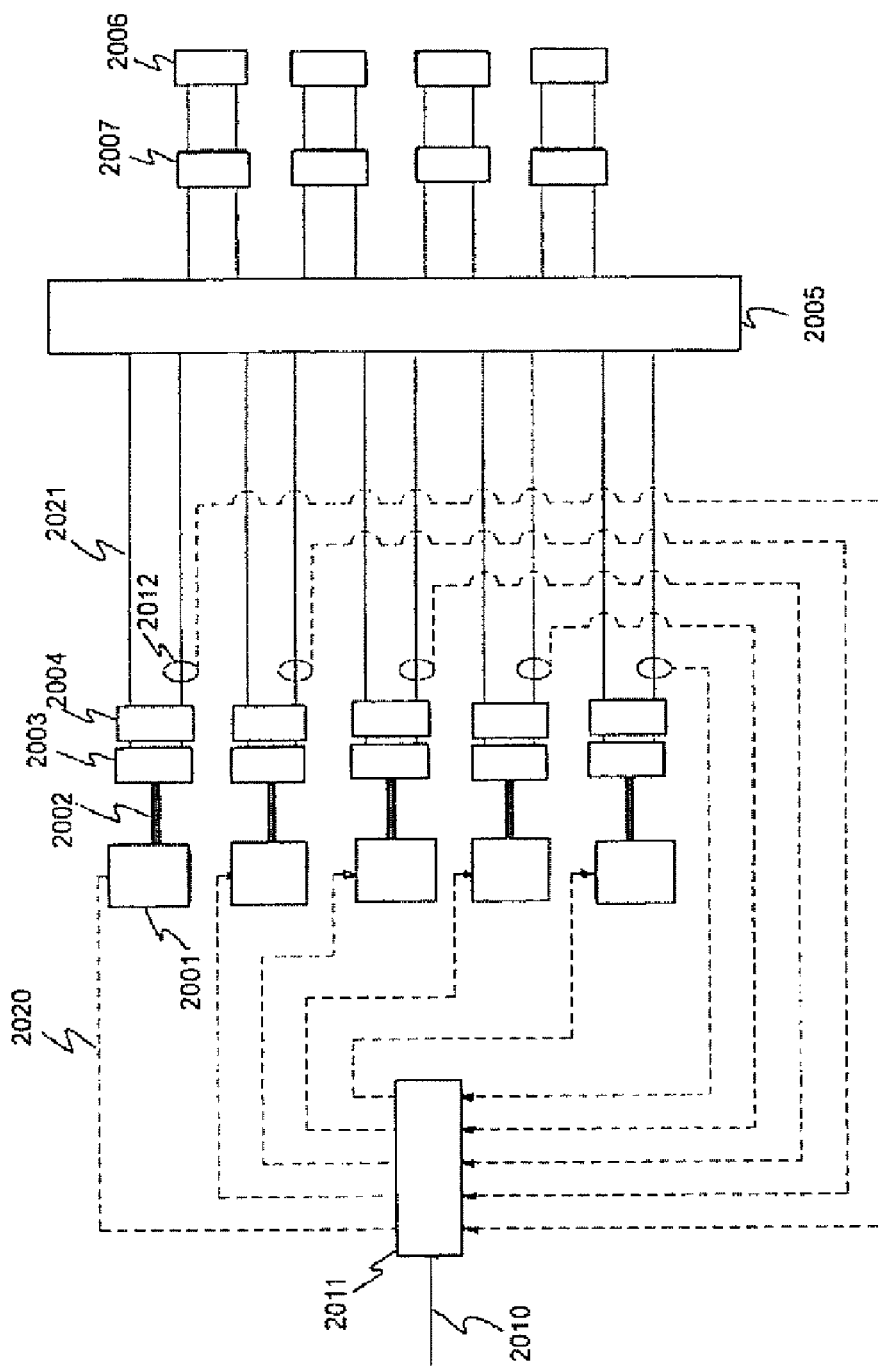
FIG. 20 is a schematic of an alternate multi-engine current-based control feedback system with multiple engines in parallel.

FIG. 20 is a schematic of an alternate multi-engine current-based control feedback system with multiple engines in parallel. This schematic shows five engines 2001, each connected by mechanical shafts 2002 to corresponding alternators 2003.

Rectifiers 2004 are electrically connected to the outputs of alternators 2003 to provide DC power to a common DC bus 2005. In this embodiment, the output of the DC bus 2005 provides power to four traction motors 2006, each shown with load control apparatuses 2007. The electrical outputs of the alternator/rectifiers are connected in parallel with the DC bus 2005. The load controlled traction motors are also shown connected in parallel with the DC bus 2005. This figure illustrates a less preferred engine balancing control feedback loop. An input command 2010 (for example a selected power level) is issued to a controller 2011. The output currents from each engines' alternator/rectifier are measured by current sensors 2012 which are monitored by the controller 2011. The controller 2011 then uses the measured currents in a control feedback loop to modify each engine's 2001 speed (such for example by changing the rate of fuel injection) to bring each engine's power contribution into balance with its pro rata portion of the total power to the DC bus. The control feedback loop is typically one of a number of well-known proportional integral differential ("PID") control algorithms. The dotted lines 2020 represent current feedback control circuit connections while the solid lines 2021 represent power distribution circuit connections. This feedback control configuration is less preferable because (1) it is preferred to maintain the engine speed and power output at its optimum operating mode set point and (2) the mechanical inertia of changing engine speeds tends to make the feedback less responsive.

As can be appreciated, it is possible to use the measured alternator/rectifier currents to adjust or modify a combination of engine speed, engine alternator excitation current and, if available, alternator voltage boost to balance the power outputs of all the engines to the DC bus.

Series Engine Configuration

Figure 21:
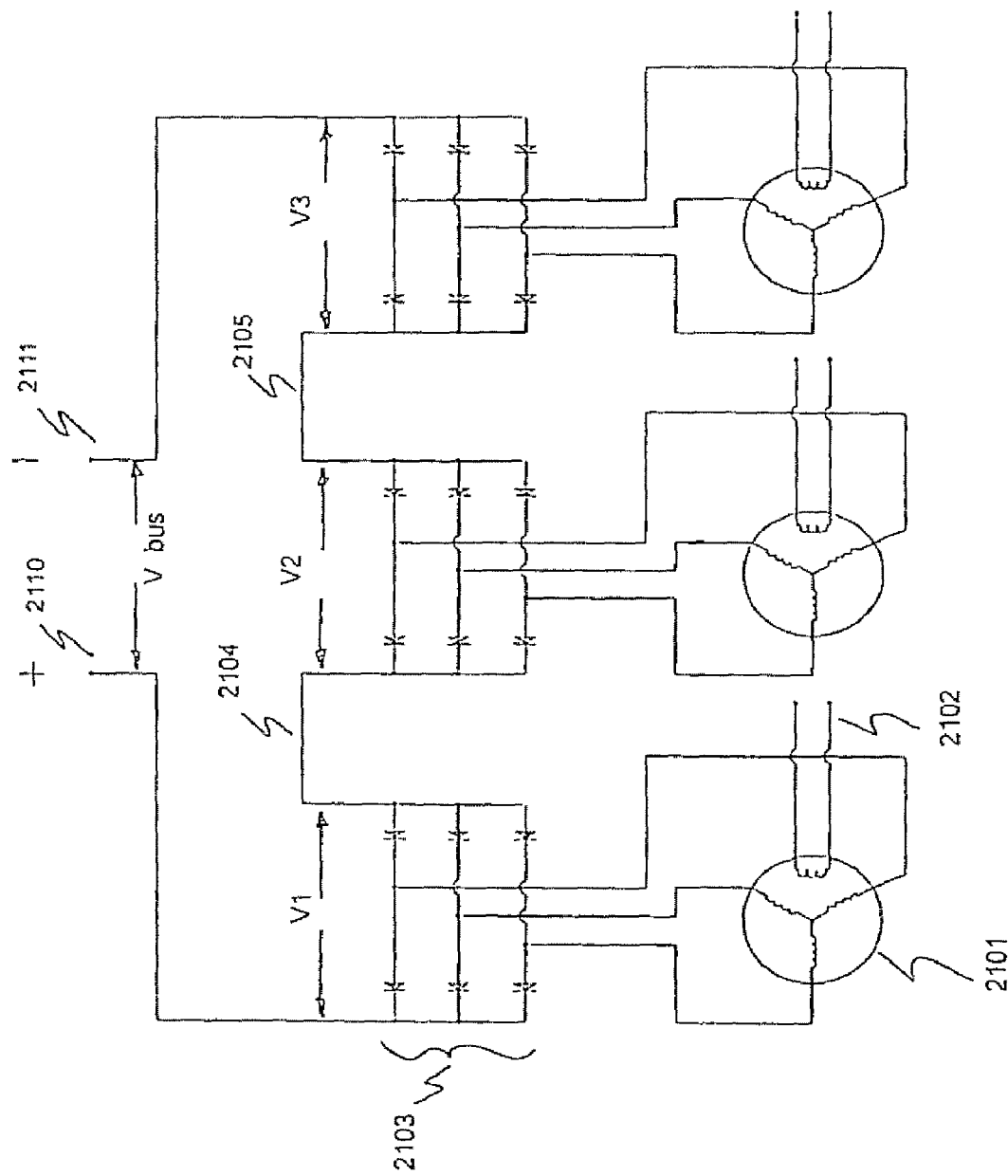
FIG. 21 is a schematic circuit diagram of an alternate engine system for a multiengine locomotive.

FIG. 21 is a schematic circuit diagram of an alternate series connected engine system for a multi-engine locomotive. Three-phase alternators 2101 are shown along with their excitation coils 2102. The AC outputs of each alternator 2101 are connected to a rectifier circuit 2103. The leftmost alternator/rectifier output is connected to the positive side 2110 of a DC bus bar and to the middle alternator/rectifier by connection 2104. The other output of the middle alternator/rectifier is connected to the rightmost alternator/rectifier by connection 2105. Finally, the rightmost alternator/rectifier output is connected to the negative side 2111 of the DC bus bar. The voltage V-bus applied to the 10 DC bus is the sum of the individual alternator/rectifier outputs V1, V2 and V3. If an engine is turned off, or if the engine is on but with no excitation current, or if the engine is on but with not enough excitation current to produce a positive output voltage, then the voltage output of that engine system is a small negative voltage corresponding to the voltage drop across two conducting diodes. If the engine is on and has enough engine speed and excitation current to produce a positive output voltage greater than the voltage drop across its rectifier diodes, then the engine system's output voltage is positive and the engine system adds power to the DC bus. The amount of power that the engine system adds to the DC bus is the engine system's net output voltage times the bus current.

Figure 22:
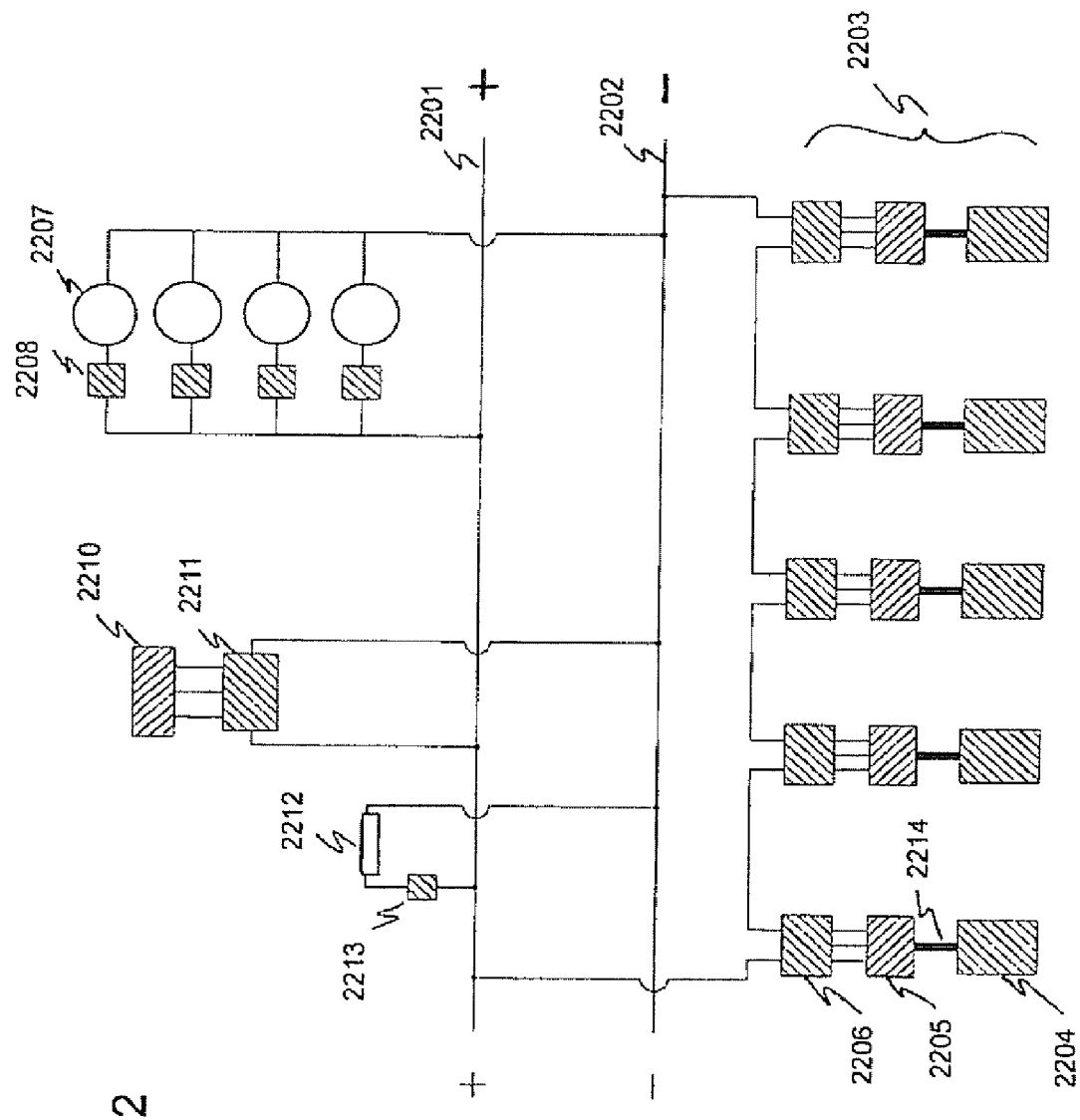
FIG. 22 is a schematic block diagram of a propulsion system for a multi-engine locomotive with multiple engines in series.

FIG. 22 is a schematic block diagram of a propulsion system for a multi-engine locomotive with five engine systems in series. The propulsion system is comprised of five systems 2203 connected in parallel to a DC bus represented by a positive bus bar 2201 and a negative bus bar 2202. The mechanical shafts 2214 of engines 2204 drive alternators 2205 whose AC output is rectified by rectifier circuits 2206 which are in turn connected to the DC bus. An auxiliary power supply 2210 for the locomotive is shown connected to the DC bus by a voltage conversion apparatus 2211. In this example, four traction motors 2207 are shown connected in parallel to the DC bus, each via an electrical energy converter 2208 which is an inverter when traction motors 2207 are AC motors and a chopper circuit when traction motor 2207 are DC motors. An advantage of this configuration over that of the single engine locomotive is that the five engines can have the same total power as the single engine but, as will be discussed subsequently, will allow more efficient fuel management in many situations such as transition from high speed to low speed or, in the case of a yard switcher locomotive for example, transition from high speed to low speed at high power. Another advantage of this configuration over that of the single engine locomotive is the greater ease of serviceability including removal and replacement of smaller engines over that of a single large engine.

Figure 23:
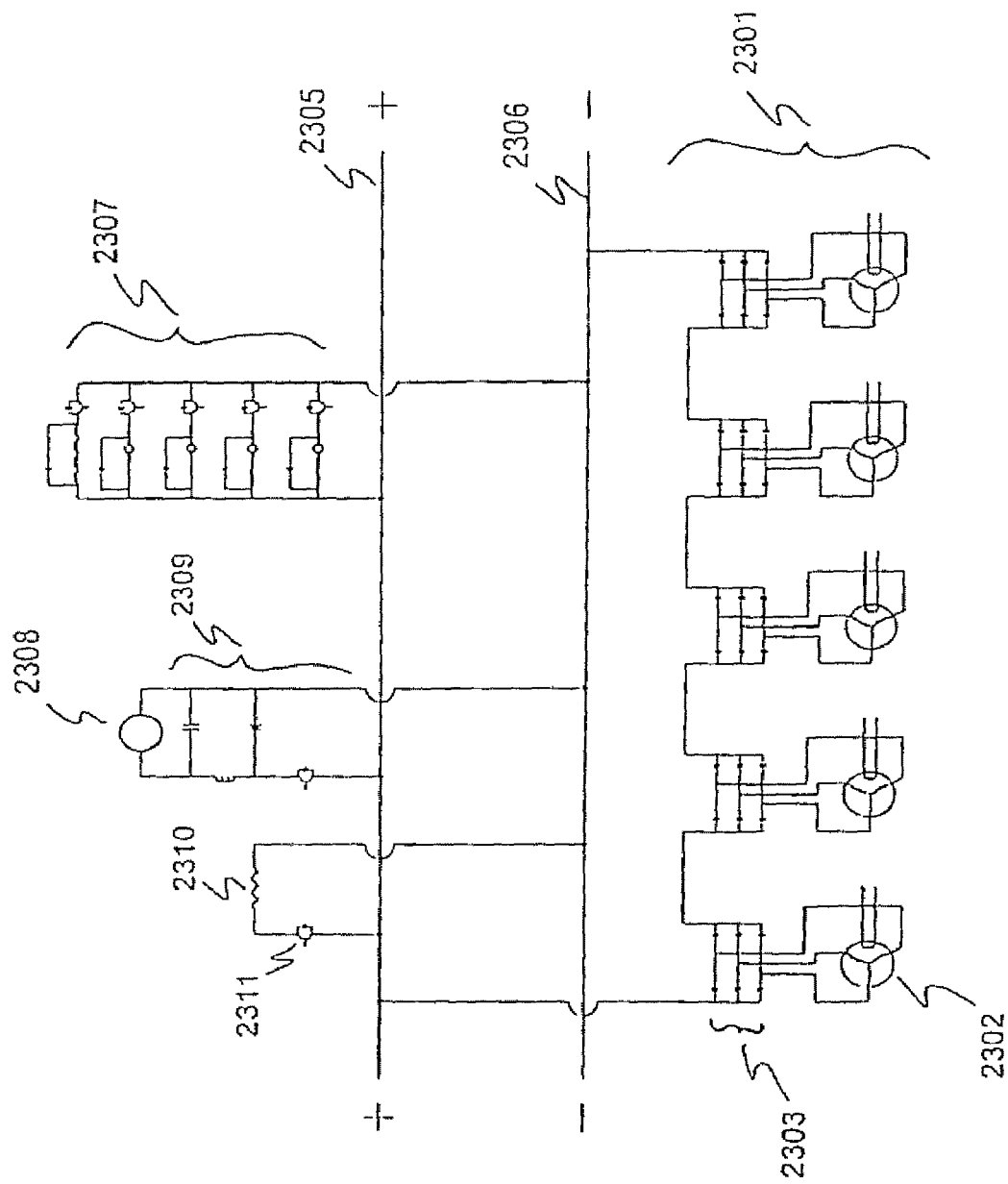
FIG. 23 is a schematic circuit diagram of a propulsion system for a multi-engine locomotive with multiple engines in series.

FIG. 23 is a schematic circuit diagram of a propulsion system for a multi-engine locomotive with five engine systems 2302 in series which corresponds to the block diagram of FIG. 22. The engines are all shown with wound rotor alternators 2302 and rectifiers 2303 although the engine systems may be of different sizes and types and the alternators may be permanent magnet machines, asynchronous alternators such as induction alternators, DC generators, or switched reluctance generators. The output voltage from each engine system may be measured by its own output voltage sensor (not shown). These five prime engine systems provide power to a DC bus shown by conductors 2305 and 2306. The circuit of FIG. 23 also includes a propulsion system 2307 shown here with four traction motors, an auxiliary power system 2308 with its voltage control circuit 2309. The circuit also includes a resistive grid 2310 and switch 2311 that provides a dynamic braking capability. With its engine systems connected in series to the DC bus, the voltage on the DC bus is the sum of the net output voltages of each of the five engine systems as described in FIG. 21. This locomotive power circuit is an example of a multi-engine locomotive with regenerative braking capability that could be used, for example, as a road switcher. A similar electrical architecture for a series-connected multi-engine power system was disclosed previously in U.S. Provisional patent application entitled "Marine Power Train Architecture" by Donnelly and Watson filed Oct. 24, 2006.

Control and Balancing of Multi-Engine in Series

Figure 24:
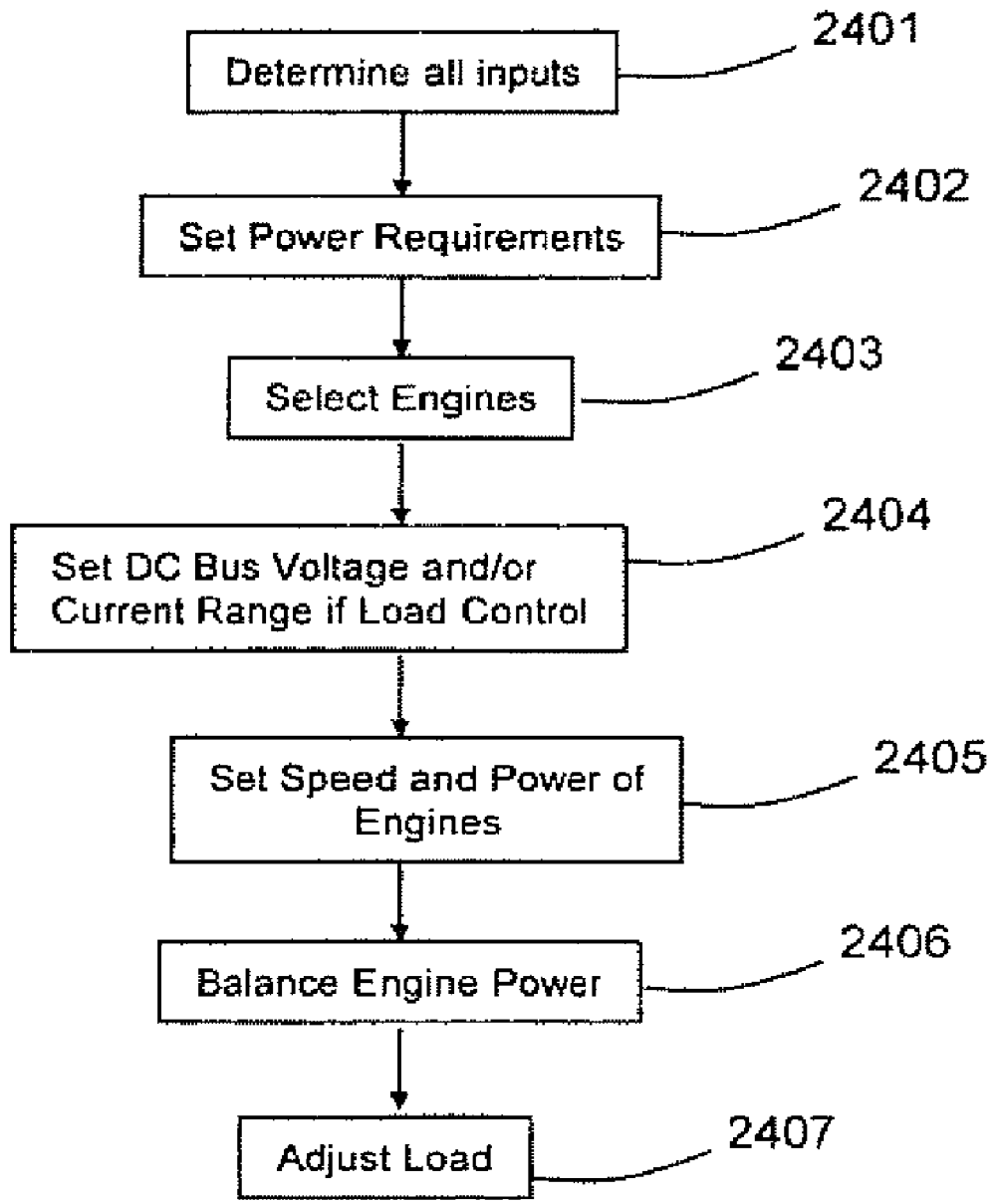
FIG. 24 is an overview flowchart showing the primary steps in a multi-engine control loop with multiple engines in series.

In series configuration, the output voltage of each engine system providing power to the DC bus is added to produce the voltage measured on the DC bus. Thus a measurement of the output voltage of an engine system is an accurate measurement of the engine system's power to the DC bus and is the preferred method of determining engine system's output power. An engine system's output power is its output voltage times the DC bus current. If only DC bus voltage is measured, an engine system's relative output power compared to the other engines providing power can still be obtained by each engine system's measured output voltage the In series configuration, the general method of ensuring the desired engine system output power is then:
- set the desired DC bus voltage or bus voltage range and measure the DC bus voltage; or set the desired DC bus current or bus current range and measure the DC bus current
- for each engine system, measure its output voltage and use this to determine its output power (its voltage times DC bus current) or output power relative to the other engines (relative output voltages are relative output powers since current is the same)
- if the engine system is not outputting the desired power or desired power relative to the other engines, adjust an engine system electrical or mechanical parameter to produce desired engine system output voltage and hence power FIG. 24 is an overview flowchart showing the primary steps in a multi-engine control loop with multiple engines in series. In FIG. 24, step 2401 determines all the inputs required to set locomotive power requirements, select engines, set the DC bus voltage and/or current, set the power and speed of the engines, balance the flow of power from the engines and adjust the load if load control is available. Step 2402 is where the power requirements for the locomotive are established depending on a number of variables determined in step 2401. In step 2403, engines are selected. This includes the number of engines, the specific engines, which engines need to be activated for future use and which engines can be deactivated. In step 2404, the DC bus voltage and/or current is selected. A specific operating voltage and/or current is selected for the load control embodiment. The DC bus voltage or current is not determined in the embodiment which has no load control. In step 2405, the power and speed (rpms) of each engine is set based on the power requirements and engine operating mode determined in step 2402. In step 2406, the power outputs of all engines are measured by measuring the output voltage of each engine system. In this step, the power outputs are balanced so that each engine is contributing its pro rata share of the output power. This step is may be accomplished by adjusting engine speed (rpms) and/or alternator excitation current to achieve the required engine system power output. Finally, in step 2407, the load is adjusted if load control is used. In this step the power to the load is adjusted to equal the power available from the DC bus. This is accomplished for example by choppers which regulate DC traction motors or inverters which regulate AC motors.

Figure 25:
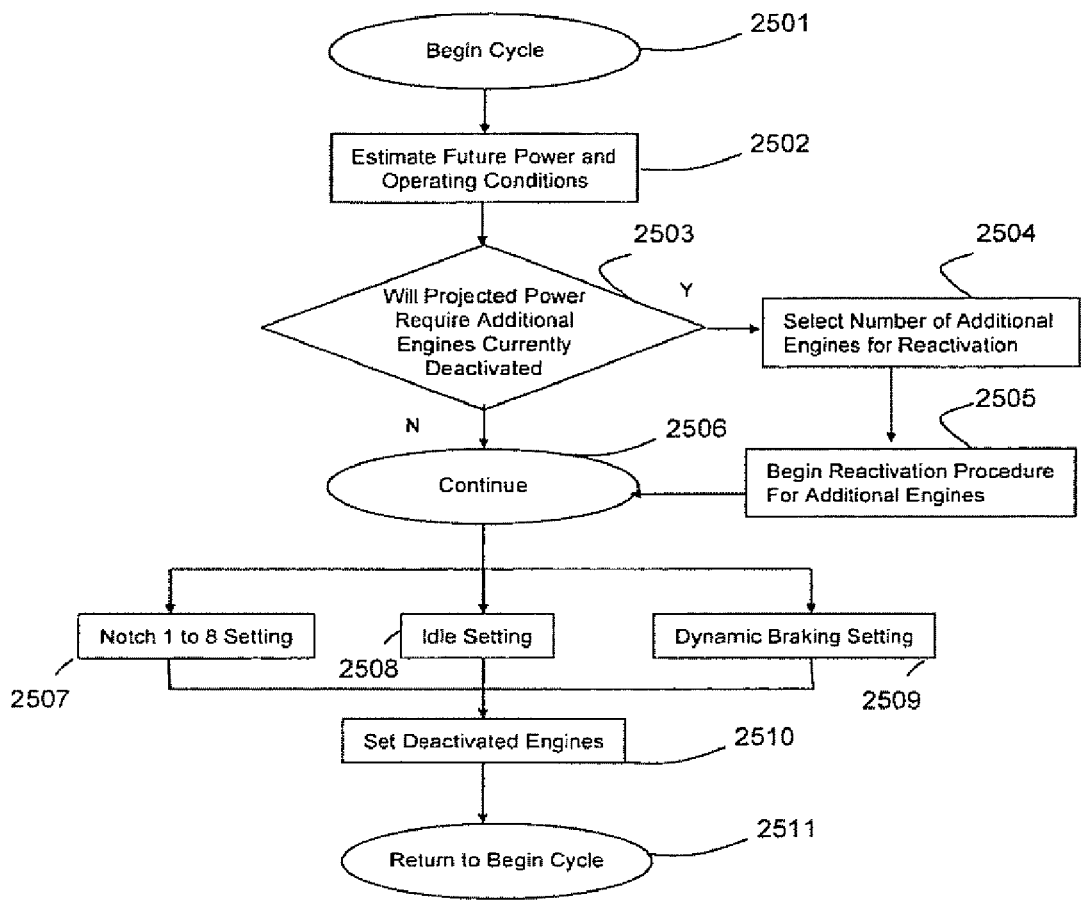
FIG. 25 is an example of a main flow chart of automated decision making for controlling the overall multi-engine selection process with multiple engines in series.

FIG. 25 is an example of a main flow chart of automated decision making for controlling the overall multi-engine selection operating and balancing process with multiple engines in series. This cycle of decisions can be executed continuously (for example every millisecond) or intermittently (for example every 1 second) or at intervals in between by a predetermined computer program or by a computer program that adapts, such as for example, a program based on neural network principles. As can be appreciated, many of the steps can be carried out in different sequences and some of the steps may be optional.

As is common practice, the choices of applying traction power, applying dynamic braking or operating the locomotive at idle to supply auxiliary power are made by the locomotive engineer or operator utilizing controls in the cab, or via a remote-control or equivalent system when, for example, in a switch yard.

As shown in the example of FIG. 25, an automated cycle begins 2500. The first step 2502 is to estimate the power requirements and operating mode of the locomotive. In step 2503, the requirement for additional engines currently deactivated is established from step 2502. If additional engines are required, then the number of currently deactivated engines that must be activated is determined in step 2504. This engine activation step is described more fully in FIG. 31. The engine activation procedure is implemented in step 2505 and the cycle then continues 2506. As noted above, the locomotive operating mode is commonly set by the locomotive's engineer. These are (1) a notch 1 to 8 power setting 2507, (2) an idle setting 2508, or (3) a dynamic braking setting 2509. For each of three power modes, it is possible that one or more engines may be deactivated. Deactivation means idling an engine so that it does not provide power to the DC bus, or shutting off the engine. The deactivation of engines is controlled in step 2510. Step 2511 returns to the beginning of the main control cycle.

Figure 26:
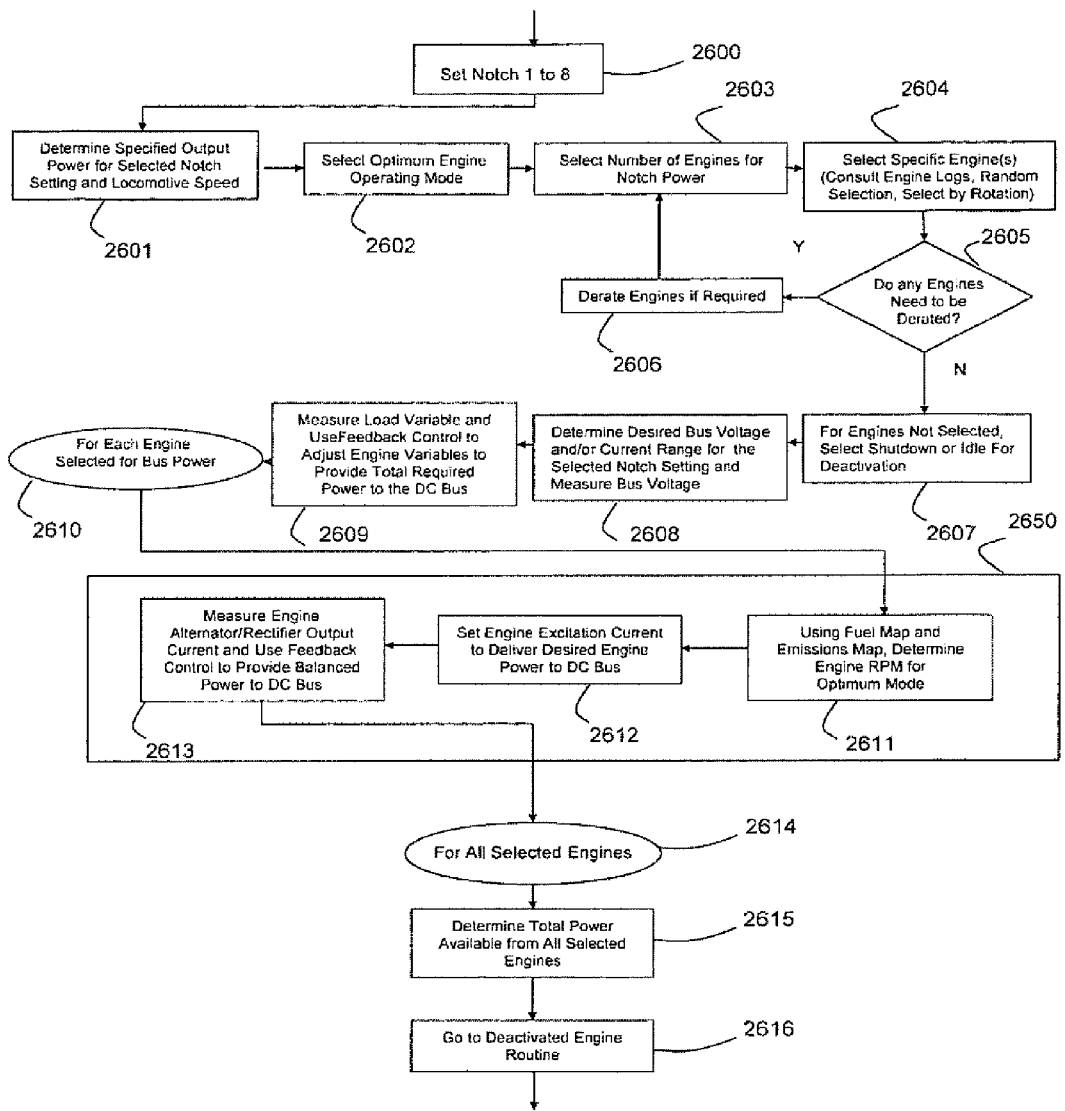
FIG. 26 is an example of a flow chart for selecting and configuring engines for any of the notch 1 to 8 power settings with no load control with multiple engines in series.

FIG. 26 is an example of a flow chart for selecting and configuring engines for any of the notch 1 to 8 power settings 2600 with no load control with multiple engines connected in electrical series. FIG. 26 shows an example of a flow chart for automated selection and configuration of engines for any of the notch 1 to 8 power settings 2600.

This figure illustrates the process for a locomotive that does not have an independent means of load control. That is, the traction motors may be able to consume more power than the engines can provide, depending on engine alternator excitation settings and traction motor volts which are a function of locomotive speed. The first step 2601 is to determine the power associated with the notch number selected by the engineer and to determine the locomotive speed. The latter can be determined from a number of well-known means such as for example by a speedometer, by measuring axle rpms, by using a radar system and the like. Each notch number is typically associated with a predetermined power level at each locomotive speed, notch 1 being the lowest power setting and notch 8 being the highest power setting. As can be appreciated, the power level associated with each notch setting can be varied from time to time by reprogramming an on-board computer. The next step 2602 is to determine the desired engine operating mode. Examples of operating modes, which were previously illustrated in FIGS. 3 and 4, include a maximum fuel efficiency mode, a minimum emissions mode, a combination mode of good fuel efficiency and low emissions, an optimum engine lifetime mode, and a maximum power mode. The choice may be determined by the engineer or by a predetermined algorithm based on data from the locomotive's route location and requirements for the zone in which the locomotive or consist member is operating.

The next step 2603 is to determine the number of engines operative to provide power to the DC bus, Step 2603 may be carried out by an algorithm controlled by an on-board computer. It may also be based on a predetermined lookup table which associates each notch, each appropriate locomotive speed range and its various operating modes with an operating point such as described in FIGS. 3 and 4. It is also possible that, at some notch settings, all but one of the engines can be set at or near the selected operating points and the all but one engine can be used to balance out the total selected notch power by being set at a non-optimum operating point. Alternately, the all but one engine can be used to balance out the total selected notch power by using its alternator voltage boost capability (if available) to independently control its output voltage and thus can also be set at a its optimum operating point. Either of these methods can provide a degree of control over power output and operating points that is not available with a single large engine. A single large engine can be set at only one power and speed setting and often has to trade off better fuel economy for lower emissions. In a multiple engine locomotive, all but one of the power-producing engines (or all engines when alternator boost is available) can be tuned to optimize power, fuel consumption and emissions and often the one engine can be operated near its optimum operating point. In the step 2603 where all the engines are the same, selection of the number of engines operative to provide power to the DC bus is typically done by dividing the power requirement determined in step 2601 by the power rating of the engines and rounding the resulting number upwards. In the step 2603 where all the engines are the same and in series, selection of the number of engines operative to provide power to the DC bus can also be done by dividing the desired DC bus voltage determined in step 2601 by the output voltage rating of the engines and rounding the resulting number upwards. In the case where there are engines of differing power ratings, the selection algorithm may be more involved so as to balance the power contribution from each engine. In either case, the algorithm that selects the number of engines may consider the operating history of the engines, as indicated by step 2604, so as to avoid using some engines more than others and thereby approximately balancing the usage and maintenance period of the engines.

An engine log typically contains information on engine usage (hours, fuel consumption, lubricant consumption, total rpms, megawatt-hours, hours in idle modes, hours in the various notch settings and hours in dynamic braking and the like) and maintenance history. Although less preferable than consulting an engine log, the selection algorithm may be engine selection by a random number between one and the number of available engines, which, over time, should tend to even out engine usage. The selection algorithm may be engine selection by rotation to the next engine in an engine sequence which, over time, should also tend to even out engine usage. In the next step 2605, a selected engine may need to be derated. For example, the selected engine may have one or more cylinders operating at less than optimum rating, the engine's control system may automatically derate the engine to a lower power after a specified time period of operating at a higher-than-normal power rating or any number of other well-known reasons for derating engine performance. If an engine is required to be derated 2606, then the procedure returns to step 2603 to re-select the number of engines since the derated engine may require an additional engine to provide the requested power. In the next step 2607, the engines not selected for providing power to the DC bus are identified for deactivation and may be selected to be idled or shut down to be deactivated. This deactivation procedure is controlled in step 2513 of the main flow chart (FIG. 25) and fully described in FIG. 30.

In the next step 2608, the desired bus voltage and/or current range for the selected notch setting is selected and either or both of bus voltage and bus current are measured. As the power consumed by the load (traction motors) increases beyond the optimum engine power capacity, the engine speeds will begin to decrease. In step 2609, typically a load variable such as total load current or torque is measured and used in a first control feedback loop to increase engine speeds by decreasing their alternator excitation currents which tends to decrease alternator output voltages. As this occurs for all the engines, the DC bus voltage drops, reducing the power to the load by reducing motor voltage until the total engine power output matches the power required by the load. This is a stable feedback process commonly carried out automatically for each engine by one of a number of well-known proportional integral differential ("PID") control algorithms. Thus, the DC bus voltage may be highly variable, typically ranging from near zero volts to well over 1,000 volts.

The next step 2610 begins an internal control loop 2650 for each engine to obtain a balanced power flow from each engine. Each engine has a fuel map which is typically a plot of engine power or torque versus engine rpms for various contours of constant specific fuel consumption, and an emissions map which is typically a plot of engine power or torque versus engine rpms for various contours of constant specific NOx emissions. As can be appreciated, there may be additional emissions maps for hydrocarbons and particulate matter and the like. In step 2611, the rpms of the selected 10 engine is determined so as to produce the required power at the specific fuel consumption and emissions rate corresponding to the operating mode selected in step 2602. In step 2612, the excitation current for the alternator of each engine is selected to provide an alternator output voltage to fall within the range of the DC bus voltage and/or bus current measured in step 2608. When available, the amount of alternator boost may also be used to generate output voltage to fall within the range of the DC bus voltage measured in step 2608. This latter capability may be useful for example when an engine is derated or when an engine is operated at a lower power and rpm so that the engine may continue to supply power to the DC bus by having independent control over its alternator output voltage.

Step 2613 is a step where the net output voltage of each engine system is measured at the output of each alternator's rectifier circuit. This voltage times the DC bus current is a direct measure of the power flowing from the selected engine. An engine system output voltage measurement is a sensitive and direct measure of power output of the engine system to the DC bus for the series engine configuration. In the series engine configuration, if the bus current is not known, the engine system output voltages are a relative measurement of power output of the engine system to the DC bus since the sum of all the series connected engine system output voltages equals the bus voltage (see FIG. 21). The measured voltage is used in a second control feedback loop to modify the engine's alternator excitation current to bring the engine's power contribution into balance with its pro rata portion of the total power to the DC bus. This feedback and balancing can be done if the absolute power or relative power of each engine is so measured. In the case where all engines are set to the same output power, each engine is balanced to deliver the same amount of power as the other engines to within a predetermined tolerance, preferably in the range of about ±5%. This second control feedback loop is designed to be a stable feedback process commonly carried out automatically for each engine by one of a number of well-known proportional integral differential ("PID") control algorithms.

The next step 2614 is executed for all engines after all engines have been balanced via internal control loop 2650. In step 2615, the total power from all engines to the DC bus is determined, preferably by measuring the voltage at the output of each engine system and multiplying the sum by the measured DC bus current and less preferably by measuring the voltage at the output of each engine system and multiplying the sum by an estimated DC bus current (for example by measuring the current flowing to each traction motor, auxiliary power supply and other sources of power draw and summing these).

Once the allocation of power to the traction motors is determined 2615, the algorithm proceeds to the engine deactivation control loop 2616.

Figure 27:
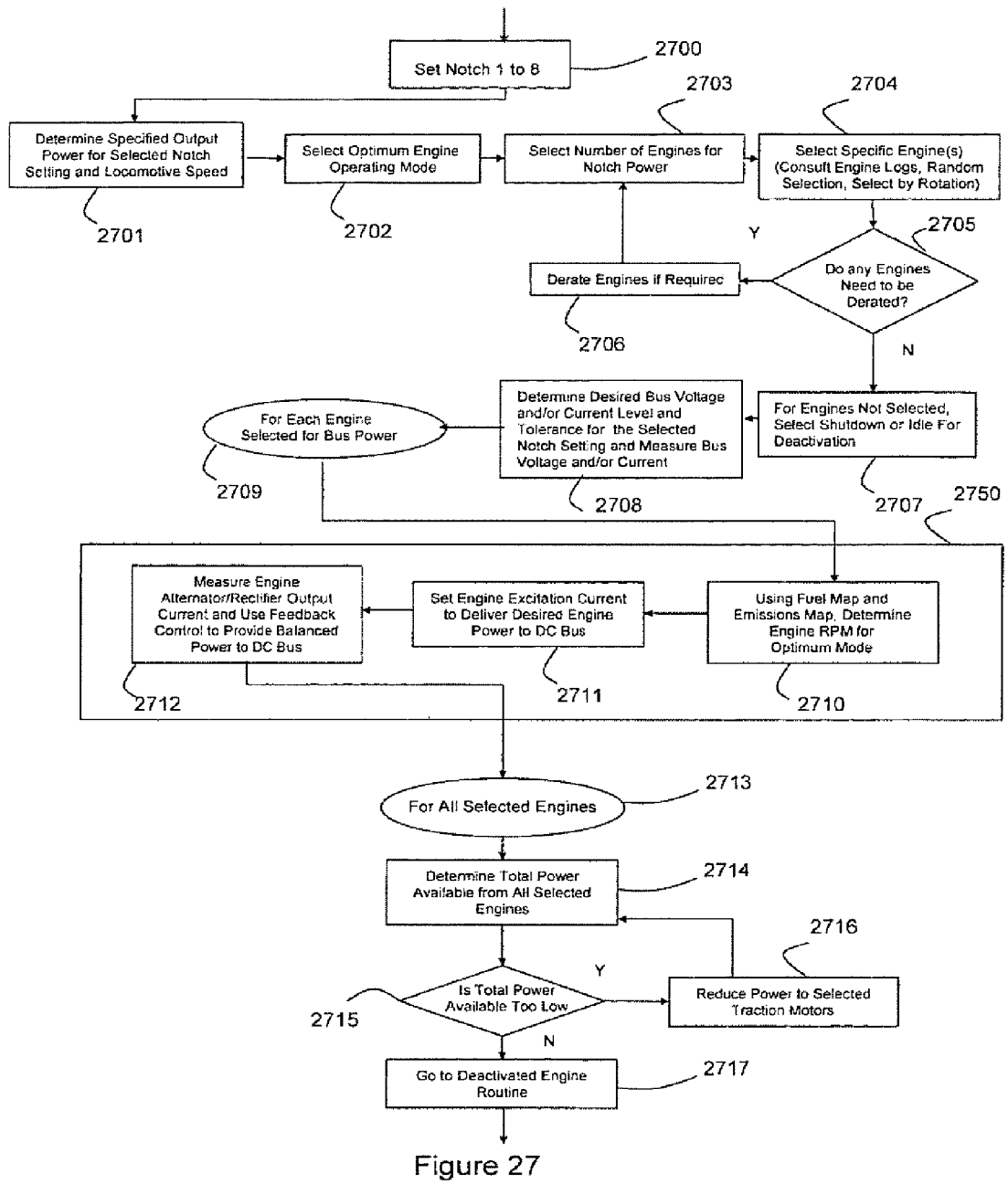
FIG. 27 is an example of a flow chart for selecting and configuring engines for any of the notch 1 to 8 power settings with load control with multiple engines in series.

FIG. 27 is an example of a flow chart for selecting and configuring engines for any of the notch 1 to 8 power settings 2700 with load control with multiple engines in series. This figure illustrates the process for a locomotive that has an independent means of load control which is a preferred embodiment. That is, the power distributed to the traction motors is controlled independently such that the total power distributed to the load is controlled to match the power available from the engines. This may be done for example by using one or more choppers at the output of the DC bus to DC traction motors, or by using one or more inverters at the output of the DC bus to AC traction motors. The first step 2701 is to determine the power associated with the notch number selected by the engineer and to determine the locomotive speed. As can be appreciated, the power level associated with each notch setting can be varied from time to time by reprogramming an on-board computer. The next step 2702 is to determine the desired engine operating mode. Examples of operating modes are described in the discussion of FIG. 26. The choice may be determined by the engineer or by a predetermined algorithm based on data from the locomotive's route location and requirements for the zone in which the locomotive or consist member is operating.

The next step 2703 is to determine the number of engines operative to provide power to the DC bus, Step 2703 may be carried out by an algorithm controlled by an onboard computer. It may also be based on a predetermined lookup table which associates each notch, each appropriate locomotive speed range and its various operating modes with an operating point such as described in FIGS. 3 and 4. It is also possible as described previously that, at some notch settings, all but one of the engines can be set at or near the selected operating points and one engine can be used to balance out the total selected notch power by being set at a non-optimum operating point (also use can be made of alternator boost as described in step 2603 of FIG. 26). In the step 2703 where all the engines are the same, selection of the number of engines operative to provide power to the DC bus is typically done by dividing the power requirement determined in step 2701 by the power rating of the engines and rounding the resulting number upwards.

In the step 2703 where all the engines are the same and in series, selection of the number of engines operative to provide power to the DC bus can also be done by dividing the desired DC bus voltage determined in step 2701 by the output voltage rating of the engines and rounding the resulting number upwards. In the case where there are engines of differing power ratings, the selection algorithm may be more involved so as to balance the power contribution from each engine. In either case, the algorithm that selects the number of engines may consider the operating history of the engines, as indicated by step 2704, so as to avoid using some engines more than others and thereby approximately balancing the usage and maintenance period of the engines. Although less preferable than consulting an engine log, the selection algorithm may be engine selection by random number between one and the number of available engines, which, over time, should tend to even out engine usage. The selection algorithm may be engine selection by rotation to the next engine in an engine sequence which, over time, should also tend to even out engine usage. In the next step 2705, a selected engine may need to be derated. If an engine is required to be derated 2706, then the procedure returns to step 2703 to re-select the number of engines since the derated engine may require an additional engine to provide the required notch power. In the next step 2707, the engines not selected for providing power to the DC bus are identified for deactivation and may be selected to be idled or shut down to be deactivated. This deactivation procedure is controlled in step 2513 of the main flow chart (FIG. 25) and fully described in FIG. 30.

In the preferred load control embodiment, the next step 2708 is to set the desired nominal value and range for the DC bus voltage and/or current. The range is preferably ±75 volts from the nominal DC bus voltage, more preferably ±50 volts from the nominal DC bus voltage, and most preferably ±25 volts from the nominal DC bus voltage. This voltage may be set at a different predetermined nominal value for each notch setting, or at a predetermined nominal value for a range of notch settings, or at the same predetermined nominal value for all notch settings.

The next step 2709 begins an internal control loop 2750 for each engine to obtain a balanced power flow from each engine. Each engine has a fuel map and an emissions map or maps. In step 2710, the rpms of the selected engine is determined so as to produce the required power at the specific fuel consumption and emissions rate corresponding to the operating mode selected in step 2702. In step 2711, the excitation current for the alternator of each engine is selected to provide an alternator output voltage to match the selected DC bus voltage and/or bus current. Step 2712 is a step where the net output voltage of each engine system is measured at the output of each alternator's rectifier circuit. This voltage times the DC bus current is a direct measure of the power flowing from the selected engine. An engine system output voltage measurement is a sensitive and direct measure of power output of the engine system to the DC bus for the series engine configuration. In the series engine configuration, if the bus current is not known, the engine system output voltages are a relative measurement of power output of the engine system to the DC bus since the sum of all the series connected engine system output voltages equals the bus voltage (see FIG. 21).

The measured voltage is used in a second control feedback loop to modify the engine's alternator excitation current to bring the engine's power contribution into balance with its pro rata portion of the total power to the DC bus. This feedback and balancing can be done if the absolute power or relative power of each engine is so measured. In the case where all engines are set to the same output power, each engine is balanced to deliver the same amount of power as the other engines within a predetermined tolerance, preferably about ±5%. This control feedback loop is designed to be a stable feedback process commonly carried out automatically for each engine by one of a number of well-known proportional integral differential ("PID") control algorithms.

The next step 2713 is executed for all engines after all engines have been set via internal control loop 2750. In step 2714, the total power from all engines to the DC bus is determined, preferably by measuring the voltage at the output of each engine system and multiplying the sum by the measured DC bus current and less preferably by measuring the voltage at the output of each engine system and multiplying the sum by an estimated DC bus current (for example by measuring the current flowing to each traction motor, auxiliary power supply and other sources of power draw and summing these). If the total power is too low 2715 to provide the required power to the traction motors, then the power to selected traction motors is reduced 2716 to the amount of power available from the DC bus. This power reduction can be made equal to all traction motors or can be allocated based on an algorithm that considers each powered wheel-set separately. The latter is an available strategy if each traction motor has its own power control apparatus (such as a chopper circuit for each DC traction motor or an inverter for each AC traction motor). Power may be selectively reduced for example on the leading wheel set in wet conditions. Once the allocation of power to the traction motors is determined 2714, the algorithm proceeds to the engine deactivation control loop 2717.

In a locomotive without an independent means of load control, if the engine power is too low to provide the required power to the traction motors, then (1) the engine power may be adjusted upwards or (2) the power to traction motors may be reduced by lowering the alternator excitation current until the alternator output voltage matches the traction motor voltage. In the preferred multi-engine locomotive control means of the present invention, if the total power from the engines is too low to provide the required power to the traction motors, then preferably the power to traction motors is reduced by a small amount to equal the power available. Alternately, another engine may be added to provide the necessary power in all but the highest notch setting. At the highest notch setting, it is still possible to increase the power output of one or more engines for periodic overloads. Thus, the control and balancing of output power from the engines can always be separately adjusted from the load power requirements of the traction motors by controlling a predetermined maximum load on the engines.

Figure 28:
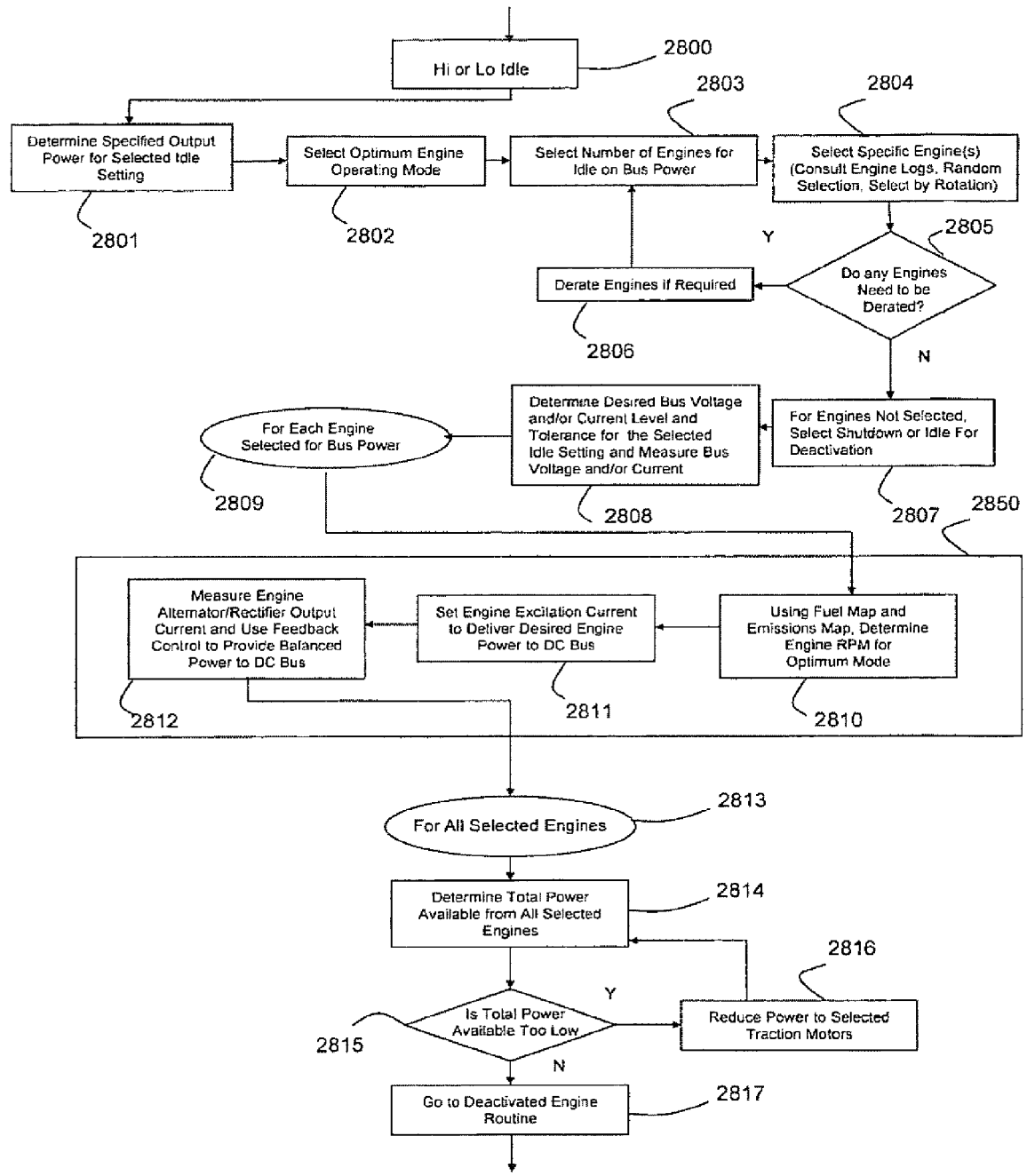
FIG. 28 is an example of a flow chart for selecting and configuring engines for any of number of idle settings with multiple engines in series.

FIG. 28 shows an example of a flow chart for automated selection and configuration of multiple engines in series for any of number of idle settings 2800. Typically, a locomotive has a high idle and a low idle setting. The latter may be used, for example, to minimize fuel consumption for long periods of idle. This figure illustrates the process for a locomotive that has an independent means of load control similar to that described in FIG. 27, which is a preferred embodiment. As can be appreciated, the process can be modified for a locomotive that does not have an independent means of load control such as described in FIG. 26. The next step 2802 is to determine the desired engine operating mode. Examples of operating modes are described in the discussion of FIG. 26. The choice may be determined by the engineer or by a predetermined algorithm based on data from the locomotive's route location and requirements for the zone in which the locomotive or consist member is operating. The next step 2803 is to determine the number of engines operative to idle and provide power to the DC bus. Step 2803 may be carried out by an algorithm controlled by an on-board computer. It may also be based on a predetermined lookup table which associates each idle setting and its various operating modes with an operating point such as described in FIGS. 3 and 4. It is also possible that, at some idle settings, all but one of the engines can be set at or near the selected operating points and the all but one engine can be used to balance out the total selected idle power by being set at a non-optimum operating point. Alternately, the all but one engine can be used to balance out the total selected notch power by using its alternator voltage boost, if available, to independently control its output voltage and thus can also be set at a its optimum operating point. This provides a degree of control over power output and operating points that is not available with a single large engine. In the step 2803 where all the engines are the same, selection of the number of engines operative to provide power to the DC bus is typically done by dividing the power requirement determined in step 2801 by the power rating of the engines and rounding the resulting number upwards. In the step 2803 where all the engines are the same and in series, selection of the number of engines operative to provide power to the DC bus can also be done by dividing the desired DC bus voltage determined in step 2801 by the output voltage rating of the engines and rounding the resulting number upwards.

In the case where there are engines of differing power ratings, the selection algorithm may be more involved so as to balance the power contribution from each engine. In either case, the algorithm that selects the number of engines may consider the operating history of the engines, as indicated by step 2804, so as to avoid using some engines more than others and thereby approximately balancing the usage and maintenance period of the engines. Although less preferable than consulting an engine log, the selection algorithm may be engine selection by random number between one and the number of available engines, which, over time, should tend to even out engine usage. The selection algorithm may be engine selection by rotation to the next engine in an engine sequence which, over time, should also tend to even out engine usage. In the next step 2805, a selected engine may need to be derated. If an engine is required to be derated 2806, then the procedure returns to step 2803 to re-select the number of engines since the derated engine may require an additional engine to provide the required idle power. In the next step 2807, the engines not selected for providing power to the DC bus are identified for deactivation and may be selected to be idled but not providing power to the DC bus, or shut down to be deactivated. This deactivation procedure is controlled in step 2513 of the main flow chart (FIG. 25) and fully described in FIG. 30.

In the preferred load control embodiment, the next step 2808 is to set the desired nominal value and range for the DC bus voltage and/or current. The range is preferably ±75 volts from the nominal DC bus voltage, more preferably ±50 volts from the nominal DC bus voltage, and most preferably ±25 volts from the nominal DC bus voltage. This voltage may be set at a different predetermined value for each idle setting but most preferably at the same predetermined value for all idle settings.

The next step 2809 begins an internal control loop 2850 for each engine to obtain a balanced power flow from each engine. Each engine has a fuel map and an emissions map or maps. In step 2810, the rpms of the selected engine is determined so as to produce the required power at the specific fuel consumption and emissions rate corresponding to the operating mode selected in step 2802. In step 2811, the excitation current for the alternator of each engine is selected to provide an alternator output voltage to match the selected DC bus voltage. When available, the amount of alternator boost may also be used to generate output voltage to fall within the range of the DC bus voltage and/or bus current measured in step 2808. Step 2812 is a step where the net output voltage of each engine system is measured at the output of each alternator's rectifier circuit. This voltage times the DC bus current is a direct measure of the power flowing from the selected engine. An engine system output voltage measurement is a sensitive and direct measure of power output of the engine system to the DC bus for the series engine configuration. In the series engine configuration, if the bus current is not known, the engine system output voltages are a relative measurement of power output of the engine system to the DC bus since the sum of all the series connected engine system output voltages equals the bus voltage (see FIG. 21).

The measured voltage is used in a second control feedback loop to modify the engine's alternator excitation current to bring the engine's power contribution into balance with its pro rata portion of the total power to the DC bus. This feedback and balancing can be done if the absolute power or relative power of each engine is so measured. In the case where all engines are set to the same output power, each engine is balanced to deliver the same amount of power as the other engines within a predetermined tolerance, preferably about ±5%. This control feedback loop is designed to be a stable feedback process commonly carried out automatically for each engine by one of a number of well-known proportional integral differential ("PID") control algorithms.

The next step 2813 is executed for all engines after all engines have been set via internal control loop 2850. In step 2814, the total power from all engines to the DC bus is determined, preferably by measuring the voltage at the output of each engine system and multiplying the sum by the measured DC bus current and less preferably by measuring the voltage at the output of each engine system and multiplying the sum by an estimated DC bus current (for example by measuring the current flowing to each traction motor, auxiliary power supply and other sources of power draw and summing these). If the total power is too low 2815 to provide the required power to provide for the idling locomotive, then the idle setting may be changed 2816 to a higher setting, the power provided at the selected idle setting may be increased or the power required by the locomotive may be reduced. A reduction in the hotel power required for a passenger train idling in a station is an example of the latter. Once the allocation of power to the auxiliary power needs is set to match the available power from all the idled but power-contributing engines, the algorithm proceeds to the engine deactivation control loop 2817.

Figure 29:
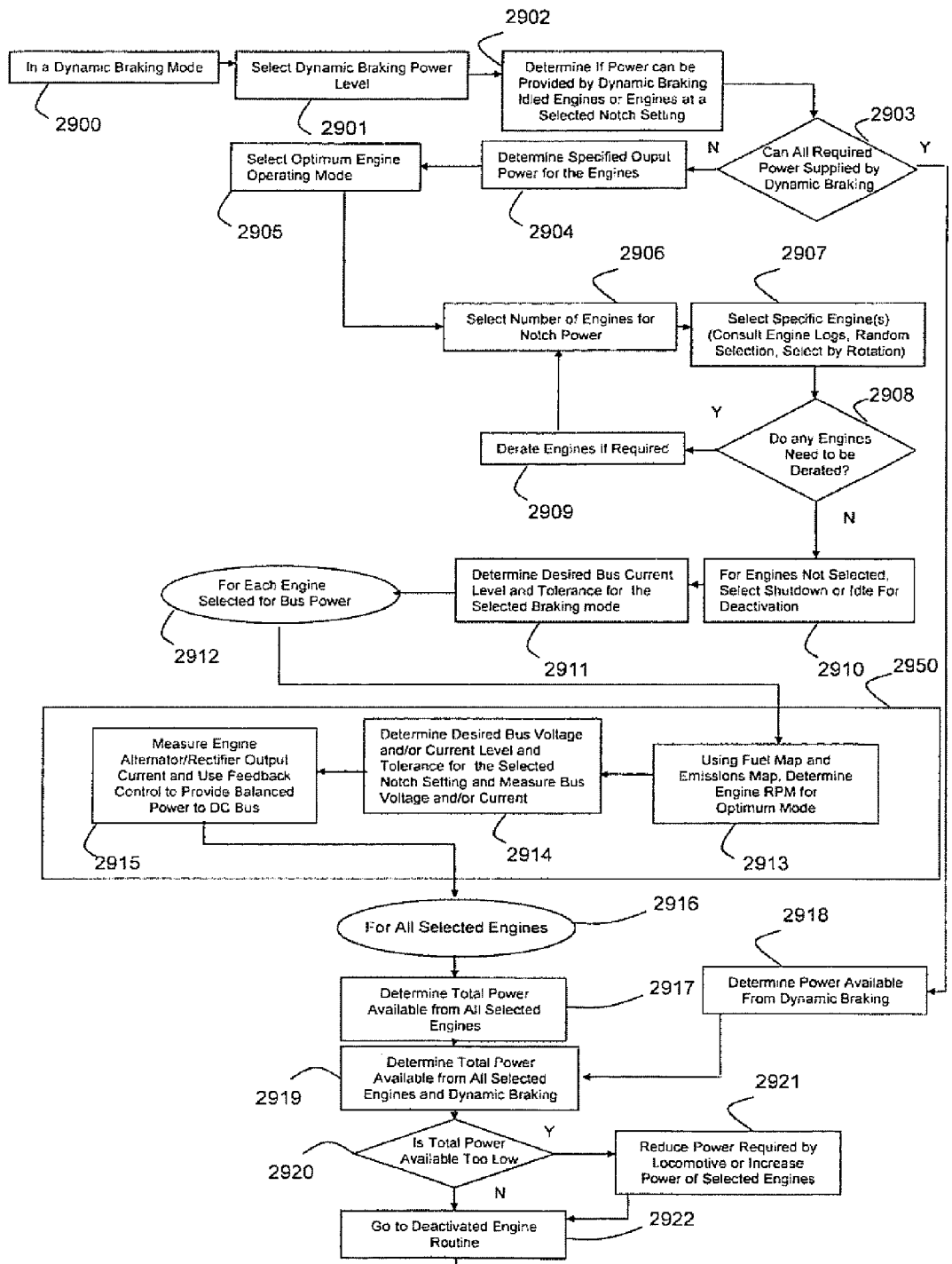
FIG. 29 is an example of a flow chart for selecting and configuring engines for dynamic braking with multiple engines in series.

FIG. 29 shows an example of a flow chart for automated selection and configuration of multiple engines in series for dynamic braking 2900. This figure illustrates the process for a locomotive that has an independent means of load control similar to that described in FIG. 26, which is a preferred embodiment. It is understood that the traction motors act as generators during dynamic braking and can provide power back to flow to the DC bus. As can be appreciated, the power level provided by dynamic braking can be controlled by power control circuits associated with the traction motors.

The first step 2901 is to estimate the power required by the locomotive during the projected period that the locomotive is expected to be in dynamic braking mode. This can be accomplished using the information available on the locomotive's location along its route and its projected route. The next step 2902 is to determine whether the projected power requirements can be met by dynamic braking or whether some engine power will also be required. If all the required power can be supplied by dynamic braking 2903, then no engines need be engaged to provide power to the DC bus. This situation can arise, for example, if the train is traveling down a lengthy grade. In this case, the power from dynamic braking may exceed the auxiliary requirements of the locomotive and some of the dynamic braking energy may be switched to a resistive grid for dissipation. As can be appreciated, substantial auxiliary power may be required to operate the traction motor blowers that provide cooling during high current operation typical of dynamic braking and this may require some engine power to the DC bus. In the case where dynamic braking is intermittent or only operative for a short period, engines may be required to provide additional power to the DC bus. If engines are required, they may be operated in an idle setting or a notch power setting, depending on the locomotive's requirements. For example, a road switcher may not require substantial auxiliary power during braking but a commuter train with a large hotel load, may require more power than is available through dynamic braking alone. If engines are required, the next step 2904 is to set the output power required by the engines.

The next step 2905 is to determine the desired operating mode of the engines. Examples of operating modes include a maximum fuel efficiency mode, a minimum emissions mode, a combination mode of good fuel efficiency and low emissions and an optimum engine lifetime mode. The choice may be determined by the engineer or by a predetermined algorithm based on data from the locomotive's route location and requirements for the zone in which the locomotive or consist member is operating. The next step 2906 is to determine the number of engines operative to provide power to the DC bus. This step, which is essentially the same as that described in step 2604 of FIGS. 26 and 2704 in FIG. 27 is typically done by dividing the power requirement determined in step 2904 by the power rating of the engines and rounding the resulting number upwards in the case where all the engines are the same. In the step 2904 where all the engines are the same and in series, selection of the number of engines operative to provide power to the DC bus can also be done by dividing the desired DC bus voltage determined in step 2901 by the output voltage rating of the engines and rounding the resulting number upwards. In the case where there are engines of differing power ratings, the selection algorithm may be more involved so as to balance the power contribution from each engine. In either case, the algorithm that selects the number of engines may consider the operating history of the engines, as indicated by step 2907, so as to avoid using some engines more than others and thereby approximately balancing the usage and maintenance period of the engines. Although less preferable than consulting an engine log, the selection algorithm may be engine selection by random number between one and the number of available engines, which, over time, should tend to even out engine usage. The selection algorithm may be engine selection by rotation to the next engine in an engine sequence which, over time, should also tend to even out engine usage.

In the next step 2908, a selected engine may need to be derated. If an engine is required to be derated 2909, then the procedure returns to step 2906 to re-select the number of engines since the derated engine may require an additional engine to provide the required idle power. In the next step 2910, the engines not selected for providing power to the DC bus are identified for deactivation and may be selected to be idled but not providing power to the DC bus, or shut down to be deactivated. This deactivation procedure is controlled in step 2513 of the main flow chart (FIG. 25) and fully described in FIG. 16.

In the preferred load control embodiment, the next step 2911 is to set the desired nominal value and range for the DC bus voltage and/or current. The range is preferably ±75 volts from the nominal DC bus voltage, more preferably ±50 volts from the nominal DC bus voltage, and most preferably ±25 volts from the nominal DC bus voltage. This voltage may be set at a different predetermined value depending on the amount of power estimated from dynamic braking and from the power that can be supplied by the engines. It also depends whether the engines will provide power from an idle setting (such as for example high idle) or from a notch power setting.

The next step 2912 begins an internal control loop 2950 for each engine to obtain a balanced power flow from each engine. Each engine has a fuel map and an emissions map or maps. In step 2913, the rpms of the selected engine is determined so as to produce the required power at the specific fuel consumption and emissions rate corresponding to the operating mode selected in step 2905. In step 2914, the excitation current for the alternator of each engine is selected to provide an alternator output voltage to match the selected DC bus voltage and/or bus current. Step 2915 is a step where the net output voltage of each engine system is measured at the output of each alternator's rectifier circuit. This voltage times the DC bus current is a direct measure of the power flowing from the selected engine. An engine system output voltage measurement is a sensitive and direct measure of power output of the engine system to the DC bus for the series engine configuration. In the series engine configuration, if the bus current is not known, the engine system output voltages are a relative measurement of power output of the engine system to the DC bus since the sum of all the series connected engine system output voltages equals the bus voltage (see FIG. 21). The measured voltage is used in a second control feedback loop to modify the engine's alternator excitation current to bring the engine's power contribution into balance with its pro rata portion of the total power to the DC bus. This feedback and balancing can be done if the absolute power or relative power of each engine is so measured. In the case where all engines are set to the same output power, each engine is balanced to deliver the same amount of power as the other engines within a predetermined tolerance, preferably about ±5%. This control feedback loop is designed to be a stable feedback process commonly carried out automatically for each engine by one of a number of well-known proportional integral differential ("PID") control algorithms.

The next step 2916 is executed for all engines after all engines have been set via internal control loop 2950. In step 2917, the total power from all selected engines is determined, preferably by measuring the voltage at the output of each engine system and multiplying the sum by the measured DC bus current and less preferably by measuring the voltage at the output of each engine system and multiplying the sum by an estimated DC bus current (for example by measuring the current flowing to each traction motor, auxiliary power supply and other sources of power draw and summing these). The power available from dynamic braking is determined in step 2918. The total power available to the locomotive or consist member is determined in step 2919 which is the sum of the power to the DC bus from the engines and dynamic braking. If the total power is too low 2920 to provide the required power for the braking locomotive, then the power provided by the selected engines may be increased 2921 or the power required by the locomotive may be reduced 2921. Once the allocation of power to the auxiliary power needs is set to match the available power from the selected engines and dynamic braking, the algorithm proceeds to the engine deactivation control loop 2922.

Figure 30:
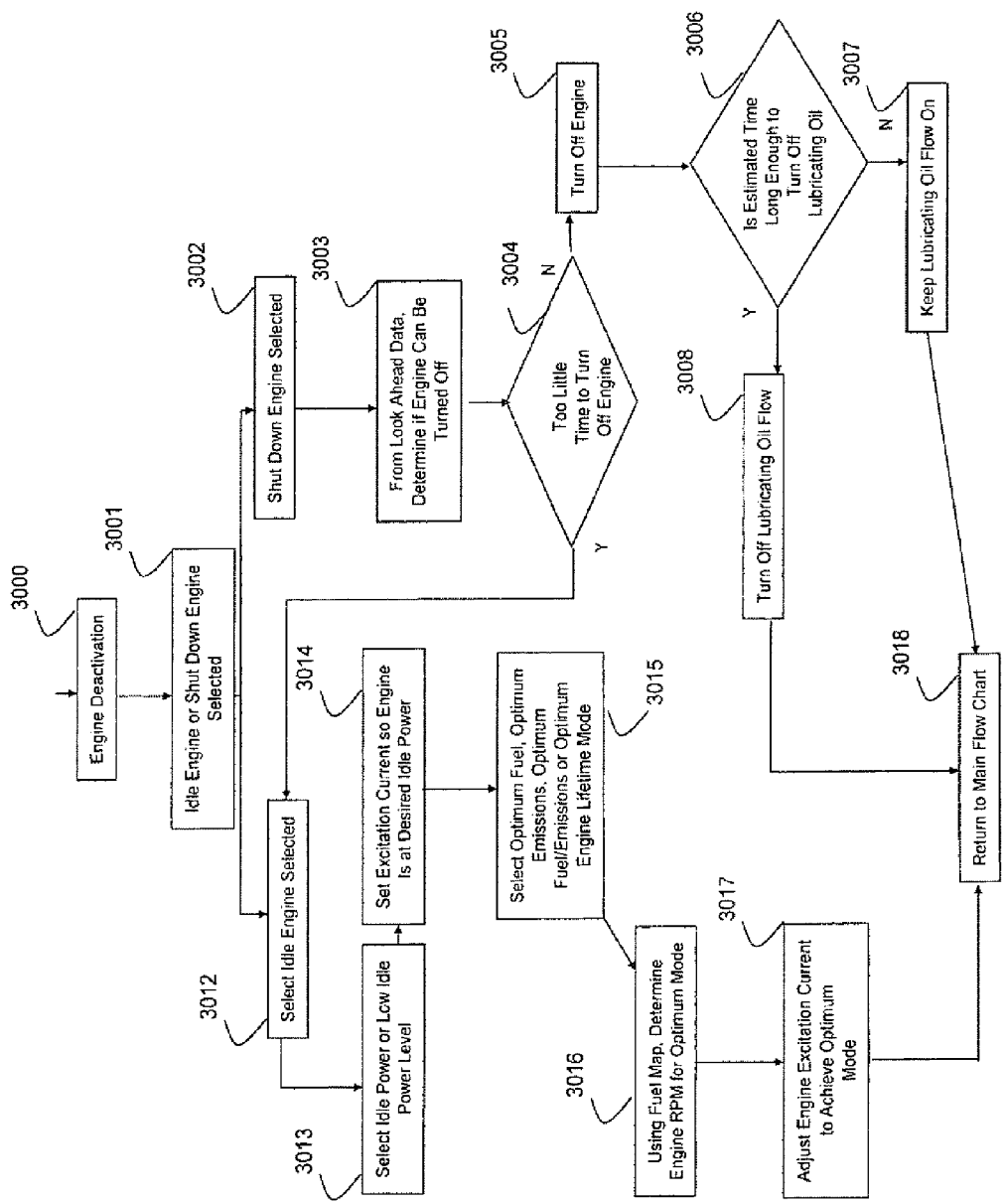
FIG. 30 is an example of a flow chart for controlling engine deactivation with multiple engines in series.

FIG. 30 is an example of a flow chart for controlling engine deactivation 3000 for a locomotive with multiple engines in series. Deactivation means idling an engine so that it does not provide power to the DC bus; or shutting off the engine.

In step 3001, an engine is selected to be idled or shut down for deactivation. If shut down is selected 3002, then the look-ahead route information is queried 3003 to determine if the engine may be needed within a first predetermined time 3004 in which case the shut down selection would not be efficient. If there is too little time before the engine is required again, then the idle mode for deactivation is automatically selected 3012. If there is sufficient time to shut down the engine, then the engine is selected to be turned off 3005.

Again, the look-ahead route information is queried 3006 to determine if the engine may be needed within a second predetermined time 3006. Typically, the second predetermined time is longer than the first predetermined time. For example, the second predetermined time may be associated with long periods of low speed operation or idling.

If there is too little time before the engine is required again, then the engine lubricating oil circulation is maintained operative 3007. If there is sufficient time to turn off the lubricating oil circulation system, it is turned off 3008. If idling is selected 3012 for engine deactivation, the next step 3013 is to determine the power associated with the idle setting selected by the engineer. The next step 3014 is to set engine alternator excitation current so that the alternator output is approximately zero so no power is supplied to the DC bus. The next step 3015 is to determine the desired operating mode. Examples of operating modes include a maximum fuel efficiency mode, a minimum emissions mode, a combination mode of good fuel efficiency and low emissions and an optimum engine lifetime mode.

The next step 3016 is to use the engine's fuel map to determine the engine idle rpms to achieve the operating mode selected in step 3015. Step 3017 is optional and is used to adjust excitation current to move the operating point closer to the optimum value selected in step 3015 while ensuring the engine system output voltage remains approximately zero so no power is supplied to DC bus. Once the selected engine is deactivated by idling or turning it off (with or without the lubricating oil circulating), then the algorithm returns to the main flow control chart 3018.

Figure 31:
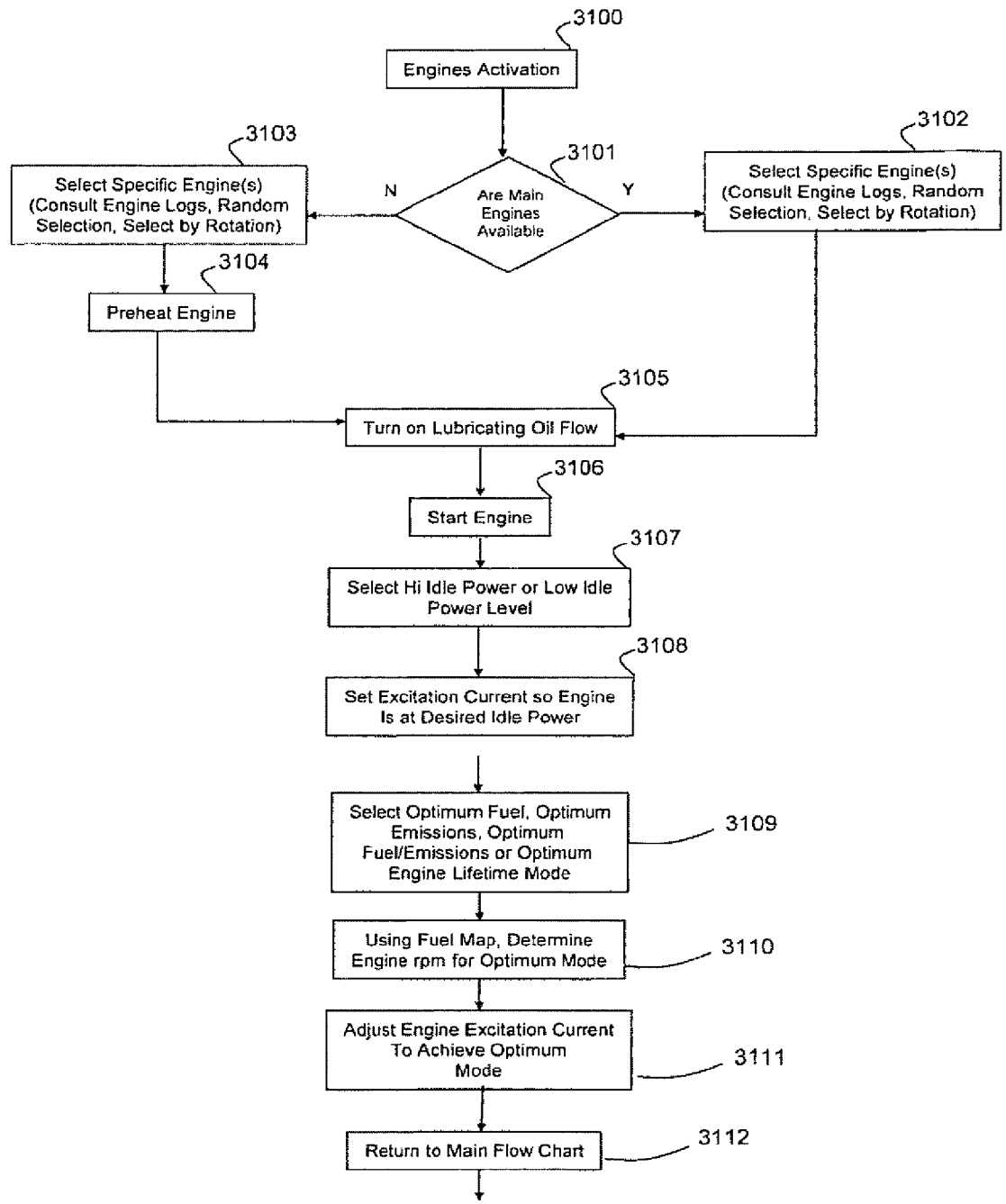
FIG. 31 is an example of a flow chart for activating an engine with multiple engines in series.

FIG. 31 is an example of a flow chart for controlling activating an engine 3100 for a locomotive with multiple engines in series. The first step 3101 is to determine if warm engines are available. In either case, the algorithm that selects the engines may consider the operating history of the engines, as indicated by step 3102 or 3103, so as to avoid using some engines more than others and thereby approximately balancing the usage and maintenance period of the engines. Although less preferable than consulting an engine log, the selection algorithm may be engine selection by random number between one and the number of available engines, which, over time, should tend to even out engine usage. The selection algorithm may be engine selection by rotation to the next engine in an engine sequence which, over time, should also tend to even out engine usage. If there are no warm engines available, then the selected engine is preheated 3104.

Thereafter, the lubricating oil flow for the selected engine is turned on 3105. The selected engine is then started 3106 and set to one of the available idle settings 3107 as selected by the engineer. The next step 3108 is to set engine alternator excitation current so that the engine system output voltage remains approximately zero so no power is supplied to DC bus. The next step 3109 is to determine the desired operating mode.

Examples of operating modes include a maximum fuel efficiency mode, a minimum emissions mode, a combination mode of good fuel efficiency and low emissions and an optimum engine lifetime mode. The next step 3110 is to use the engine's fuel map to determine the engine idle rpms to achieve the operating mode selected in step 3109. Step 3111 is optional and is used to adjust excitation current to move the operating point closer to the optimum value selected in step 3109 while ensuring the engine system output voltage remains approximately zero so no power is supplied to DC bus. Once the selected engine is activated, then the algorithm returns to the main flow control chart 3112.

Figure 32:
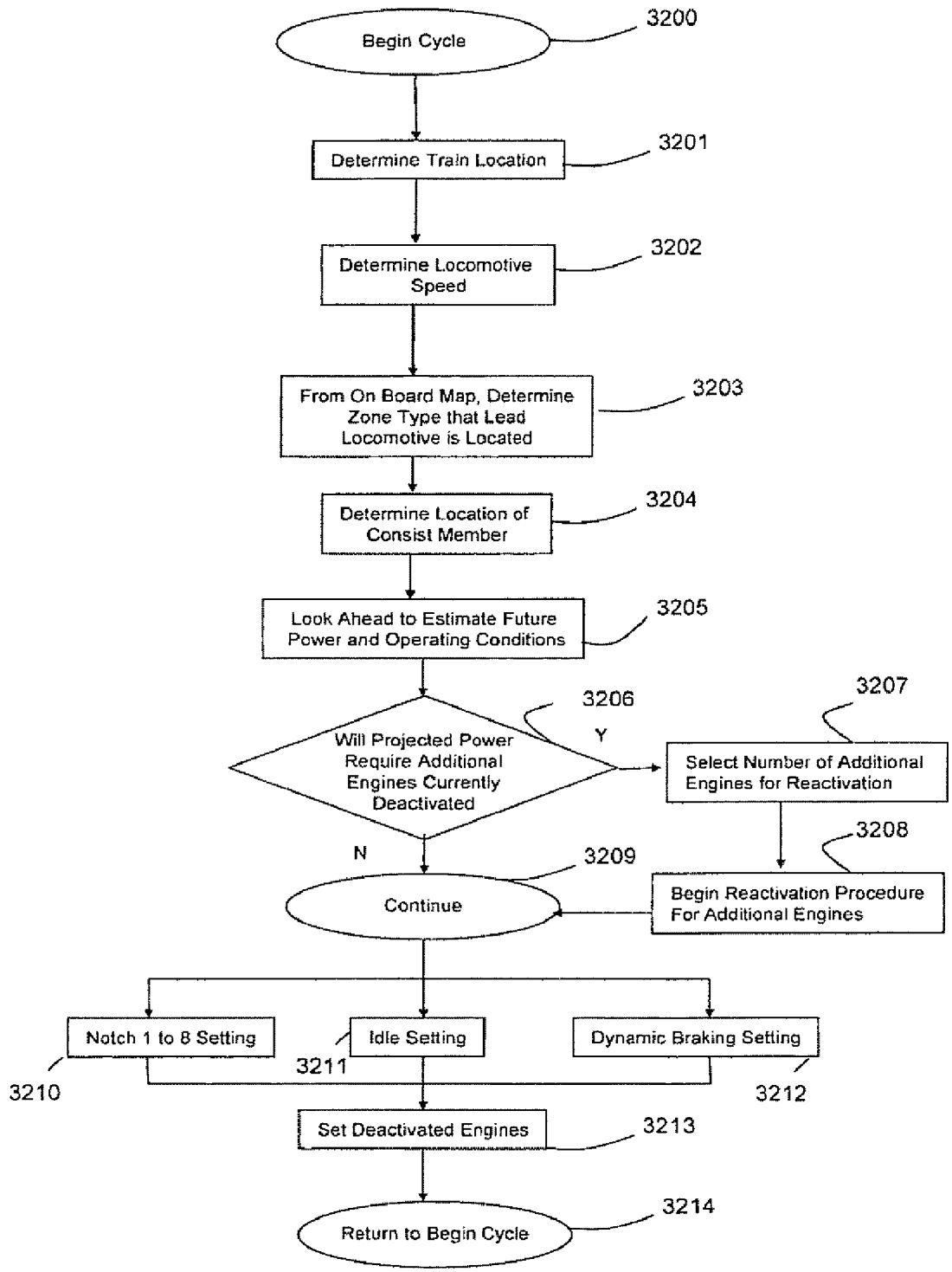
FIG. 32 is another example of a main flow chart of automated decision making for controlling the overall multi-engine selection process with multiple engines in series.

The following is an example of a more elaborate location-based automated computer-controlled engine operating cycle for a multi-engine locomotive, otherwise it is similar to the basic operating cycle described in FIG. 24. As can be appreciated, many of the steps can be carried out in different sequences and some of the steps may be optional. FIG. 32 is another example of a main flow chart of automated decision making for controlling the overall multi-engine selection process and illustrates an automated cycle that begins 3200. The first step 3201 in the decision cycle is to determine the train's location along its route at the time in question. This capability can be provided by, for example, a Global Positioning System ("GPS") device, a radio, a cell phone or by a transponder or mechanical locator situated along the track. The next step 3202 in the decision cycle is to determine the speed of the locomotive. For a given notch power setting, this determination allows the tractive effort, traction motor power, traction motor rpms, traction motor back emf, traction motor volts and traction motor current to be computed. If the locomotive is idling and at rest, this step is trivial. The next step 3203 in the decision cycle is to determine the zone that the train is located in along its route. This can be done, for example, by using the train's determined location and an on-board computer containing a detailed physical (2D or 3D as required) map of the train route and route requirements, to determine when the locomotive is in a zone where any of a number of emissions, noise restrictions and speed restrictions must be observed or where certain locomotive performance is required. An example of the latter may be high acceleration such as, for example, exiting a station. The next step 3204 is to determine the location of the locomotive consist member in the train, typically from the train location device in the lead locomotive and from the knowledge of the number of cars that the consist member is removed from the lead locomotive. If there is only one locomotive, this step is trivial. In a long train where consist members may be at various locations, this step is included since consist members can be located in different operating zones. The next step 3205 is to look ahead to project energy, emissions, noise and power requirements of the lead locomotive and all consist members for each section or zone of the train's up and coming route. In step 3206, the requirement for additional engines currently deactivated is established from the data acquired from step 3205. If additional engines are required, then the number of currently deactivated engines that must be activated is determined in step 3207. This engine activation step is described more fully in FIG. 17. The engine activation procedure is implemented in step 1105 and the cycle then continues 3208. The cycle then continues 3209. As noted above, the locomotive operating mode is commonly set by the locomotive's engineer. These are (1) a notch 1 to 8 power setting 3210, (2) an idle setting 3211, or (3) a dynamic braking setting 3212. For each of three power modes, it is possible that one or more engines may be deactivated.

Deactivation means idling an engine so that it does not provide power to the DC bus, or shutting off the engine. The deactivation of engines is controlled in step 3213. Step 3214 returns to the beginning of the main control cycle.

Figure 33:
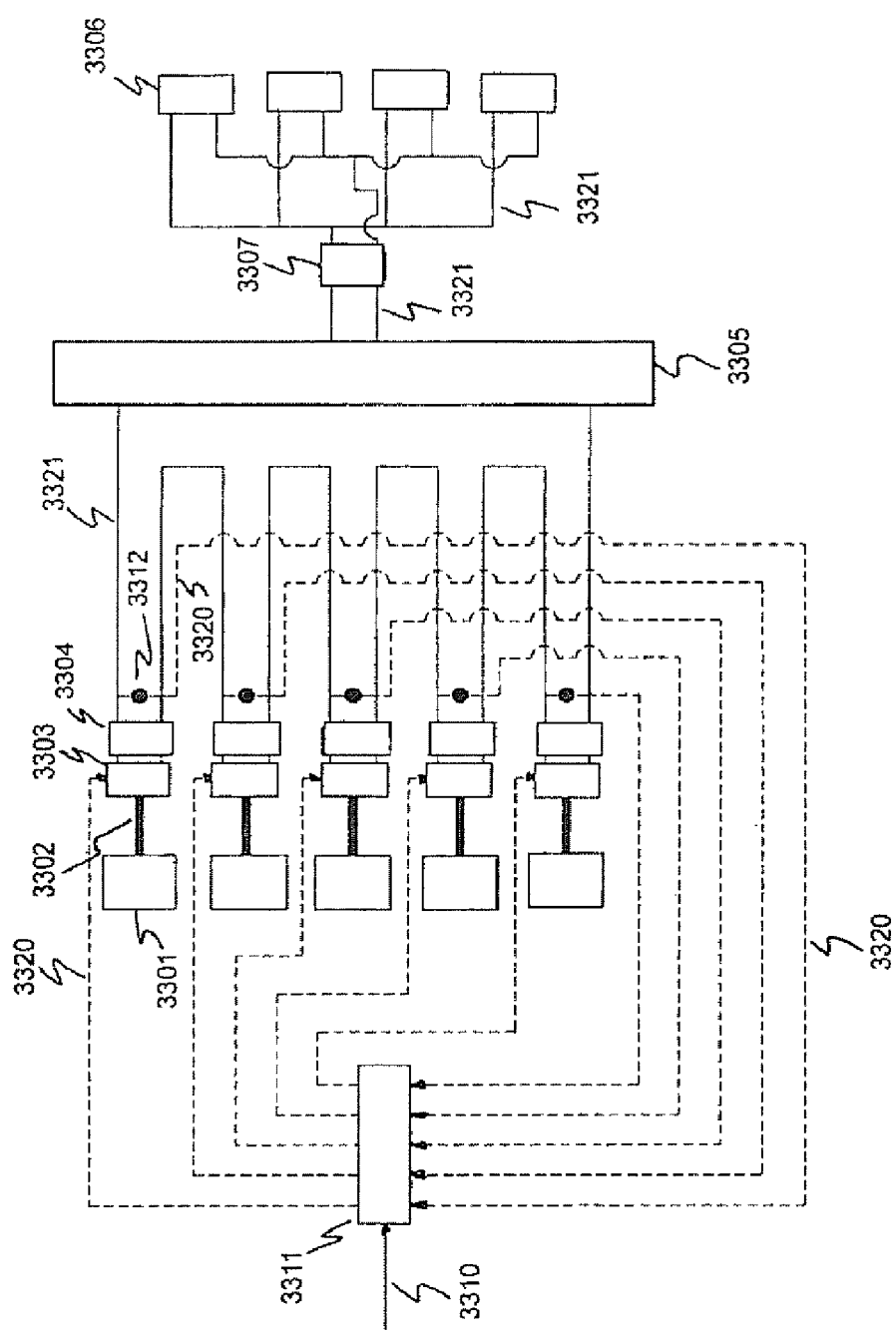
FIG. 33 is a schematic of a multi-engine current-based control feedback system with multiple engines in series.

FIG. 33 is a schematic of a preferred embodiment of multi-engine voltage-based control feedback system with multiple engines in series. This schematic shows five engines 3301, each connected by mechanical shafts 3302 to corresponding alternators 3303. Rectifiers 3304 are electrically connected to the outputs of alternators 3303 to provide DC power to a common DC bus 3305. In this embodiment, the output of the DC bus 3305 provides power to four traction motors 3306, where a single load control apparatus 3307 controls the flow of power to all the traction motors 3306. The load controlled traction motors are shown connected in parallel with the load control apparatus 3307. The electrical outputs of the engine systems are connected in series with the DC bus 3305. This figure illustrates a preferred engine balancing control feedback loop. An input command 3310 (for example a selected power level) is issued to a controller 3311.

The output voltages from each engine system are measured by voltage sensors 3312 which are monitored by the controller 3311. The controller 3311 then uses the measured voltages in a control feedback loop to modify each engine's alternator 3303 excitation current (or alternator voltage boost if available) to bring each engine's power contribution into balance with its pro rata portion of the total power to the DC bus. The control feedback loop is typically one of a number of well-known proportional integral differential ("PID") control algorithms. The dotted lines 3320 represent voltage feedback control circuit connections while the solid lines 3321 represent power distribution circuit connections.

Figure 34:
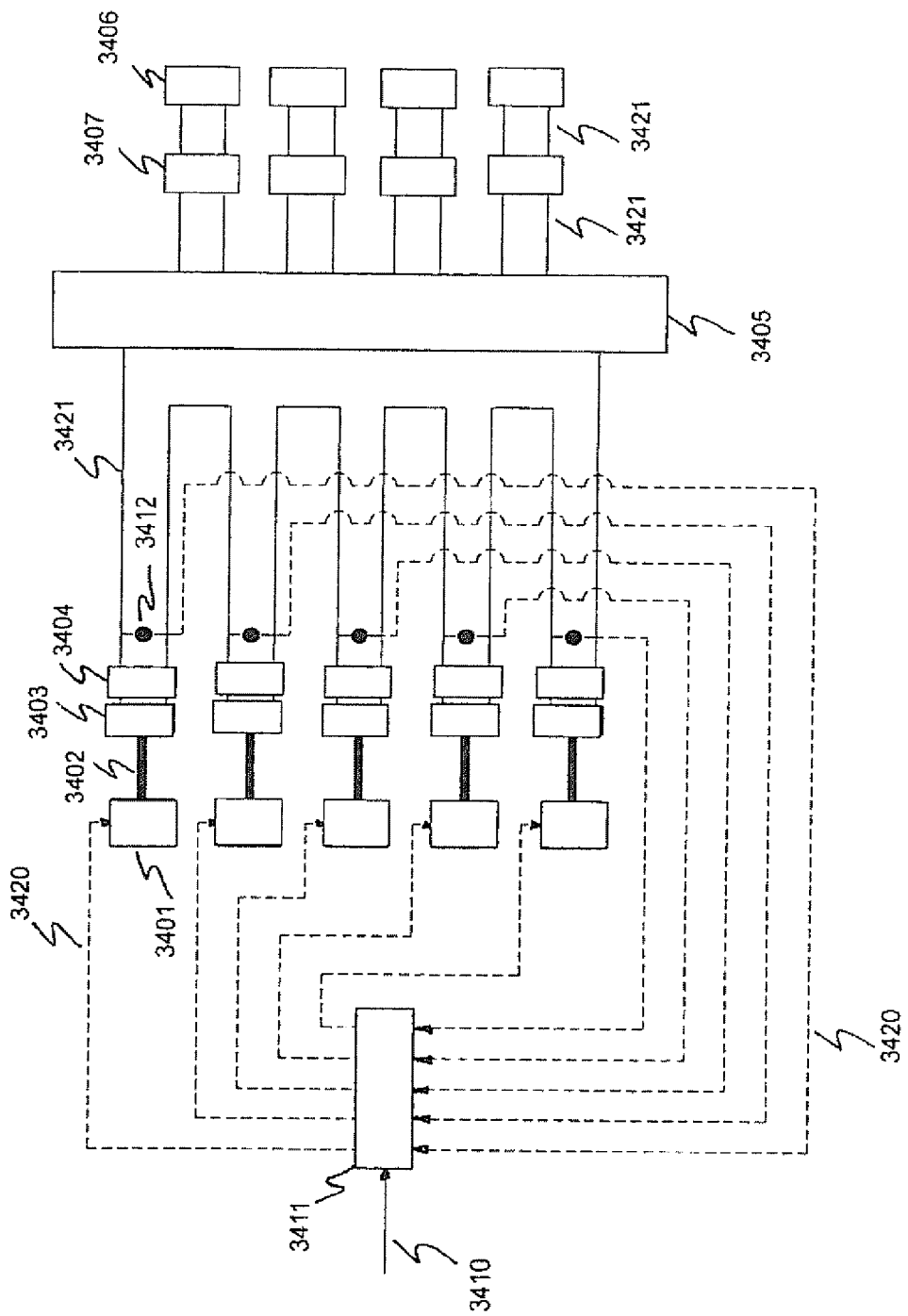
FIG. 34 is a schematic of an alternate multi-engine current-based control feedback system with multiple engines in series.

FIG. 34 is a schematic of an alternate multi-engine voltage-based control feedback system with multiple engines in series. This schematic shows five engines 3401, each connected by mechanical shafts 3402 to corresponding alternators 3403. Rectifiers 3404 are electrically connected to the outputs of alternators 3403 to provide DC power to a common DC bus 3405. In this embodiment, the output of the DC bus 3405 provides power to four traction motors 3406, each shown with load control apparatuses 3407. The electrical outputs of the engine systems are connected in series with the DC bus 3405. The load controlled traction motors are also shown connected in parallel with the DC bus 3405. This figure illustrates a less preferred engine balancing control feedback loop. An input command 3410 (for example a selected power level) is issued to a controller 3411. The output voltages from each engine system are measured by voltage sensors 3412 which are monitored by the controller 3411. The controller 3411 then uses the measured voltages in a control feedback loop to modify each engine's 3401 speed to bring each engine's power contribution into balance with its pro rata portion of the total power to the DC bus. The control feedback loop is typically one of a number of well-known proportional integral differential ("PID") control algorithms. The dotted lines 3420 represent voltage feedback control circuit connections while the solid lines 3421 represent power distribution circuit connections. This feedback control configuration is less preferable because (1) it is preferred to maintain the engine speed and power output at its optimum operating mode set point and (2) the mechanical inertia of changing engine speeds tends to make the feedback less responsive.

As can be appreciated, it is possible to use the measured engine system's output voltage to adjust or modify a combination of engine speed, engine alternator excitation current and, if available, alternator voltage boost to balance the power outputs of all the engines to the DC bus.

Figure 35:
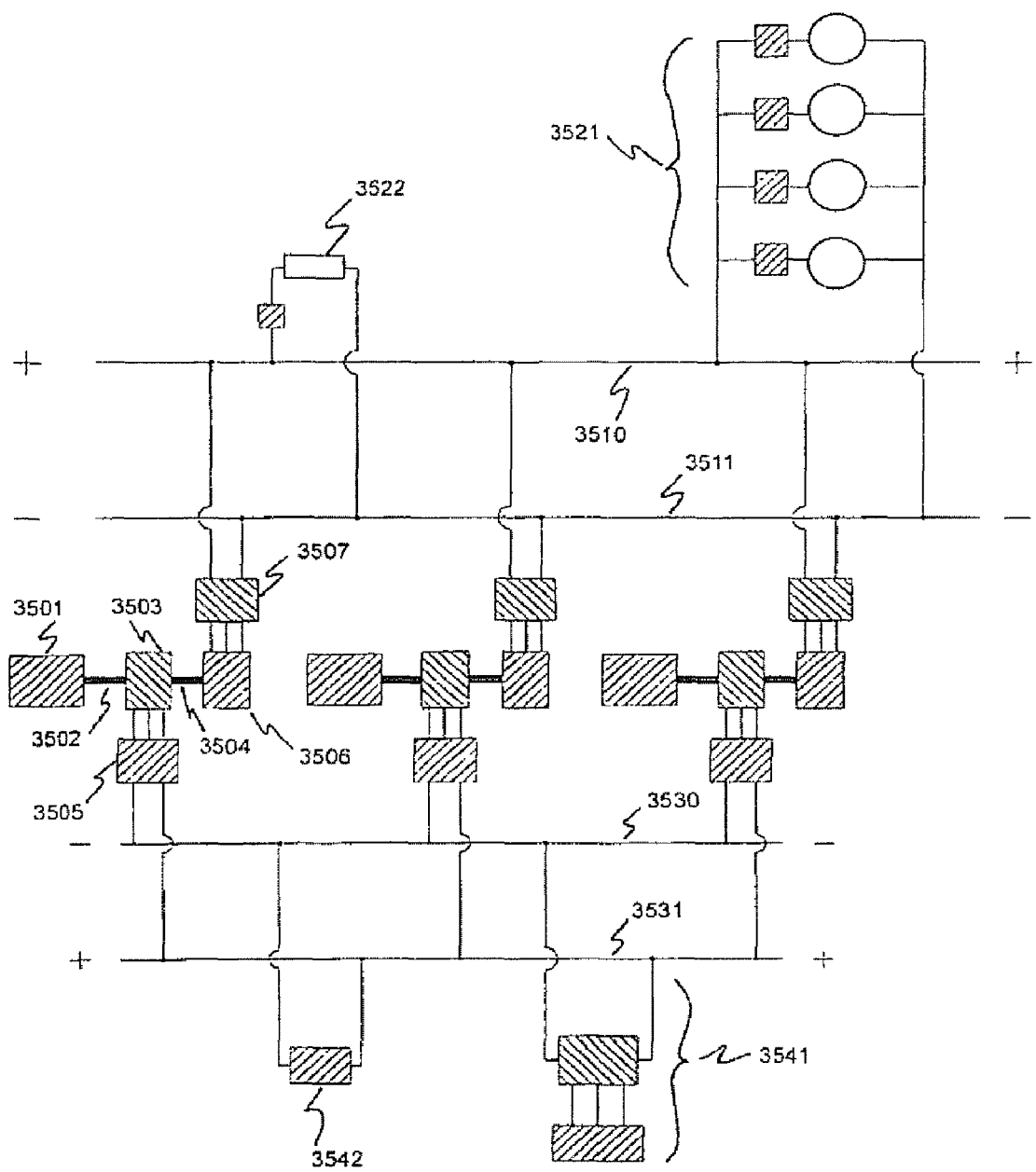
FIG. 35 is a schematic block diagram of a propulsion system for a multi-engine locomotive with multiple engines in parallel and a hybrid auxiliary power system.

FIG. 35 is a schematic block diagram of a propulsion system for a multi-engine locomotive with multiple engines in parallel and a hybrid auxiliary power system. In this configuration, three engines 3501 are used. Each engine 3501 drives a flywheel starter alternator which is comprised of typically a smaller alternator 3503 which feeds power to an auxiliary power system DC bus and a typically larger alternator 3506 which feeds power to a main propulsion DC bus. Alternators 3503 and 3506 are driven by the output shaft of engine 3501 shown as shafts 3502 and 3504. The main propulsion DC bus represented by bus bars 3510 and 3511 receives DC power from rectifier circuits 3507.

In this example, the three engine systems are connected in parallel to both the main propulsion DC bus and the auxiliary DC bus. The main propulsion DC bus is shown here driving a four traction motor propulsion system 3521, each of which is comprised of an electrical energy converter and a motor. Also shown connected to the DC bus is a dynamic braking resistive grid 3522. The auxiliary power system DC bus represented by bus bars 3530 and 3531 receives DC power from rectifier circuits 3505 and are shown here providing power to an energy storage system 3542 (which may be a battery pack, a capacitor bank or a flywheel energy storage system for example) and an auxiliary power system 3541. As can be seen, the main propulsion DC bus can be operated at a different voltage and power level (typically higher) than the auxiliary power system DC bus (typically lower). The auxiliary power system DC bus system can be operated from the energy storage system alone such as for example when the locomotive is parked and requires lighting, heating or air-conditioning for example. The energy storage system can be recharged by plugging into an external power source or from the engines 3501 while the engines are idling or providing power to the main propulsion DC bus.

A conventional battery operated starter motor can be used to start an engine. Alternately, the voltage from the auxiliary DC bus, drawn from the energy storage device 3543, can be used with, for example, an induction alternator to provide electrical power to start one or more of the engines 3501. This method of starting engines is known and is used to provide high starting power without the need of a separate starter motor. A prelubrication pump can also be operated directly from the auxiliary DC bus or from an auxiliary power supply to lubricate a diesel engine just prior to starting it so as to extend its operational lifetime. While the above engine start-up procedures are well-known, they can be applied more readily utilizing the voltage control and DC bus architecture of the present invention.

As can be appreciated, the engine systems can be connected in either parallel or series to the main propulsion and auxiliary DC buses.

Figure 36:
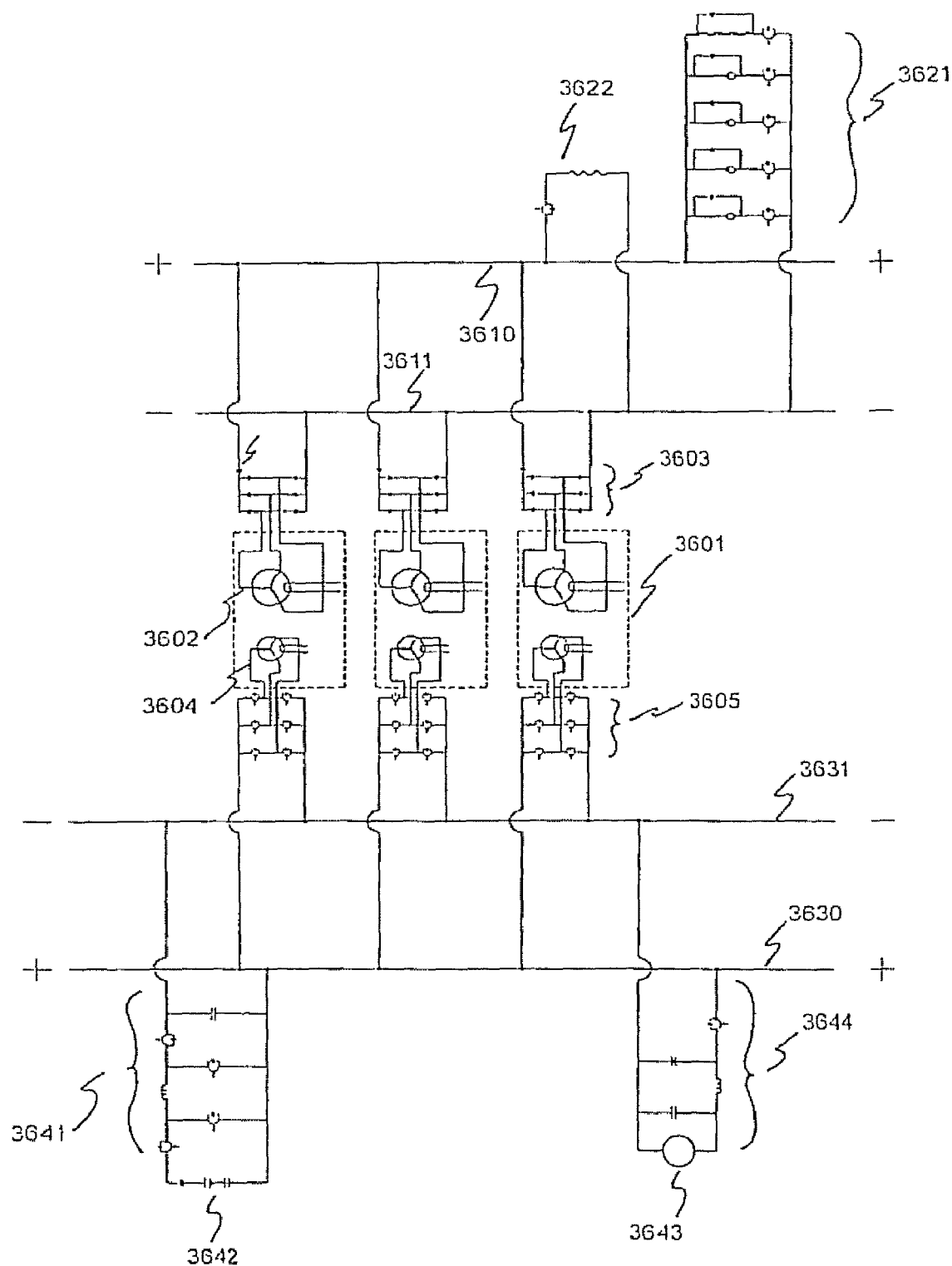
FIG. 36 is a schematic circuit diagram for a multi-engine locomotive with multiple engines in parallel and a hybrid auxiliary power system.

FIG. 36 is a schematic circuit diagram for a multi-engine locomotive with multiple engines in parallel and a hybrid auxiliary power system. In this configuration, three engines systems 3601 are used. Each engine drives a flywheel starter alternator which is comprised of a typically smaller alternator 3604 which feeds power to an auxiliary power system DC bus via an induction alternator and converter system 3605; and a typically larger alternator 3602 which feeds power to a main propulsion DC bus via diode rectifier system 3603. The main propulsion DC bus represented by bus bars 3610 and 3611 receives DC power from rectifier circuits 3603 and are shown here driving four traction motor systems 3621, each of which shown here, for example, as series wound DC motors with field coil reversers and chopper controlled freewheeling circuits. Also shown connected to the DC bus is a dynamic braking resistive grid 3622.

Engine systems 3604 are shown with induction alternator and converter systems 3605. The alternator and converter systems 3605 allow energy and power to flow to or from the auxiliary power DC bus. The battery pack 3641 may be used to provide power for starting one or more engines 3604 by any of a number of well-known methods. As can be appreciated, the energy storage system 3641 can also be a capacitor bank or a flywheel storage system. A similar electrical architecture for a multi-engine locomotive was disclosed previously in U.S. patent application Ser. No. 11/200,881 filed Aug. 19, 2005 entitled "Locomotive Power Train Architecture" and in U.S. Provisional patent application entitled "Marine Power Train Architecture" by Donnelly and Watson 25 filed Oct. 24, 2006.

The auxiliary power system DC bus represented by bus bars 3630 and 3631 receives DC power from alternator and converter systems 3605 and are shown here providing power to an energy storage system 3641 and its optional voltage buck/boost circuit 3642; and an auxiliary power system 3643 and its optional voltage boost circuit 3644. As can be seen, the main propulsion DC bus can be operated at a different voltage and power level (typically higher) than the auxiliary power system DC bus (typically lower). As described previously, the auxiliary power system DC bus system can be operated from the energy storage system alone.

Figure 37:
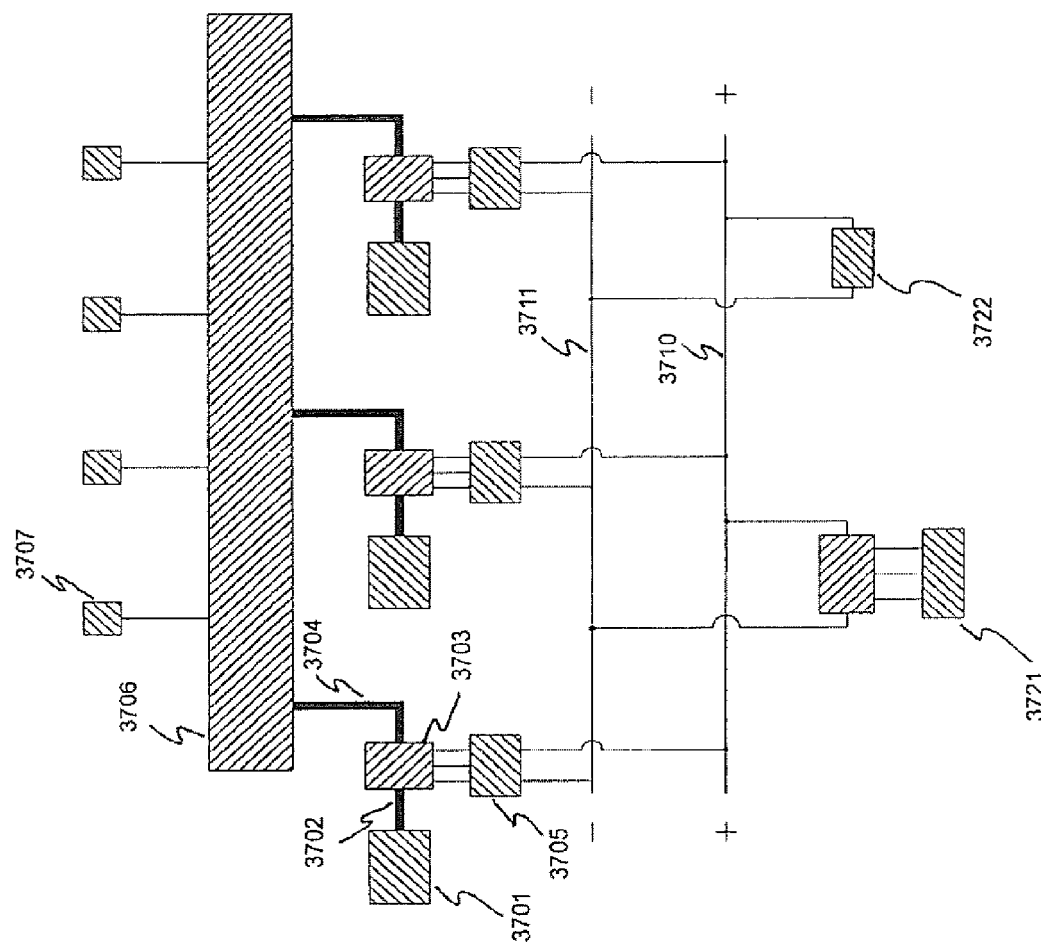
FIG. 37 is a schematic block diagram of an alternate propulsion system for a multi-engine locomotive with multiple engines in parallel and a hybrid auxiliary power system.

FIG. 37 is a schematic block diagram of an alternate propulsion system for a multi-engine locomotive with multiple engines in parallel and a hybrid auxiliary power system and is similar to the configuration shown in FIG. 35 except that the main propulsion system is driven by a mechanical transmission rather than by an electrical transmission. In this configuration, three engines 3701 are used. Each engine 3701 drives a flywheel starter alternator which is comprised of typically an alternator 3705 driven by the engine output shaft 3702 which feeds power to an auxiliary power system DC bus. Engine output shaft 3704 is connected to a mechanical transmission 3706 and is shown here driving four traction motor propulsion systems 3707.

The transmission 3706 may be a synchronous transmission which would require the engines 3701 to be operated synchronously or the transmission 3706 may be comprised of differential elements which would allow the engines 3701 to be operated asynchronously. The auxiliary power system DC bus represented by bus bars 3710 and 3711 receives DC power from alternator and converter systems 3705 and are shown here providing power to an energy storage system 3722 and an auxiliary power system 3721.

The auxiliary power system DC bus system can be operated from the energy storage system alone such as for example when the locomotive is parked and requires lighting, heating or air-conditioning for example. The energy storage system can be recharged by plugging into an external power source or from the engines 3701 when idling or providing power to the main propulsion DC bus.

Engine systems 3701 are shown with induction alternator and converter systems 3705. The alternator and converter systems 3705 allow energy and power to flow to or from the auxiliary power DC bus. The energy storage system 3722 may be used to provide power for starting one or more engines 3701 by any of a number of well-known methods. As can be appreciated, the energy storage system 3722 can be a battery pack, capacitor bank or a flywheel energy storage system.

Figure 38:
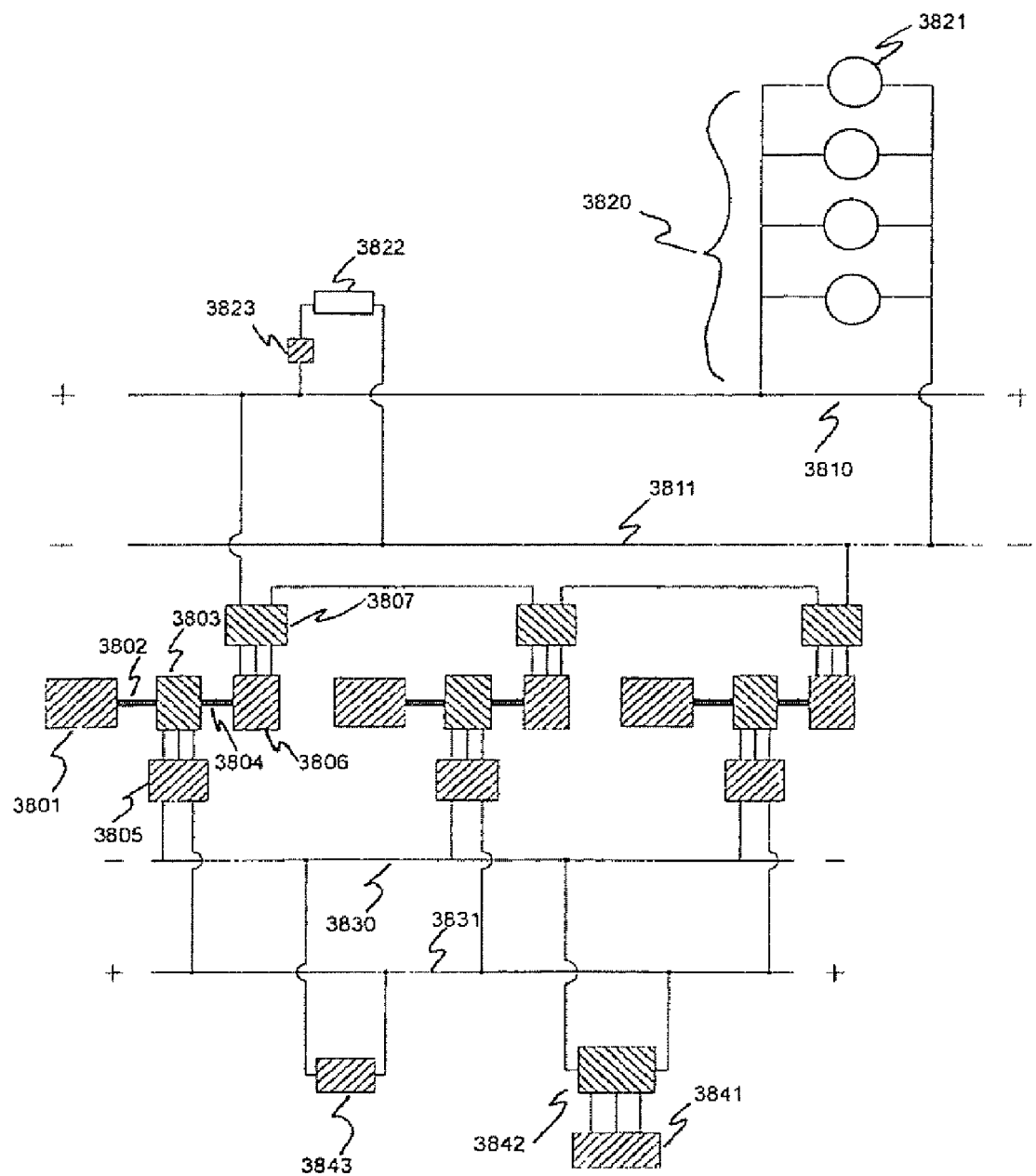
FIG. 38 is a schematic block diagram of yet another alternate propulsion system for a multi-engine locomotive with multiple engines in series and a hybrid auxiliary power system.

FIG. 38 is a schematic block diagram of yet another alternate propulsion system for a multi-engine locomotive with multiple engines in series and a hybrid auxiliary power system. In this configuration, three engines 3801 are used and are shown connected in series. A principal advantage of this configuration is that the traction motor voltage can be controlled by a) the number of engines providing power to the main propulsion bus; b) the engine speeds; and c) the alternator excitations. This eliminates the need for electrical energy converters connecting the traction motors to the main propulsion DC bus. Each engine 3801 drives a flywheel starter alternator which is comprised of typically a smaller alternator 3803 which feeds power to an auxiliary power system DC bus and a typically larger alternator 3806 which feeds power to a main propulsion DC bus. Alternators 3803 and 3806 are driven by the output shaft of engine 3801 shown as shafts 3802 and 3804. The main propulsion DC bus represented by bus bars 3810 and 3811 receives DC power from rectifier circuits 3807. In this example, the three engine systems are connected in series to the main propulsion DC bus and in parallel to the auxiliary DC bus. The main propulsion DC bus is shown here driving a four traction motor propulsion system 3820, each of which is comprised of only an AC or DC traction motor 3821. Also shown connected to the DC bus is a dynamic braking resistive grid 3822 and its on/off switch 3823. The auxiliary power system DC bus represented by bus bars 3830 and 3831 receives DC power from rectifier circuits 3805 and are shown here providing power to an energy storage system 3842 (which may be a battery pack, a capacitor bank or a flywheel energy storage system for example) and an auxiliary power system 3841. As can be seen, the main propulsion DC bus can be operated at a different voltage and power level (typically higher) than the auxiliary power system DC bus (typically lower). The auxiliary power system DC bus system can be operated from the energy storage system alone such as for example when the locomotive is parked and requires lighting, heating or air-conditioning for example. The energy storage system can be recharged by plugging into an external power source or from the engines 3801 while the engines are idling or providing power to the main propulsion DC bus.

A conventional battery operated starter motor can be used to start an engine. Alternately, the voltage from the auxiliary DC bus, drawn from the energy storage device 3843, can be used with, for example, an induction alternator to provide electrical power to start one or more of the engines 3801. This method of starting engines is known and is used to provide high starting power without the need of a separate starter motor. A prelubrication pump can also be operated directly from the auxiliary DC bus or from an auxiliary power supply to lubricate a diesel engine just prior to starting it so as to extend its operational lifetime. While the above engine start-up procedures are well-known, they can be applied more readily utilizing the voltage control and DC bus architecture of the present invention.

Figure 39:
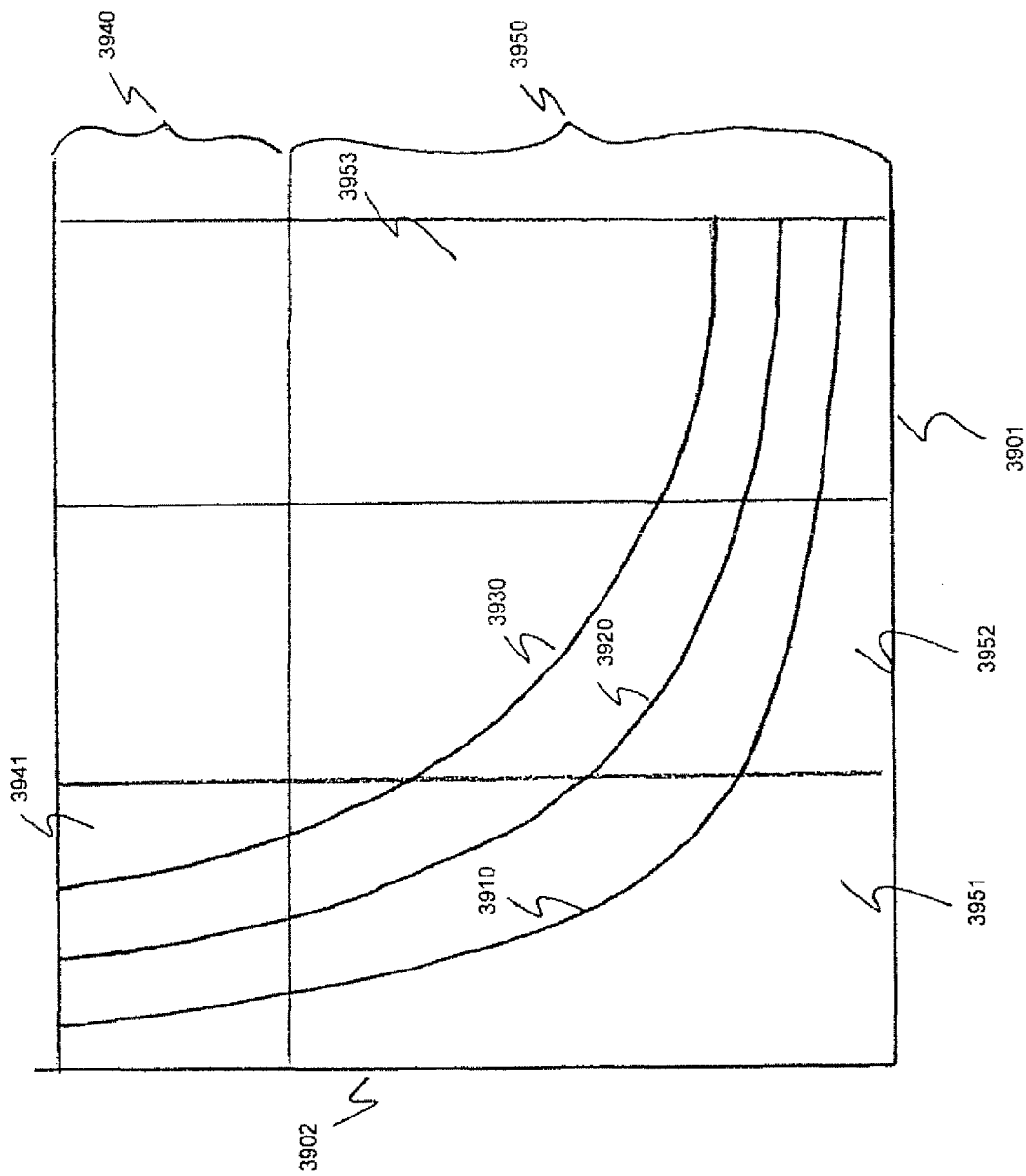
FIG. 39 is an example of total DC bus input amperes versus volts for a three engine locomotive where the engine systems are connected electrically in series.

FIG. 39 is an example of total DC bus input amperes versus bus volts for a three engine locomotive where the engine systems are connected electrically in series. The output amps 3902 typically range from 0 to about 6,000 amps and the output volts 3901 typically range from 0 to about 1,400 volts. Curve 3910 represents an amp-volt curve for a first constant power level, say 500 kW. Curve 3920 represents an amp-volt curve for a second constant power level, say 1,000 kW and curve 3930 represents an amp-volt curve for a third constant power level, say 1,500 kW. Region 3940 which may be, for example, above about 4,400 amps represents a region where a continuous current can be sustained for only a short time, for example about 5 minutes. For longer operating times, the windings in the engine alternators that are providing power to the DC bus can become too hot as a result of I2R heating in the windings. Continuous operation of 1, 2 or 3 engine systems can be permitted below this approximate current limit. The graph is further divided into three voltage regions 3951, 3952 and 3953 which are defined typically by magnetic saturation of the stator core of the engine alternators. For example, the power for curve 3910 can be provided by a single engine system for output voltages in region 3951 (the power in region 3951 can also be provided by two or three engine systems in this example). In region 3952 and 3953, the stator core of the alternator for a single engine system will be magnetically saturated and so the power must be provided by more than one engine system to avoid this condition. At least two engine systems are required to provide the power of curve 3910 in region 3952 and all three engine systems are required to provide the power of curve 3910 in region 3953. Typically the power supplied by each engine system is pro-rated on the maximum engine power rating of each engine system. As can be appreciated, the engine systems may be operated to supply different amounts of power than their pro-rata share as long as no engine system is operated so as to magnetically saturate its alternator stator core.

As another example, the power for curve 3920 must be provided by at least two engine systems for output voltages in region 3951 and 3952. In region 3953, the alternator stator cores of the engine systems may become magnetically saturated and so the power must be provided by all three engine systems to avoid this condition. Typically the power supplied by each engine system is pro-rated on the maximum engine power rating of each engine. As can be appreciated, the engine systems may be operated to supply different amounts of power than their pro-rata share as long as no engine system is operated so as to magnetically saturate its alternator stator core.

As yet another example, the power for curve 3930 must be provided by at all three engine systems for output voltages in region 3951, 3952 and 3953 to avoid magnetically saturating the alternator stator cores. Typically the power supplied by each engine system is pro-rated on the maximum engine power rating of each engine. As can be appreciated, the engine system may be operated to supply different amounts of power than their prorate share as long as no engine system is operated so as to magnetically saturate its alternator stator core.

Figure 40:
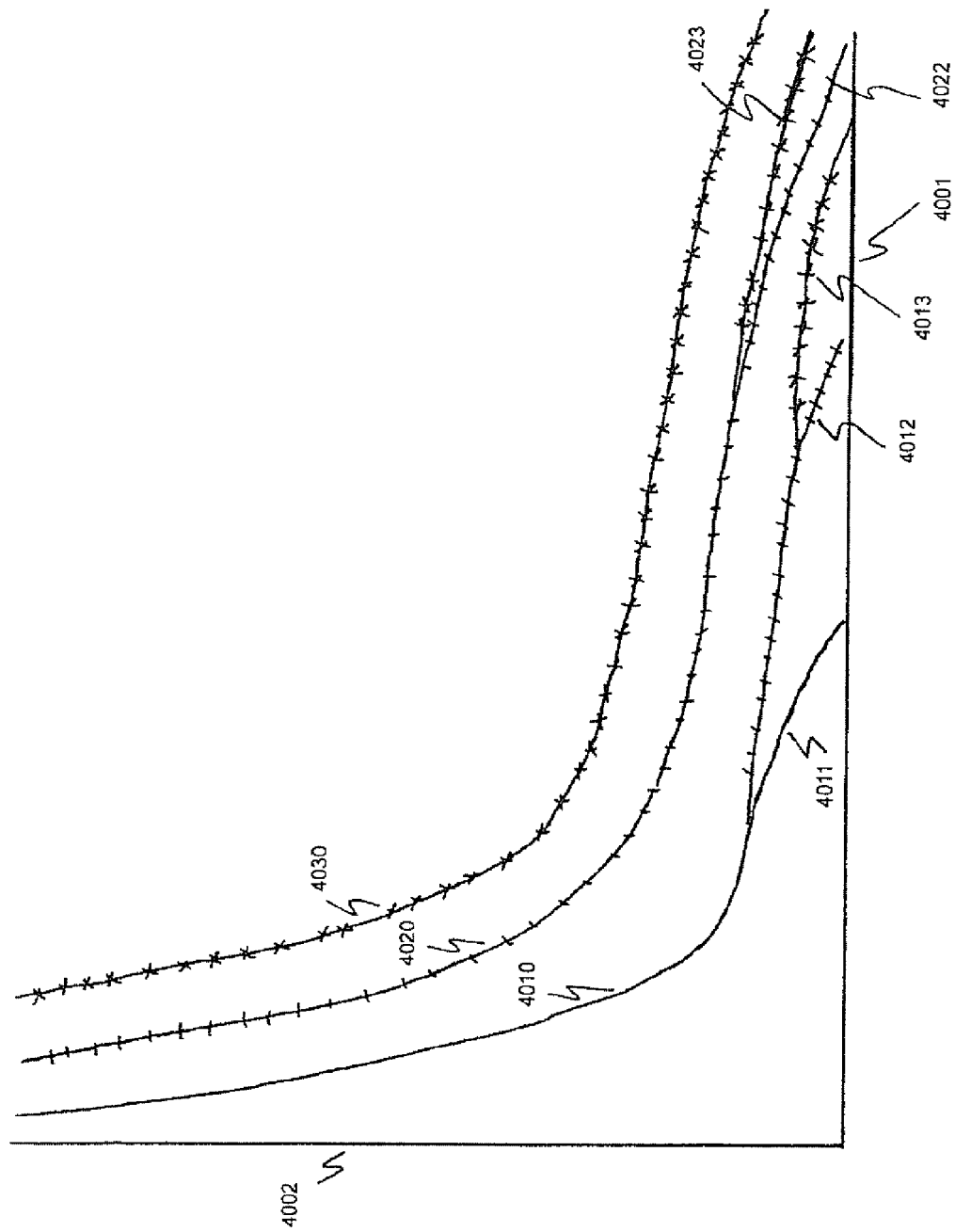
FIG. 40 is an example of total locomotive tractive effort versus speed for a three engine locomotive where the engines systems are connected electrically in series.

FIG. 40 is an example of total locomotive tractive effort versus locomotive speed for a three engine locomotive where the engine systems are connected electrically in series. In this example, the total locomotive tractive effort 4002 typically ranges from 0 to about 90,000 lbs and the locomotive speed 4001 typically ranges from 0 to 70 mph.

Curve 4010 represents a tractive effort versus speed curve for a first constant power level, say 500 kW. Curve 4020 represents a tractive effort versus speed curve for a second constant power level, say 1,000 kW and curve 4030 represents a tractive effort versus speed curve for a third constant power level, say 1,500 kW. When a constant power curve is smooth (for example curve 4010), this represents a single engine system operating. When a constant power curve has small normal crossing lines (for example curve 4020), this represents two engine systems operating. When a constant power curve has small crosses (for example curve 4030), this represents three engine systems operating. Curve 4010 illustrates the tractive effort for a single engine operating until a speed is reached where the tractive effort from the single engine drops rapidly as indicated by the portion of the curve 4011. This is a result of alternator voltage limitation caused by magnetic saturation of the stator core. If a second engine system is operated to add power to the DC bus, then the tractive effort follows curve 4012 to a higher locomotive speed before the tractive effort from the two engines drops rapidly as a result of the aforementioned alternator voltage limitation. If a third engine is brought on line, then the tractive effort follows curve 4013 to an even higher locomotive speed before the tractive effort from the three engines drops rapidly.

Curve 4020 illustrates the tractive effort for two engines operating until a speed is reached where the tractive effort from the two engines drops rapidly as indicated by the portion of the curve 4022. If a third engine system is brought on-line to add power to the DC bus, then the tractive effort follows curve 4023 to a higher locomotive speed before the tractive effort from the three engines drops rapidly.

Curve 4030 illustrates the tractive effort for all three engines operating at maximum power. This mode provides the maximum tractive effort at high speeds that can be developed by a three engine locomotive where the engine systems are connected electrically in series.

A number of variations and modifications of the invention can be used. As will be appreciated, it would be possible to provide for some features of the invention without providing others. For example, in one alternative embodiment, the various inventive features may be applied to large trucks which could utilize multiple engines coupled to the driving wheels by an electric transmission. This would allow, for example, a truck hauling multiple trailers to use the main truck engine for level or downhill travel but add engine power when hauling uphill by activating additional engines installed on each trailer being hauled by the truck cab.

The present invention, in various embodiments, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, for example for improving performance, achieving ease and/or reducing cost of implementation. The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention. Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

TABLE 1

Single Engine

| Notch Setting | Engine RPMs | Total BHP |
|---|---|---|
| Low Idle | 600 | 13 |
| High Idle | 750 | 19 |
| 1 | 750 | 32 |
| 2 | 800 | 71 |
| 3 | 916 | 148 |
| 4 | 1,078 | 173 |
| 5 | 1,271 | 268 |
| 6 | 1,566 | 383 |
| 7 | 1,634 | 519 |
| 8 | 1,800 | 630 |

TABLE 2

Fixed Engine Selection

| Notch setting | Number of Engines | Engine RPMs | Total BHP |
|---|---|---|---|
| Low Idle | 1 | 600 | 12 |
| High Idle | 1 | 750 | 18 |
| 1 | 1 | 1,000 | 150 |
| 2 | 1 | 1,500 | 450 |
| 3 | 2 | 1,500 | 900 |
| 4 | 2 | 1,650 | 1,080 |
| 5 | 3 | 1,650 | 1,620 |
| 6 | 4 | 1,700 | 2,280 |
| 7 | 5 | 1,800 | 3,150 |
| 8 | 6 | 1,800 | 3,780 |

TABLE 3

Last Engine Variable

| Notch setting | Number of engines | Engine RPMs | RPM Last Engine On | Total BHP |
|---|---|---|---|---|
| Low Idle | 1 | 600 | | 13 |
| High Idle | 1 | 750 | | 19 |
| 1 | 1 | 1,100 | | 210 |
| 2 | 1 | 1,450 | | 420 |
| 3 | 2 | 1,800 | 1,000 | 780 |
| 4 | 2 | 1,800 | 1,450 | 1,050 |
| 5 | 3 | 1,800 | 1,550 | 1,620 |
| 6 | 4 | 1,800 | 1,350 | 2,370 |
| 7 | 5 | 1,800 | 1,450 | 3,120 |
| 8 | 6 | 1,800 | 1,800 | 3,780 |

TABLE 4

Selection Determined by Load

| Notch setting | Number of engines | Engine RPMs | Total BHP |
|---|---|---|---|
| Low Idle | 1 | 600 | 13 |
| High Idle | 1 | 750 | 19 |
| 1 | 1 | 1,071 | 193 |
| 2 | 1 | 1,458 | 425 |
| 3 | 3 | 1,244 | 889 |
| 4 | 3 | 1,326 | 1,038 |
| 5 | 4 | 1,421 | 1,611 |
| 6 | 6 | 1,388 | 2,297 |
| 7 | 6 | 1,615 | 3,113 |
| 8 | 6 | 1,800 | 3,780 |

TABLE 5

Fixed Number of Engines

| Notch setting | Number of engines | Engine RPMs | Total BHP |
|---|---|---|---|
| Low Idle | 2 | 600 | 25 |
| High Idle | 2 | 750 | 38 |
| 1 | 2 | 804 | 64 |
| 2 | 2 | 868 | 142 |
| 3 | 2 | 997 | 296 |
| 4 | 2 | 1,038 | 346 |
| 5 | 2 | 1,197 | 537 |
| 6 | 2 | 1,388 | 766 |
| 7 | 2 | 1,615 | 1,038 |
| 8 | 2 | 1,800 | 1,260 |

TABLE 6

Maximum Fuel Economy

| Notch setting | Number of engines | Engine RPMs | Total BHP |
|---|---|---|---|
| Low Idle | 1 | 600 | 204 |
| High Idle | 1 | 600 | 204 |
| 1 | 1 | 600 | 204 |
| 2 | 1 | 1,400 | 492 |
| 3 | 2 | 1,400 | 984 |
| 4 | 2 | 1,500 | 1,056 |
| 5 | 3 | 1,550 | 1,638 |
| 6 | 4 | 1,600 | 2,256 |
| 7 | 5 | 1,700 | 3,000 |
| 8 | 6 | 1,750 | 3,708 |

TABLE 7

Minimum Emissions

| Notch setting | Number of engines | Engine RPMs | Total BHP |
|---|---|---|---|
| Low Idle | 1 | 600 | 204 |
| High Idle | 1 | 600 | 204 |
| 1 | 1 | 600 | 204 |
| 2 | 1 | 1,400 | 492 |
| 3 | 2 | 1,400 | 984 |
| 4 | 2 | 1,550 | 1,092 |
| 5 | 3 | 1,550 | 1,638 |
| 6 | 4 | 1,650 | 2,328 |
| 7 | 5 | 1,900 | 3,150 |
| 8 | 6 | 1,900 | 3,780 |

TABLE 8

Hybrid Configuration

Full Hybrid Mode:

| Notch setting | Number of engines | Engine RPMs | Battery BHP |
|---|---|---|---|
| Low Idle | 0 | 0 | 13 |
| High Idle | 0 | 0 | 19 |
| 1 | 0 | 0 | 200 |
| 2 | 1 | 1,400 | 0 |
| 3 | 1 | 1,800 | 150 |
| 4 | 1 | 1,800 | 400 |
| 5 | 2 | 1,800 | 200 |
| 6 | 3 | 1,800 | 0 |
| 7 | 3 | 1,800 | 200 |
| 8 | 4 | 1,800 | 100 |

Low Power Hybrid Mode:

| Notch setting | Number of engines | Engine RPMs | Battery BHP |
|---|---|---|---|
| Low Idle | 0 | 0 | 13 |
| High Idle | 0 | 0 | 19 |
| 1 | 0 | 0 | 200 |
| 2 | 1 | 1,400 | 0 |
| 3 | 2 | 1,400 | 0 |
| 4 | 2 | 1,550 | 0 |
| 5 | 3 | 1,550 | 0 |
| 6 | 4 | 1,650 | 0 |
| 7 | 4 | 1,650 | 0 |
| 8 | 4 | 1,900 | 0 |

The invention claimed is:

1. A method of controlling a desired total system output power from a locomotive comprising a plurality of power sources, the plurality of power sources outputting DC electrical power in parallel to a common DC bus, and said vehicle also comprising a variable power control having a plurality of power settings, said method comprising the steps of:

a) selecting a number of power sources to be used according to a schedule to provide power in parallel to the DC common bus;

b) activating the power sources according to said schedule;

c) setting a desired range of a parameter indicative of power available on the DC common bus from at least one of voltage or current on the DC common bus;

d) measuring a signal corresponding to the parameter indicative of power available on the DC common bus from at least one of voltage or current on the DC common bus;

e) for each of the plurality of power sources, measuring a signal indicative of a power source operational parameter from said each of the plurality of power sources;

f) determining an output power for each of the plurality of power sources, based on the measurement of the signal indicative of the power source operational parameter from said each of the plurality of power sources and the signal corresponding to the parameter indicative of at least one of voltage or current on the DC common bus; and g) if the output power of one of the plurality of power sources is different from a target output power, adjusting a power source control parameter of said one of the plurality of power sources to correct the difference.

2. The method according to claim 1, wherein the power source operational parameter comprises at least one of current, voltage, torque, speed and fuel injection rate.

3. The method according to claim 1, wherein the parameter indicative of the power available on the DC common bus is the DC common bus voltage, and the signal indicative of the power source operational parameter is at least one of current, voltage, torque, speed and fuel injection rate from said each of the plurality of power sources.

4. The method according to claim 1, wherein all selected power sources in step a) operate at a same power level.

5. The method according to claim 1, wherein all selected power sources but one in step a) operate at a same power level, said one power source operating at a different power level and enabling the all selected power sources but one to optimize an operating parameter.

6. The method of claim 5, wherein said operating parameter is selected from the group consisting of (i) fuel efficiency; (ii) low emissions; (iii) noise level; (iv) power; (v) tractive effort; (vi) engine lifetime, (vii) location of the vehicle and (viii) any combination thereof.

7. The method according to claim 1, wherein each power setting corresponds to a power level which is obtained by adding another power source as soon as the currently operating power sources reach a selected percentage of their rated power.

8. The method according to claim 1, wherein an operator of the vehicle manually selects at least one of the number of power sources to be used according to the schedule and an operating parameter of one of the number of power sources to be used according to the schedule, said operating parameter being selected from the group consisting of (i) fuel efficiency; (ii) low emissions; (iii) noise level; (iv) power; (v) tractive effort; (vi) engine lifetime, (vii) location of the vehicle, (viii) maximum engine output power, (ix) engine speed and (x) any combination thereof.

9. The method according to claim 5, wherein said number of power sources to be used and the power and engine speed setting for each power source are selected in order to obtain a desired fuel efficiency for that power setting and are determined using a controller programmed to use fuel consumption maps for each power source.

10. The method according to claim 5, wherein said number of power sources to be used and the power and engine speed setting for each power source in order to obtain the desired emissions for that power setting are determined using a controller programmed to use an emissions map for each power source.

11. The method according to claim 1, wherein said plurality of power sources comprise a plurality of prime movers and one or more energy storage systems.

12. The method according to claim 1, wherein said variable power control having a plurality of power settings comprises one or more idle settings and a plurality of power notch settings.

13. The method according to claim 1, wherein step a) comprises the steps of:
   i) determining a specified output power for a selected notch setting and vehicle speed;
   ii) selecting an optimum power source operating mode;
   iii) selecting a number of power sources required to provide the specified output power for the selected notch setting and vehicle speed;
   iv) selecting specific power sources to provide the specified output power for the selected notch setting and vehicle speed;
   v) verifying whether any of the selected specific power sources need to be derated;
   vi) if a power source from any of the selected specific power sources needs to be derated, derating said power source needing derating and returning to step iii); and
   vii) if a power source from the plurality of power sources is not required to provide the specified output power for the selected notch setting and vehicle speed, deactivating said non-required power source.

14. The method according to claim 13, wherein the vehicle is operating in dynamic braking mode and further comprising, prior to step a), the steps of:
   aa) selecting a dynamic braking power level;
   bb) determining if dynamic braking available power is sufficient for providing the desired total system output power;
   cc) if the dynamic braking available power is sufficient for providing the desired total system output power, performing step g) wherein the desired total system output power comprises output power from dynamic braking; and
   dd) if the dynamic braking available power is not sufficient for providing the desired total system output power, performing step a) wherein the desired total system output power comprises output power from dynamic braking and output power from the plurality of power sources.

15. The method according to claim 1, further comprising a step of deactivating a selected one of the plurality of power sources, said deactivating step comprising the steps of:
   I) selecting between an idle mode and a shutdown mode;
   II) if the idle mode is selected, performing the steps of:
      A. selecting between a high idle power level and a low idle power level;
      B. setting an excitation current for the selected deactivating power source such that an output voltage of the selected deactivating power source is below a DC common bus voltage;
      C. selecting an optimum operating mode for the selected deactivating power source; and
      D. adjusting the excitation current for the selected deactivating power source such that the output voltage of the selected deactivating power source is below a DC common bus voltage and the selected deactivating power source achieves said optimum operating mode; and
   III) if the shutdown mode is selected, performing the steps of:
      E. from look-ahead data, determining if the power source can be turned off;
      F. if a time required to shutdown the power source is below a threshold, performing steps II) A through II) D; and
      G. if the time required to shutdown the power source is above the threshold, turning off the engine.

16. The method according to claim 1, wherein step b) comprises the steps of:
   I) if the power sources are off, preheating the power sources;
   II) turning on lubricating oil flow;
   III) starting the power sources;
   IV) selecting between a high idle power level and a low idle power level;
   V) setting an excitation current for the selected activating power source such that an output voltage of the selected activating power source is below a DC common bus voltage
   VI) selecting an optimum operating mode for the selected activating power source; and
   VII) adjusting the excitation current for the selected activating power source such that the output voltage of the selected deactivating power source is below a DC common bus voltage and the selected activating power source achieves said optimum operating mode.

17. A system for controlling a desired total system output power from a locomotive comprising a plurality of power sources, the plurality of power sources outputting DC electrical power in parallel to a common DC bus, and said vehicle also comprising a variable power control having a plurality of power settings, the control system comprising:
   selecting means for selecting a number of power sources to be used according to a schedule to provide power to the DC common bus;
   activating means for activating the power sources according to said schedule;
   setting means for setting a desired range of a parameter indicative of power available on the DC common bus from at least one of voltage or current on the DC common bus;
   first measuring means for measuring a signal corresponding to the parameter indicative of power available on the DC common bus from at least one of voltage or current on the DC common bus;
   second measuring means, for each of the plurality of power sources, for measuring a signal indicative of a power source operational parameter from said each of the plurality of power sources;
   determining means for determining an output power for each of the plurality of power sources, based on the measurement of the signal indicative of the power source operational parameter from said each of the plurality of power sources and the signal corresponding to the parameter indicative of at least one of voltage or current on the DC common bus; and
   adjusting means for adjusting a power source control parameter of said one of the plurality of power sources to correct a difference between the output power of one of the plurality of power sources and a target output power.

18. The system according to claim 17, wherein the power source operational parameter comprises at least one of current, voltage, torque, speed and fuel injection rate.

19. The system according to claim 17, wherein the parameter indicative of the power available on the DC common bus is the DC common bus voltage, and the signal indicative of the power source operational parameter is at least one of current, voltage, torque, speed and fuel injection rate from said each of the plurality of power sources.

20. The system according to claim 19, wherein the system further comprises an energy storage system and an auxiliary power system connected to the DC common bus and wherein each of the plurality of power sources comprises an output shaft connected to a mechanical transmission driving a plurality of traction motor propulsion systems.

* * * * *